(12) United States Patent
Thuma et al.

(10) Patent No.: US 10,093,335 B2
(45) Date of Patent: Oct. 9, 2018

(54) HOUSEKEEPING CART WITH WALL PROTECTORS

(71) Applicant: Suncast Technologies, LLC, Palm Beach Gardens, FL (US)

(72) Inventors: Michael Thuma, La Grange, IL (US); Michael R. Vogler, Oswego, IL (US); Michael Uffner, Naperville, IL (US)

(73) Assignee: Suncast Technologies, LLC, Palm Beach Gardens, FL (US)

(*) Notice: Subject to any disclaimer, the term of this patent is extended or adjusted under 35 U.S.C. 154(b) by 0 days.

(21) Appl. No.: 15/593,838

(22) Filed: May 12, 2017

(65) Prior Publication Data

US 2017/0327141 A1 Nov. 16, 2017

Related U.S. Application Data

(60) Provisional application No. 62/335,914, filed on May 13, 2016.

(51) Int. Cl.
*B62B 5/00* (2006.01)
*B62B 3/00* (2006.01)
*B62B 5/06* (2006.01)

(52) U.S. Cl.
CPC ............ *B62B 5/0006* (2013.01); *B62B 3/005* (2013.01); *B62B 3/004* (2013.01); *B62B 5/061* (2013.01)

(58) Field of Classification Search
CPC ....... B62B 5/0006; B62B 3/005; B62B 5/061; B62B 3/004; B62B 3/008; B62B 3/001; B60B 33/0068; B60B 33/026; B60B 2200/43; B60B 33/0078; B60B 33/0092
See application file for complete search history.

(56) References Cited

U.S. PATENT DOCUMENTS

| | | | | |
|---|---|---|---|---|
| 1,526,725 | A | * 2/1925 | Topham | B60R 19/16 293/125 |
| 2,114,586 | A | * 4/1938 | Bowen | B62B 3/001 16/35 D |
| 2,253,824 | A | * 8/1941 | Townsend | B60B 33/021 16/20 |
| 2,935,330 | A | * 5/1960 | Millman | B62B 5/0006 280/33.992 |

(Continued)

FOREIGN PATENT DOCUMENTS

| | | | | |
|---|---|---|---|---|
| GB | 1410935 A | * 10/1975 | | B62B 5/04 |
| JP | 10236318 A | * 9/1998 | | B62M 27/02 |
| WO | WO9632867 | 10/1996 | | |

*Primary Examiner* — Jacob B Meyer
(74) *Attorney, Agent, or Firm* — McHale & Slavin, P.A.

(57) ABSTRACT

The present invention relates to a mobile housekeeping cart having a base supported by casters and wheels, where the casters have user-accessible swivel-lock levers to aid in controlling the motion of the mobile cart. Brackets extend downward from the corners of the base as housings for wall-protecting corner rollers. The corner rollers are positioned at a sufficiently low height so that the adjustable shock absorption rollers will impact base trim on walls instead of the wall surfaces themselves. The cart also has a main body storage area with an adjustable shelf, and a top storage area with a top hood. Handles are provided for user control of the cart, as well as to provide an attachment area for removable side storage bags, as well as providing attachment of tools and cleaning supplies.

16 Claims, 67 Drawing Sheets

(56) References Cited

U.S. PATENT DOCUMENTS

| | | | |
|---|---|---|---|
| 2,947,548 A * | 8/1960 | Bard | A47L 13/48 |
| | | | 280/79.2 |
| 3,708,195 A * | 1/1973 | Kottsieper | B60R 19/20 |
| | | | 293/125 |
| 4,055,362 A * | 10/1977 | Becker, III | A47B 95/043 |
| | | | 293/121 |
| 4,205,413 A * | 6/1980 | Collignon | B60B 33/021 |
| | | | 16/35 D |
| 4,384,713 A * | 5/1983 | Deutsch | A61H 3/04 |
| | | | 188/167 |
| 4,621,849 A * | 11/1986 | Berfield | B60R 19/02 |
| | | | 16/18 CG |
| 4,840,388 A * | 6/1989 | Doughty | B62B 5/04 |
| | | | 188/19 |
| 4,875,696 A * | 10/1989 | Welch | B60B 33/02 |
| | | | 188/1.12 |
| D321,071 S | 10/1991 | Dickinson | |
| 5,306,028 A * | 4/1994 | Pike | A63F 11/0002 |
| | | | 280/47.35 |
| D379,705 S | 6/1997 | Delmerico et al. | |
| 5,634,532 A * | 6/1997 | Bucher | B62B 5/04 |
| | | | 188/1.12 |
| D381,168 S | 7/1997 | Delmerico et al. | |
| 5,647,650 A | 7/1997 | Daugherty et al. | |
| D391,032 S | 2/1998 | Delmerico | |
| 5,716,116 A | 2/1998 | Carlson et al. | |
| D395,108 S | 6/1998 | Pool | |
| D401,712 S | 11/1998 | Daniels | |
| D415,867 S | 10/1999 | Perelli | |
| D423,175 S | 4/2000 | Daniels | |
| D424,773 S | 5/2000 | Granberg | |
| D425,279 S | 5/2000 | Houry et al. | |
| D440,369 S | 4/2001 | LaFollette, Jr. et al. | |
| D445,984 S | 7/2001 | Dickinson et al. | |
| 6,409,187 B1 * | 6/2002 | Crow, Jr. | B62B 5/04 |
| | | | 188/20 |
| D464,185 S | 10/2002 | Olson | |
| 6,497,423 B1 | 12/2002 | Perelli et al. | |
| D469,235 S | 1/2003 | Calmeise et al. | |
| D474,570 S | 5/2003 | Presnell et al. | |
| D478,199 S | 8/2003 | Presnell et al. | |
| D481,188 S | 10/2003 | DiGiacomo, Jr. et al. | |
| D481,847 S | 11/2003 | Van Landingham, Jr. | |
| D482,173 S | 11/2003 | Van Landingham, Jr. | |
| D484,667 S | 12/2003 | Van Landingham, Jr. | |
| D485,037 S | 1/2004 | Presnell et al. | |
| D487,604 S | 3/2004 | Van Landingham, Jr. | |
| D505,236 S | 5/2005 | Arceta | |
| D510,784 S | 10/2005 | Van Landingham, Jr. | |
| D517,768 S | 3/2006 | Arceta | |
| D528,729 S | 9/2006 | Van Landingham, Jr. | |
| D533,705 S | 12/2006 | Bertucci et al. | |
| D536,851 S | 2/2007 | Lauer | |
| D555,869 S | 11/2007 | Zorzo | |
| D555,870 S | 11/2007 | Zorzo | |
| D556,416 S | 11/2007 | Zorzo | |
| D556,417 S | 11/2007 | Zorzo | |
| D556,418 S | 11/2007 | Zorzo | |
| D557,870 S | 12/2007 | MacMillan | |
| D572,424 S | 7/2008 | Presnell et al. | |
| 7,392,993 B1 * | 7/2008 | Prohl | A47F 5/137 |
| | | | 280/33.998 |
| 7,395,902 B2 * | 7/2008 | D'Arca | B60B 33/0078 |
| | | | 188/19 |
| D575,022 S | 8/2008 | Girard | |
| D575,023 S | 8/2008 | Girard | |
| D575,473 S | 8/2008 | Presnell | |
| D575,922 S | 8/2008 | Presnell | |
| D577,874 S | 9/2008 | Mayer et al. | |
| D578,269 S | 10/2008 | Van Landingham, Jr. | |
| D582,621 S | 12/2008 | Girard | |
| 7,467,801 B1 | 12/2008 | Garduno | |
| D587,421 S | 2/2009 | Liao | |
| D594,170 S | 6/2009 | Catron | |
| D598,623 S | 8/2009 | Zang Wentz Pho | |
| D607,172 S | 12/2009 | Catron | |
| D608,071 S | 1/2010 | Presnell | |
| 7,698,760 B2 * | 4/2010 | Reckelhoff | A61G 7/05 |
| | | | 16/35 R |
| D618,420 S | 6/2010 | Perelli et al. | |
| D624,269 S | 9/2010 | Uhl et al. | |
| D624,270 S | 9/2010 | Uhl et al. | |
| D624,271 S | 9/2010 | Uhl et al. | |
| D624,724 S | 9/2010 | Uhl et al. | |
| D632,043 S | 2/2011 | Rouillard et al. | |
| D640,436 S | 6/2011 | Perelli et al. | |
| D665,142 S | 8/2012 | Shanahan et al. | |
| D667,602 S | 9/2012 | Salmon | |
| 8,381,330 B2 * | 2/2013 | Roussy | A61G 7/012 |
| | | | 296/20 |
| D697,284 S | 1/2014 | Ho et al. | |
| D703,903 S | 4/2014 | Tuncel | |
| D707,912 S | 6/2014 | Koehler et al. | |
| D708,809 S | 7/2014 | Maddux et al. | |
| D723,237 S | 2/2015 | Maddux et al. | |
| D725,862 S | 3/2015 | Tuncel | |
| 8,985,649 B2 * | 3/2015 | Lutz | B60R 19/18 |
| | | | 293/102 |
| D734,913 S | 7/2015 | Adams et al. | |
| 9,126,455 B1 * | 9/2015 | Hsieh | B60B 33/0057 |
| 9,138,050 B2 | 9/2015 | Peery et al. | |
| 9,511,786 B1 * | 12/2016 | Hickcox | B62B 3/108 |
| 9,522,763 B2 * | 12/2016 | Roman | B65D 21/0233 |
| 9,650,060 B2 * | 5/2017 | Kopp | B62B 5/067 |
| 9,944,121 B2 * | 4/2018 | Wang | B60B 33/026 |
| 2003/0070233 A1 * | 4/2003 | Ganance | A61G 7/00 |
| | | | 5/620 |
| 2004/0144601 A1 * | 7/2004 | Otterson | B62B 5/04 |
| | | | 188/19 |
| 2010/0066045 A1 | 3/2010 | Presnell et al. | |
| 2010/0242787 A1 * | 9/2010 | Wicks | B61D 3/12 |
| | | | 105/4.4 |
| 2011/0162141 A1 * | 7/2011 | Lemire | A61G 7/005 |
| | | | 5/510 |
| 2012/0241537 A1 | 9/2012 | Schwei et al. | |
| 2013/0160237 A1 * | 6/2013 | Shih | B60B 33/021 |
| | | | 16/47 |
| 2013/0313029 A1 | 11/2013 | Franco | |
| 2016/0332778 A1 * | 11/2016 | Roman | B65D 21/0233 |
| 2017/0327141 A1 * | 11/2017 | Thuma | B62B 5/0006 |

\* cited by examiner

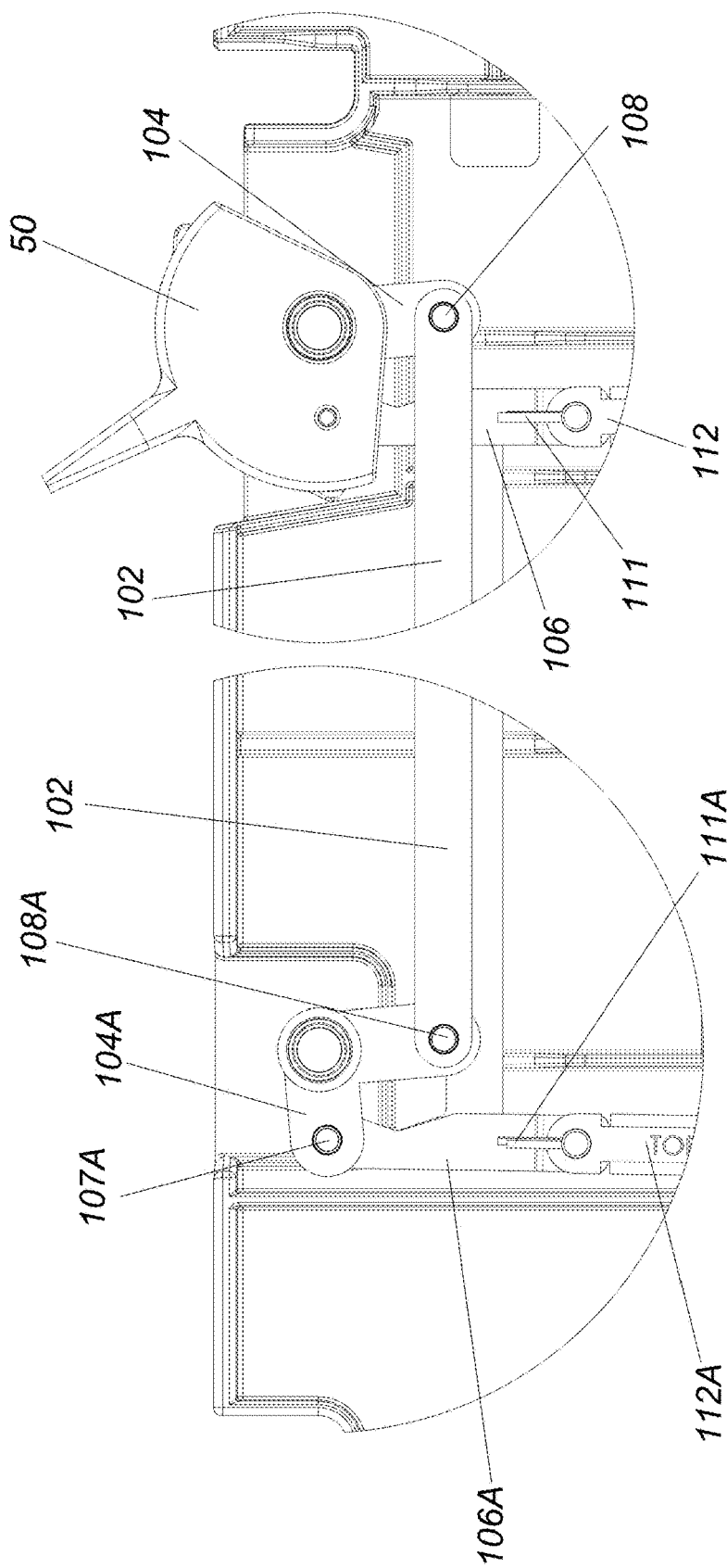

HOUSEKEEPING CART WITH WALL PROTECTORS

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/335,914, entitled "HOUSEKEEPING CART WITH WALL PROTECTORS", filed May 13, 2016. The contents of the above referenced application are incorporated herein by reference in its entirety.

FIELD OF THE INVENTION

This invention relates generally to mobile maintenance carts and, in particular, to such carts specifically adapted for use in hotels to transport cleaning supplies and to dispose of waste.

BACKGROUND OF THE INVENTION

Mobile carts for use in the performance of cleaning duties are well known, and have found a wide range of application in commercial functions. Mobile carts are commonly used when cleaning large buildings such as office buildings or hotels, where cleaning supplies need to be transported to many different rooms. In particular, with hotel use, carts must also have the ability to store and transport clean supplies to replenish the supplies used in the room. Typically, such carts will comprise an elongated wheeled platform with a top surface having spaces for various supplies to be easily accessed. They also typically carry refuse compartments, storage areas for supplies to be replenished in the room, and the ability to transport a vacuum cleaner.

One of the biggest problems with mobile housekeeping carts is that, in order to accommodate all the supplies necessary, they become large and heavy, and difficult to maneuver. Because of this difficulty in maneuvering the mobile carts, they are prone to coming into contact with the walls in the hallways and rooms, causing damage to the building that must be regularly maintained.

U.S. Pat. No. 6,497,423 discloses a mobile cart comprising a wheeled platform and a plurality of uprights extending upward therefrom to support a middle shelf at an intermediate level, and an upper shelf at a top level. The intermediate shelf is adapted to provide a forward surface for receiving and cradling a refuse container positioned upon the wheeled platform to prevent tipping of the container when the cart is turned. A handle affixes to the upper shelf and a bag is suspended from the handle. A compartment comprising a base and a cover is pivotally attached to the handle to move in unison between a lowered position, wherein the compartment covers the upper open end of the bag, and an upper position, wherein the bag top is exposed. The cover and base define an internal storage compartment for isolating objects from surrounding individuals, as well as isolating the contents of the bag from contact with the surrounding environment.

U.S. Pat. No. 7,467,801 discloses a compact, lightweight, residential mobile housekeeping cart, designed with low center of gravity. The cart provides for attachment and easily accessed storage of virtually all supplies and implements needed for cleaning. Easily transported by a user, the cart has two rear wheels, two front omni-directional casters, and skips on the back of the cart, whereby a ramp or elevator is not needed to access various levels or stairs, thereby providing mobility and requiring minimal space for maneuvering or storage. A plurality of implement and supply holders are disposed on the L-shaped sides and the back of the cart.

U.S. Patent Application Publication No. 2010/0066045 discloses a cart utilizing a sliding support to mount a container onto the cart. In one embodiment, the container is a linen bag mounted to the cart handles. A shelf or platform is located below the sliding support. The sliding support allows the container to be stored either under the support or over the platform, or if more storage space is required, the sliding support allows the container to slide on the support, providing open space for items to be placed on the platform. The container may also be easily slid off of the cart for removal by the user. The container may be provided with a telescopic handle and wheels for easy transport of the container and its contents.

U.S. Design Pat. No. 395,108 discloses the ornamental design for a similar utility cart, having a wheeled base. In the body of the cart, there is a lower compartment with a pull out drawer, a middle compartment with a pull-out drawer, and what appears to be a top compartment with a pull-out drawer for smaller items. There is an upper surface with a sink on one end, and on the opposing end there appears to be two side-by-side attachments for hanging bags.

U.S. Design Pat. No. 401,712 discloses a household cleaning cart with a main body receptacle with omni-directional wheels on the base. Each side of the body has apertures to attach compartments to the body to carry smaller items on the outside of the receptacle body.

U.S. Design Pat. No. 424,773 discloses a transport carriage comprising a main part with a bottom surface shelf, a top shelf, and two intermediate shelves with a first and second side part that are removable from the main part. Each side part appears to be a receptacle.

U.S. Design Pat. No. 425,279 discloses a maid cart with a central body having opening doors, a top surface providing a central portion for placing items, and a left and a right side aperture whereby receptacles can be placed extending from the top surface down to the bottom surface of the cart.

U.S. Design Pat. No. 464,185 discloses two embodiments of a housekeeping cart. The first embodiment has wheels, wire holders on the left side, bottom shelving, and embossed surface features. The first embodiment further has a cover on the top surface and an open space on the right side. The second embodiment disclosed has wheels, wire holders on the right side, and embossed surface features.

However, there still exists a need in the art for a hotel cart that provides sufficient storage space for all the necessary supplies on a housekeeping cart, including vacuum storage areas on both ends, hanging hooks integrated into the handles, an integrated base removable storage container with removable toilet bowl brush caddy, casters with swivel lock-out features with the control mounted at a user accessible height, and wall protecting corner rollers with adjustable shock absorption and impact indicators to protect the walls as the housekeeping cart is moving around.

SUMMARY OF THE INVENTION

The housekeeping cart of the present invention overcomes the deficiencies of the prior art, including those deficiencies identified above. The housekeeping cart disclosed overcomes these deficiencies by providing a housekeeping cart having a top storage area with an upper storage area enclosed by a protective hood, a main body portion with internal shelving and flush mounted doors and handles, and an under base storage area with a slide-out removable tray. Additionally, the side portions of the housekeeping cart have handles with integrated hanging hooks and integrated tool storage areas with molded rubber retaining arms and corresponding base receptacles. The handles also define side storage areas which utilize fabric storage bags which attach to the handles. Below the side storage areas, the wheels are covered by wall protecting corner rollers with adjustable shock absorption and impact indicators. The wall protecting corner rollers extend down from the lower platform of the housekeeping cart to a level sufficiently low that they will come into contact with the base trim of a wall before contacting the wall itself.

Accordingly, it is a primary objective of the instant invention to provide a housekeeping cart with wall protecting features such as corner rollers with adjustable shock absorption and impact indicators so that the walls and hallways of a building utilizing the housekeeping cart remain free from marks, scrapes, scuffs, and dents.

It is a further objective of the present invention to provide a housekeeping cart with sufficient storage for all housekeeping supplies and cleaning tools, keeping them all in a neat and organized fashion.

It is yet another objective of the present invention to provide a housekeeping cart with integrated hooks and tool storage areas.

It is further an objective of the present invention to provide a housekeeping cart with removable fabric side compartments which can be attached to the molded handles.

It is a still further objective of the present invention to provide a housekeeping cart with an enclosed hood over a top storage area.

It is an additional objective of the present invention to provide a housekeeping cart with vacuum cleaner storage on both ends of the cart.

Still yet another objective of the present invention is to provide a housekeeping cart that is primarily constructed from plastic materials having metal reinforcements to provide additional rigidity and weight carrying capacity.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 38 is a detailed view of the top portion of the rear wheel caster lock mechanism in an open position;

FIG. 39 is a detailed view of the wheel caster lock mechanism switch in the open position;

DETAILED DESCRIPTION OF THE INVENTION

Figure 1:
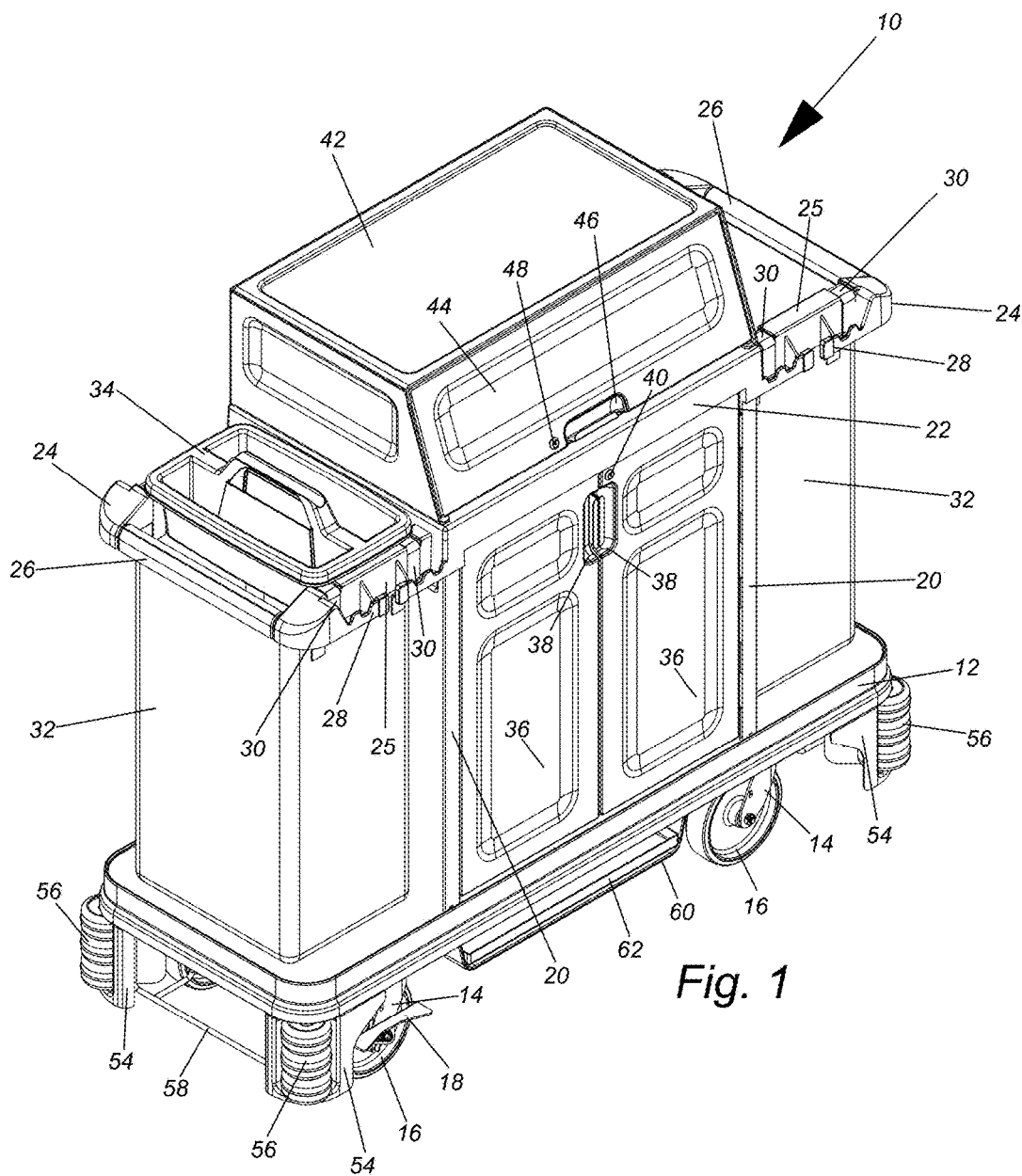
FIG. 1 is a top right side perspective view of the housekeeping cart of the present invention, shown with attached side storage bags, storage caddy, and hood.
Figure 2:
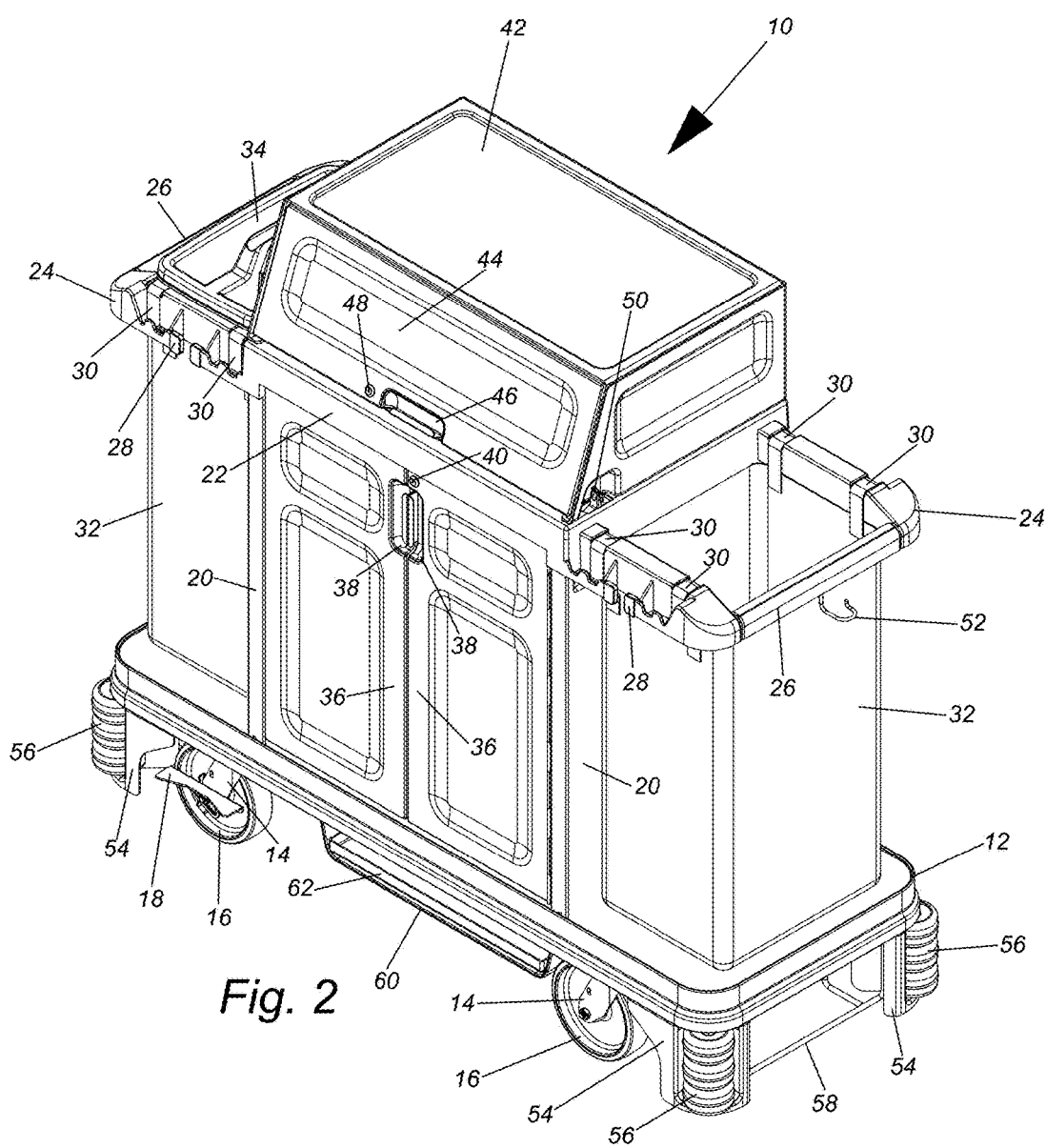
FIG. 2 is a top left side perspective view of the housekeeping cart of FIG. 1.
Figure 3:
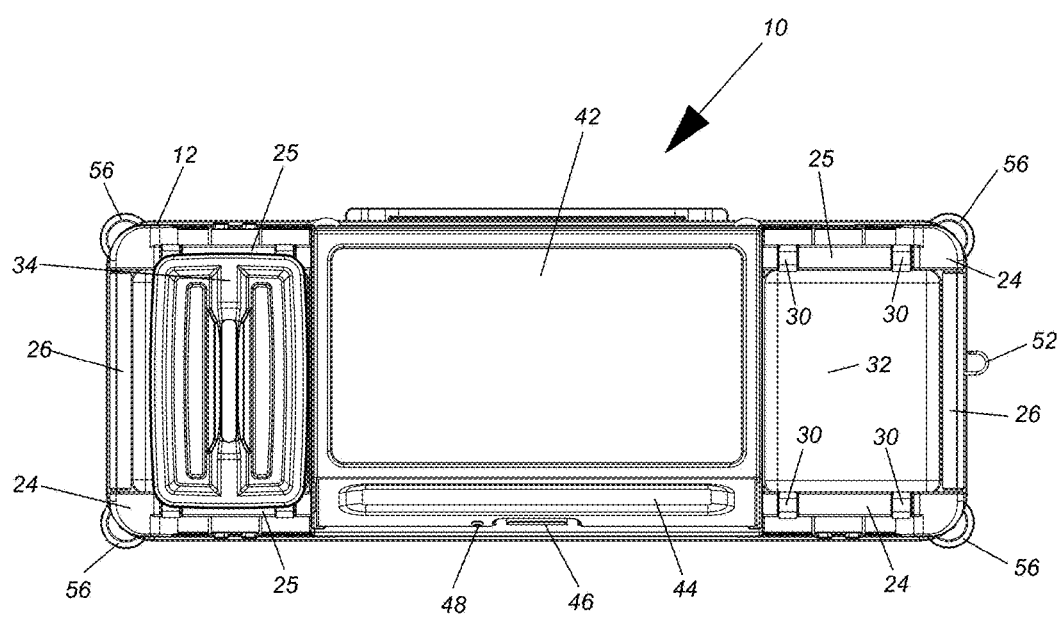
FIG. 3 is a top view of the housekeeping cart of FIG. 1.
Figure 4:
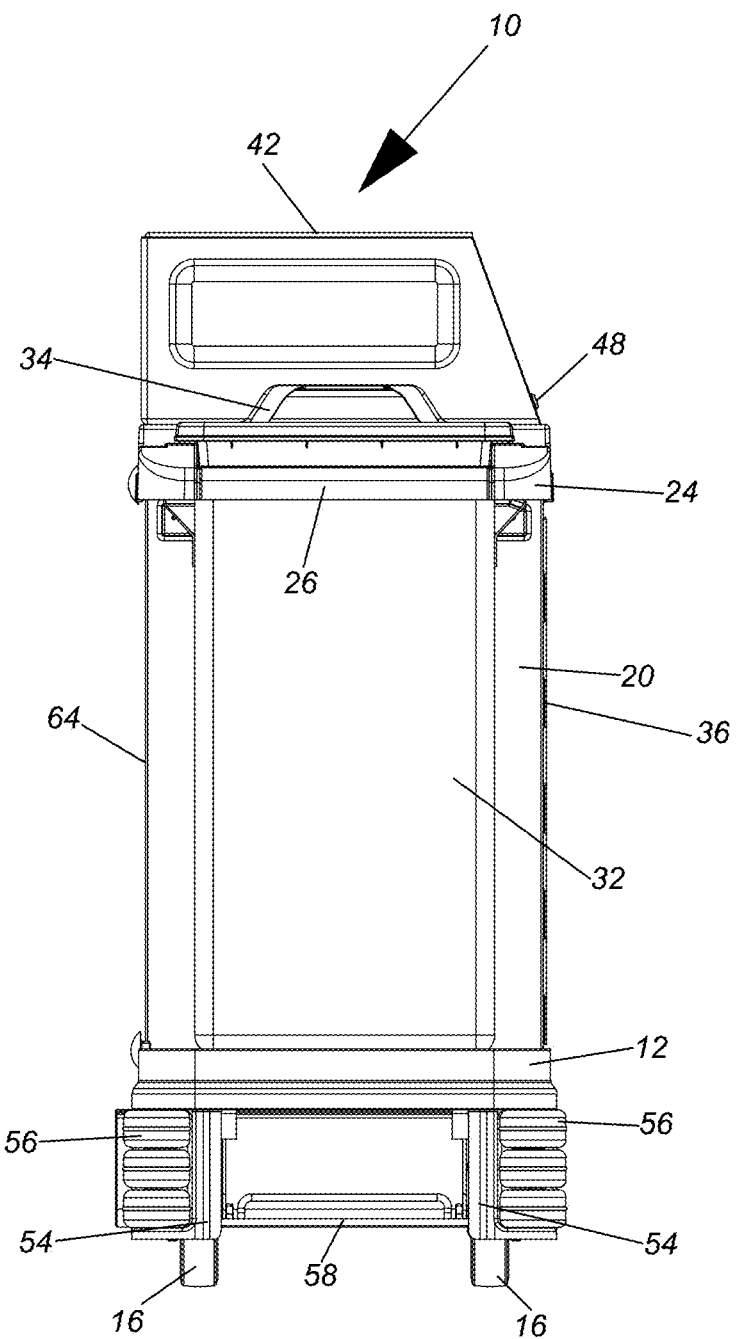
FIG. 4 is a right side view of the housekeeping cart of FIG. 1.
Figure 5:
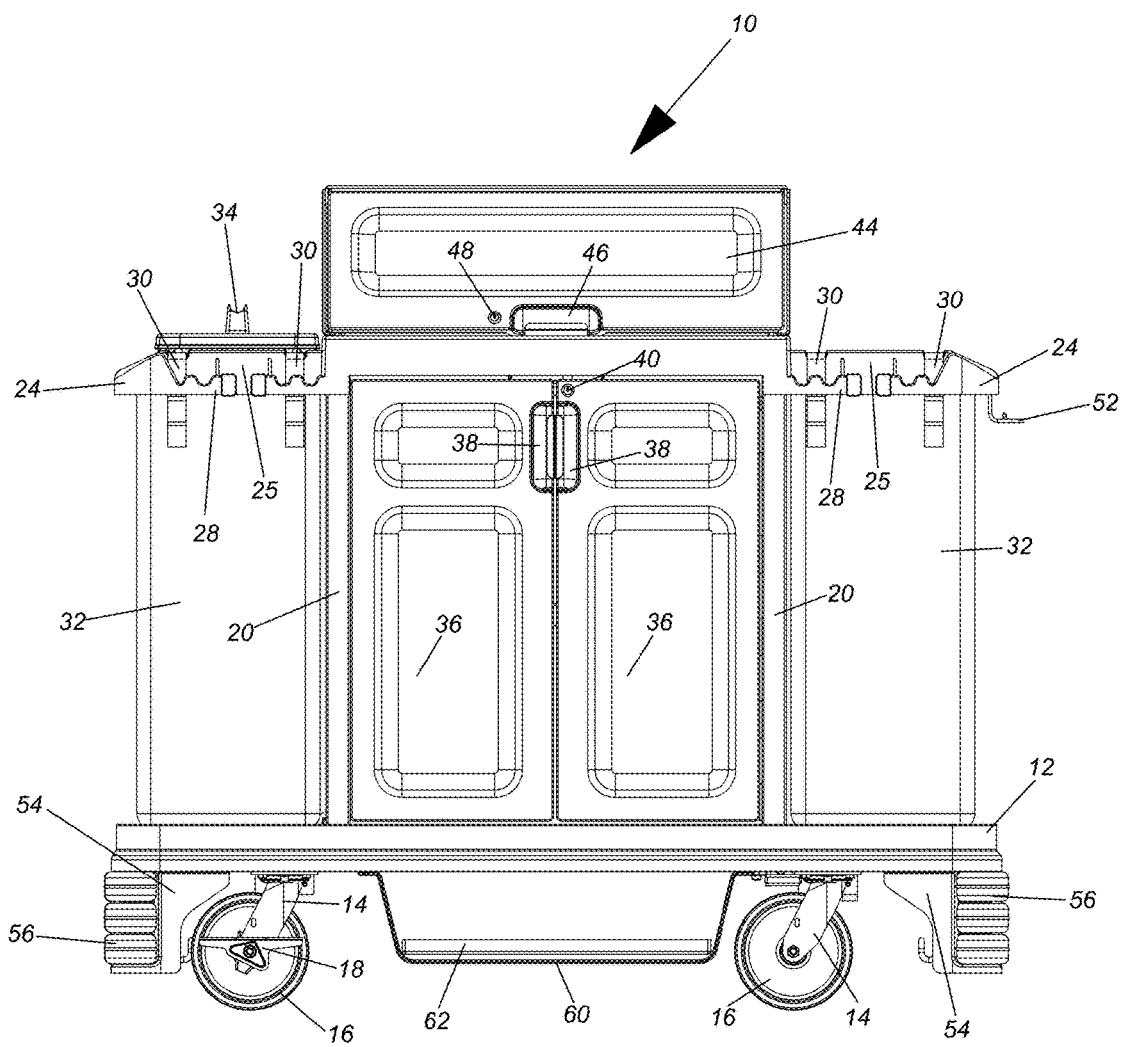
FIG. 5 is a front side view of the housekeeping cart of FIG. 1.
Figure 6:
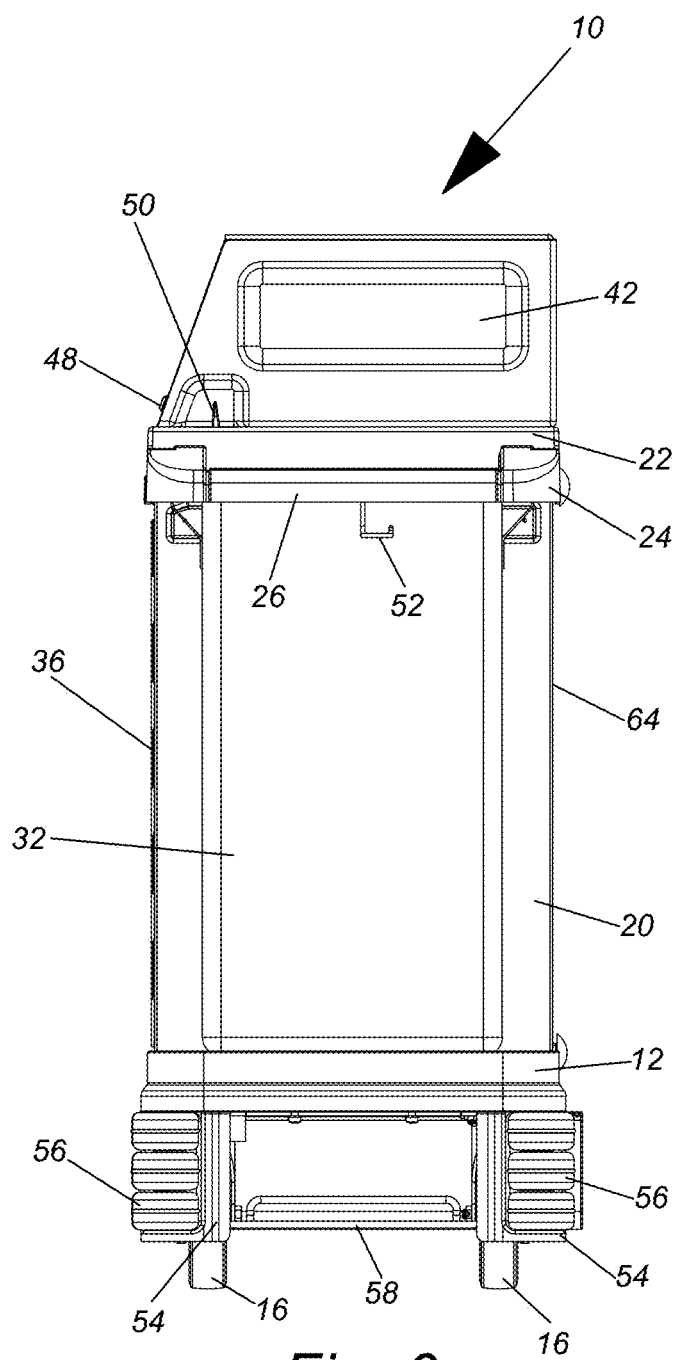
FIG. 6 is a left side view of the housekeeping cart of FIG. 1.
Figure 7:
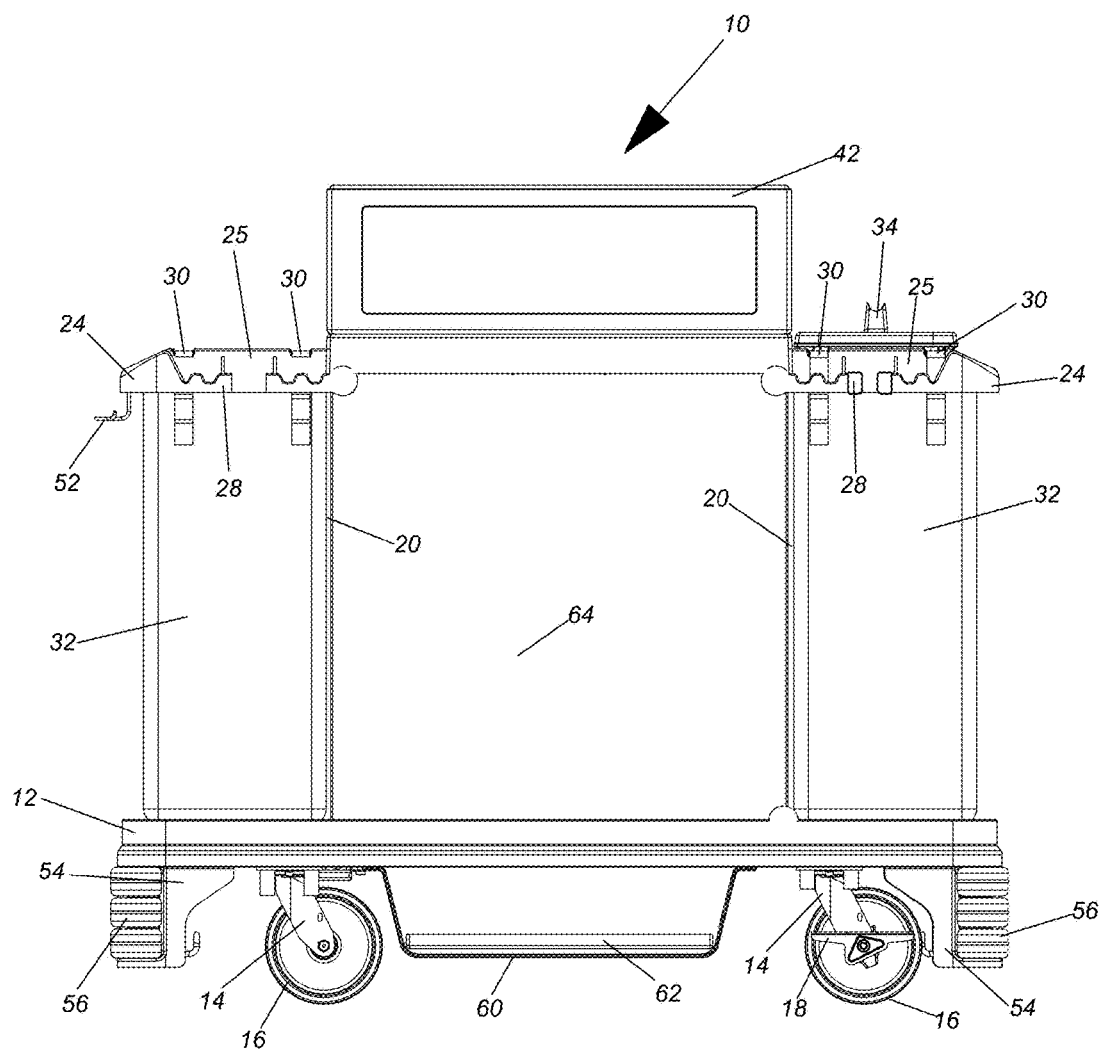
FIG. 7 is a back side view of the housekeeping cart of FIG. 1.
Figure 8:
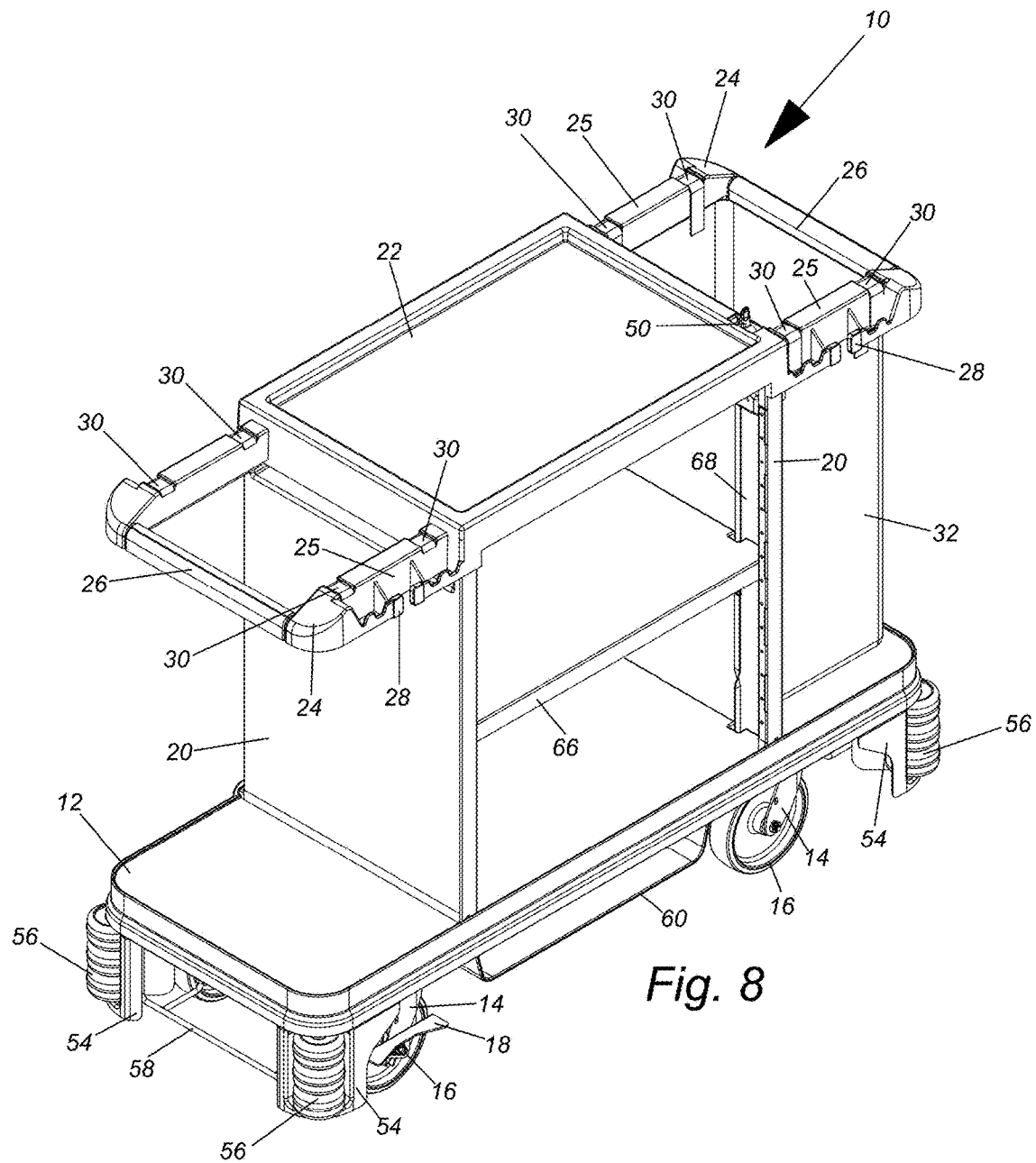
FIG. 8 is a top right perspective view of the housekeeping cart of the present invention without the top hood or front door panels, and only one attached side storage bag.
Figure 9:
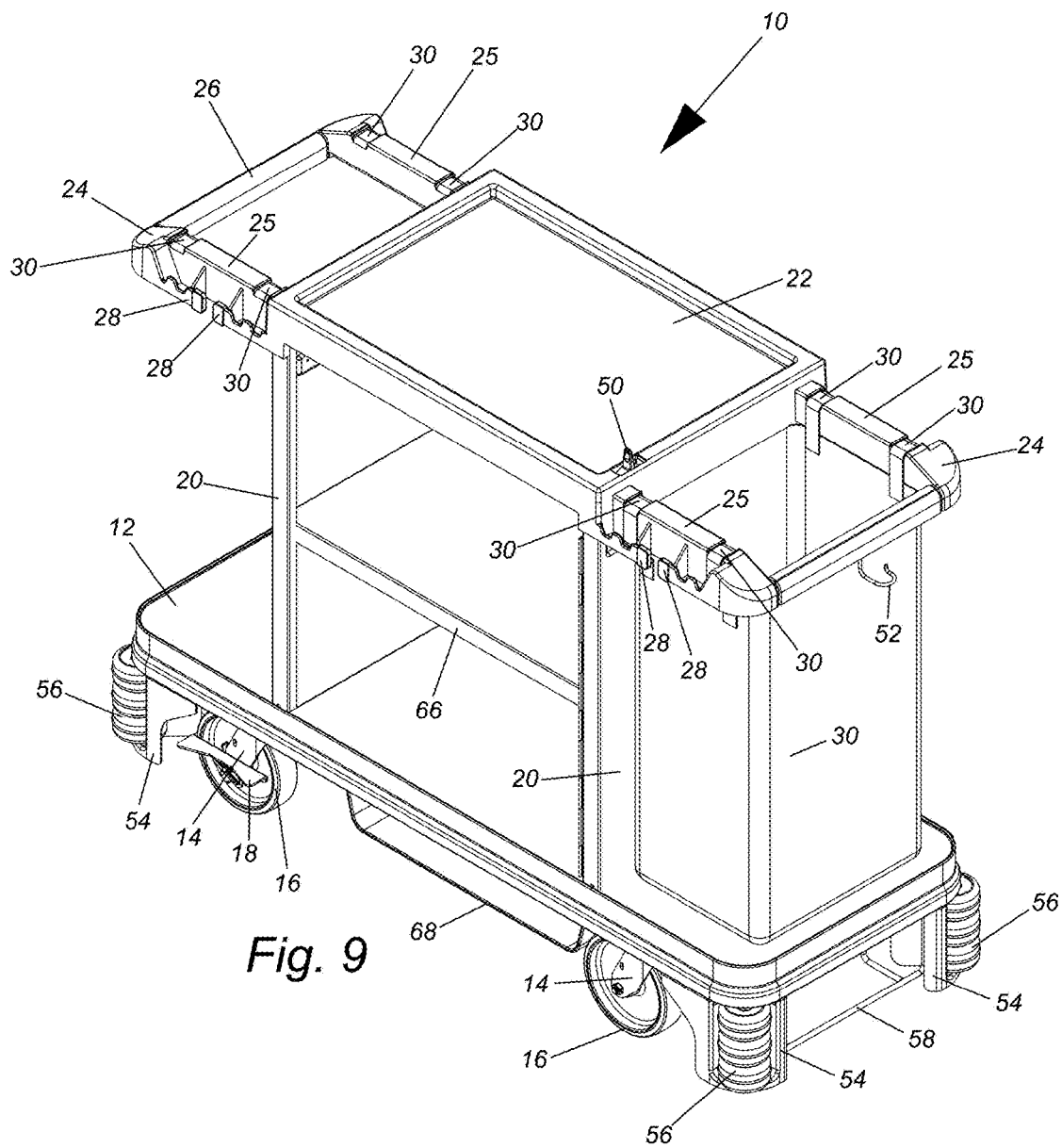
FIG. 9 is a top left perspective view of the housekeeping cart as shown in FIG. 8.
Figure 10:
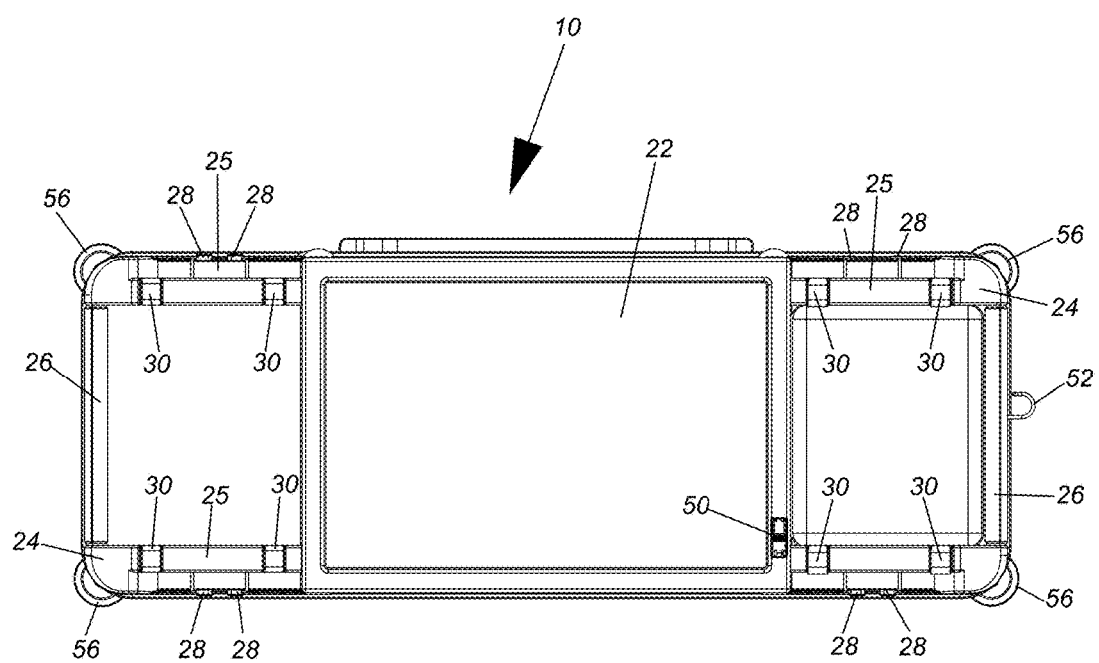
FIG. 10 is a top view of the housekeeping cart as shown in FIG. 8.
Figure 11:
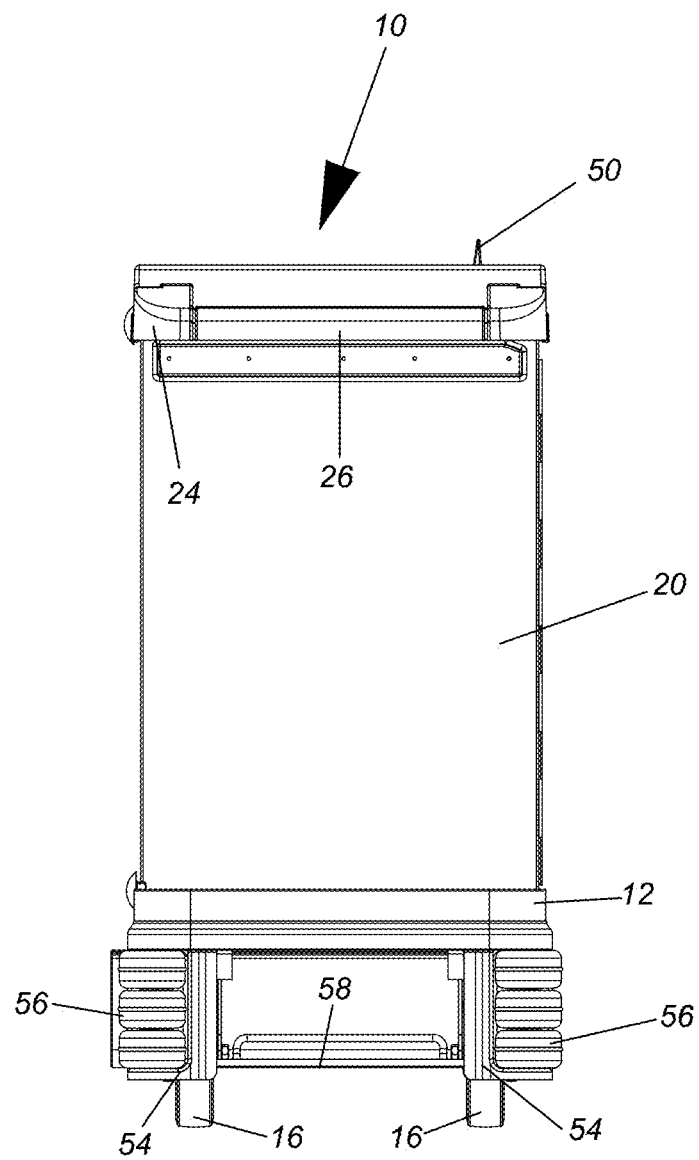
FIG. 11 is a right side view of the housekeeping cart as shown in FIG. 8.
Figure 12:
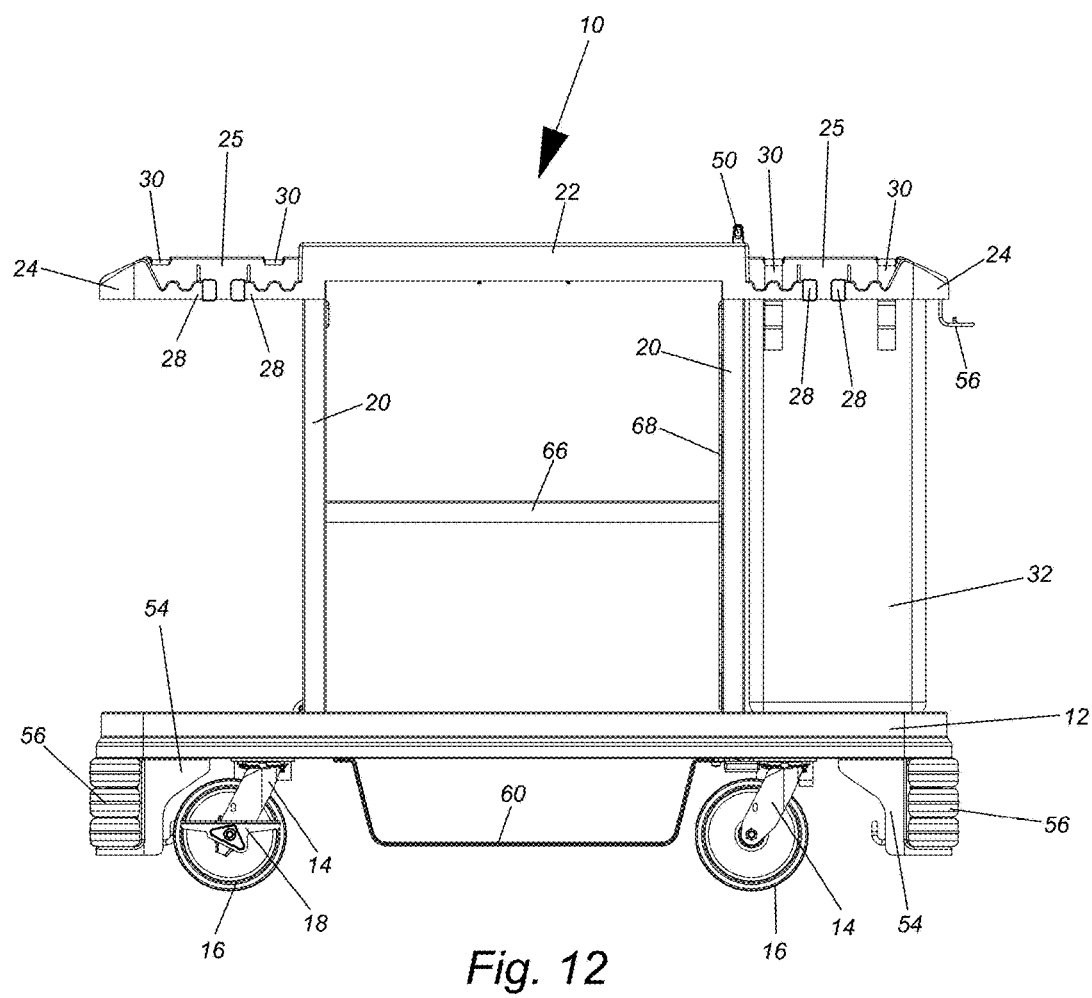
FIG. 12 is a front side view of the housekeeping cart as shown in FIG. 8.
Figure 13:
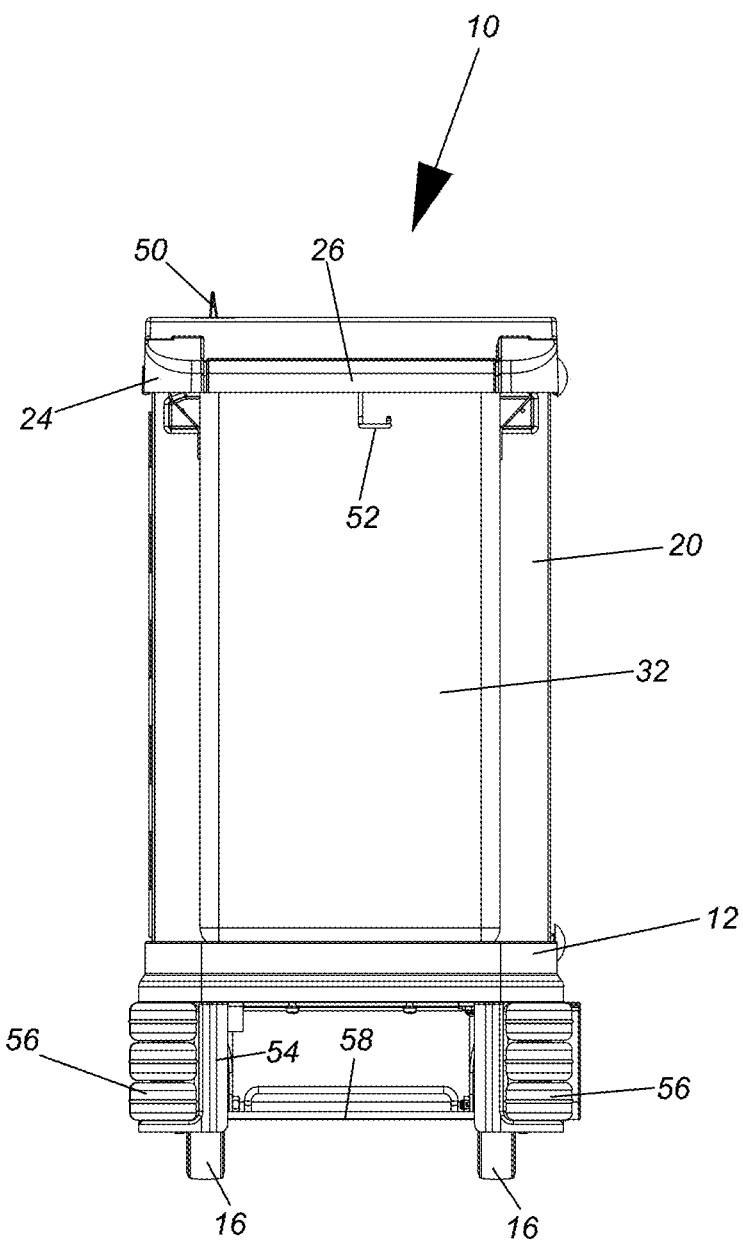
FIG. 13 is a left side view of the housekeeping cart as shown in FIG. 8.
Figure 14:
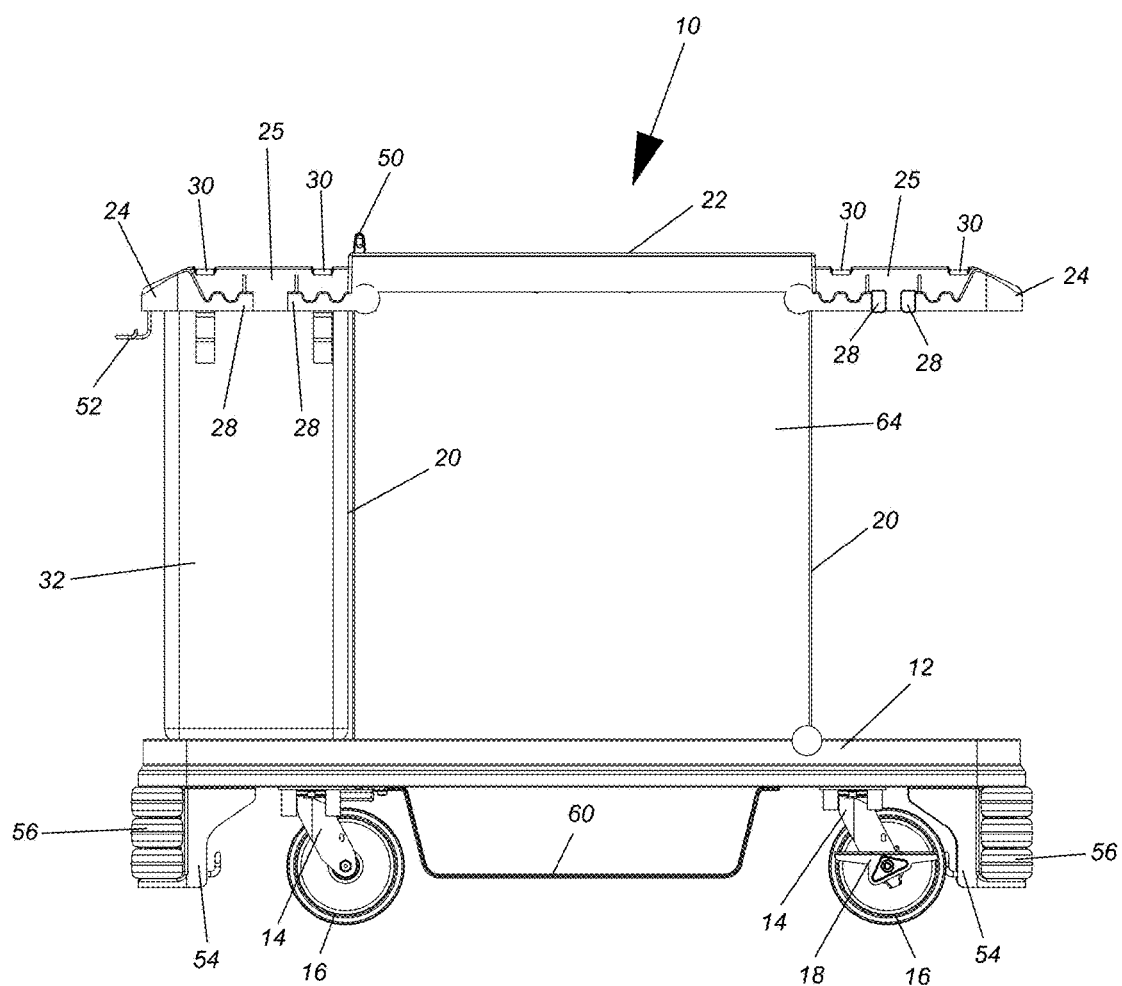
FIG. 14 is a back side view of the housekeeping cart as shown in FIG. 8.

As shown in FIGS. 1-7 and 15-30, one embodiment of a mobile housekeeping cart (10) of the present invention is disclosed. The cart (10) is generally shown comprising a base (12) with casters (14) and wheels (16) to allow the cart (10) to be moved. The casters (14) allow the wheels to swivel relative to the base (12) so that the cart can be moved in any direction. The casters (14) can be equipped with swivel lock levers (18) so that the wheels (16) orientation relative to the base (12) can be fixed if desired. This allows a user of the cart (10) to quickly and efficiently engage the swivel locking levers (18) for greater control of the cart (10).

A pair of side walls (20) and a back wall (64) extend substantially vertically from the base (12) to form the main storage area of the cart (10). A pair of doors (36) encloses this main storage area. The doors (36) have flush mounted handles (38) that are recessed in the doors (36) to prevent the doors from accidentally striking walls or doorways as the cart (10) moves through a building. The doors (36) can be equipped with a door lock (40) to provide for increased security of items being stored in the main storage area.

The top of the main storage area defines an upper shelf (22), upon which items can be placed. The use of a top hood (42) on the upper shelf (22) can provide for greater security of items on the upper shelf (22). The top hood (42) has an opening (44) on the front side, which can be opened using a flush mounted handle (46). Security for the hood (42) can be added by virtue of a hood lock (48). Additionally, an internal light (not shown) can be included within the hood, to provide light within the hood.

Extending out from the side walls (20) at the same level as the upper shelf (22) is a pair of handles (24). The handles (24) have projecting arms (25) which extend perpendicularly out from the side walls (20) and are then joined by a handle grip (26). Along the projecting arms (25) are tool storage compartments (28) made from molded rubber retaining arms and receptacles, and grooves (30) for attachable side storage compartments (32) to attach to the handles (24). The handles also create an attachment location for a storage caddy (34) to be placed on the cart (10). Attached to the handle grips (26) are hooks (52) for attaching cleaning tools.

On the underside of the base (12), there is a lower storage compartment (60) with a pull-out tray (62) to allow for additional storage. At the corners of the base (12), there are corner brackets (54) extending downward from the base (12). The brackets (54) are housings for the corner rollers (56), which provide adjustable shock absorption and have impact indicators to prevent the cart (10) from causing damage to walls when pushed through a building. The corner rollers (56) extend downward so that the rollers (56) will contact base trim along a wall instead of contacting the wall surface. Strengthening ribs 74 are formed throughout the bottom of the plastic portions of the housekeeping cart to add strength and rigidity to the structures.

Figure 66:
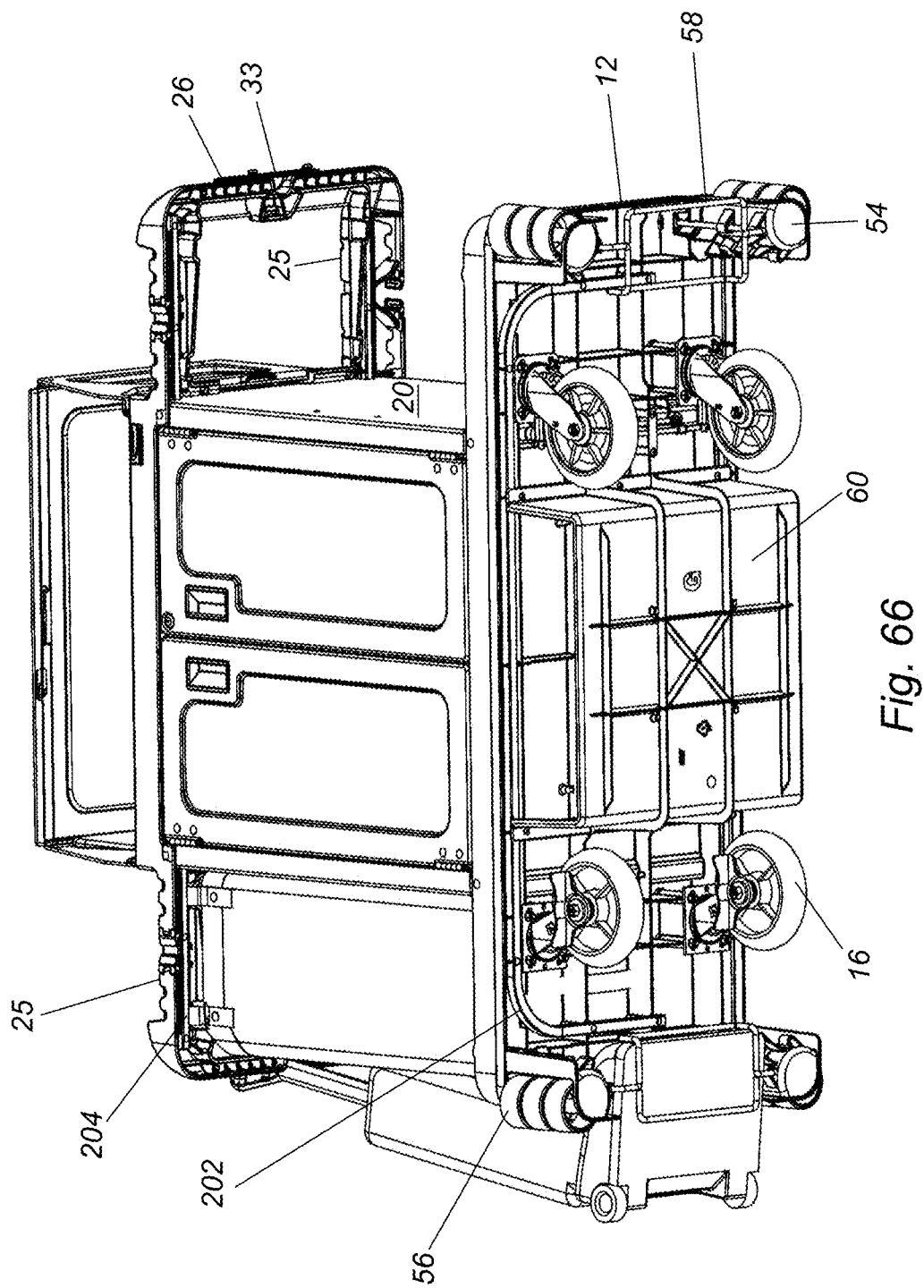
FIG. 66 is a bottom isometric view illustrating an embodiment of the housekeeping cart that includes metal reinforcement cage.
Figure 67:
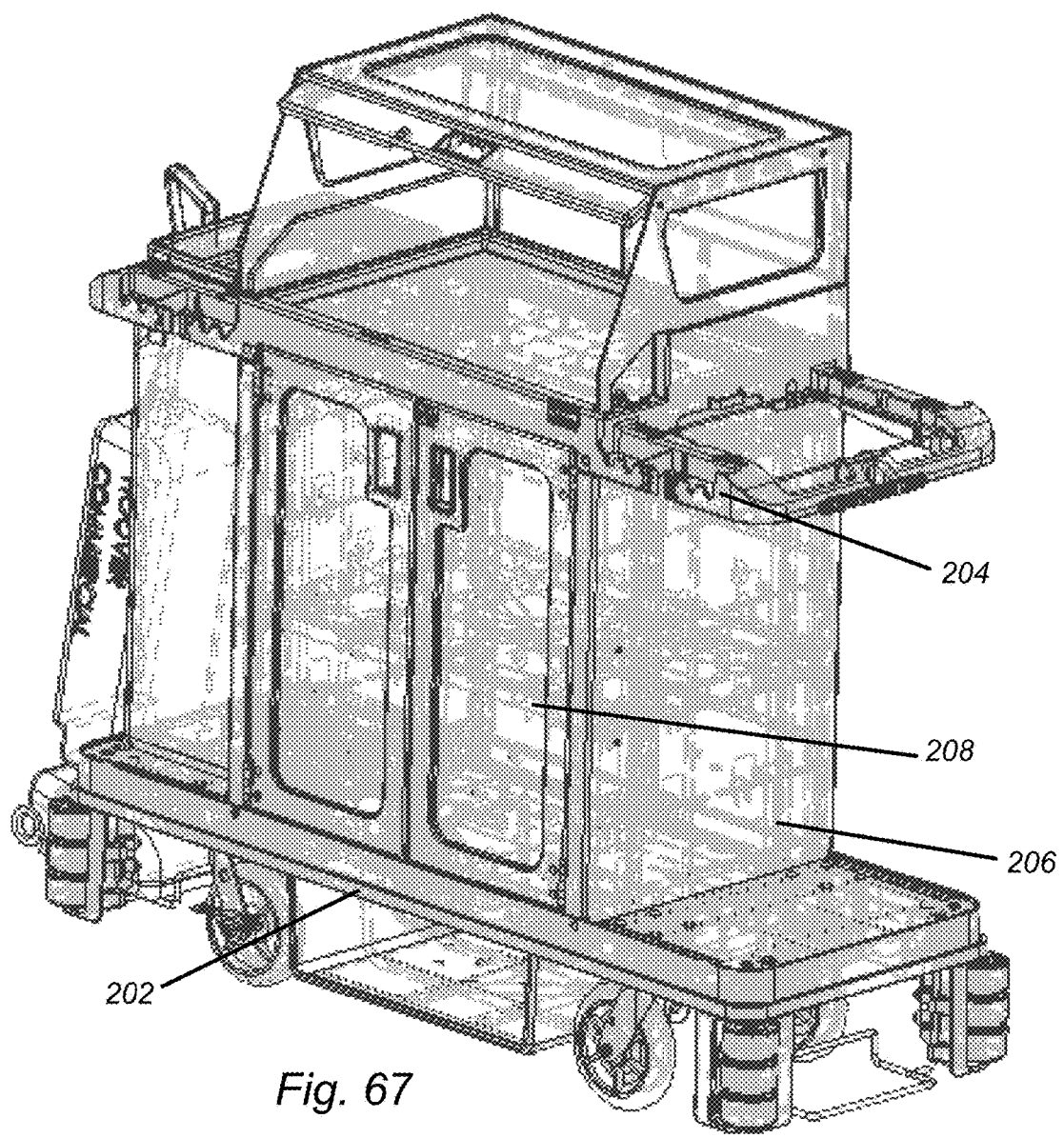
FIG. 67 is a partial side isometric view illustrating the metal reinforcement cage including shelf supports.
Figure 68:
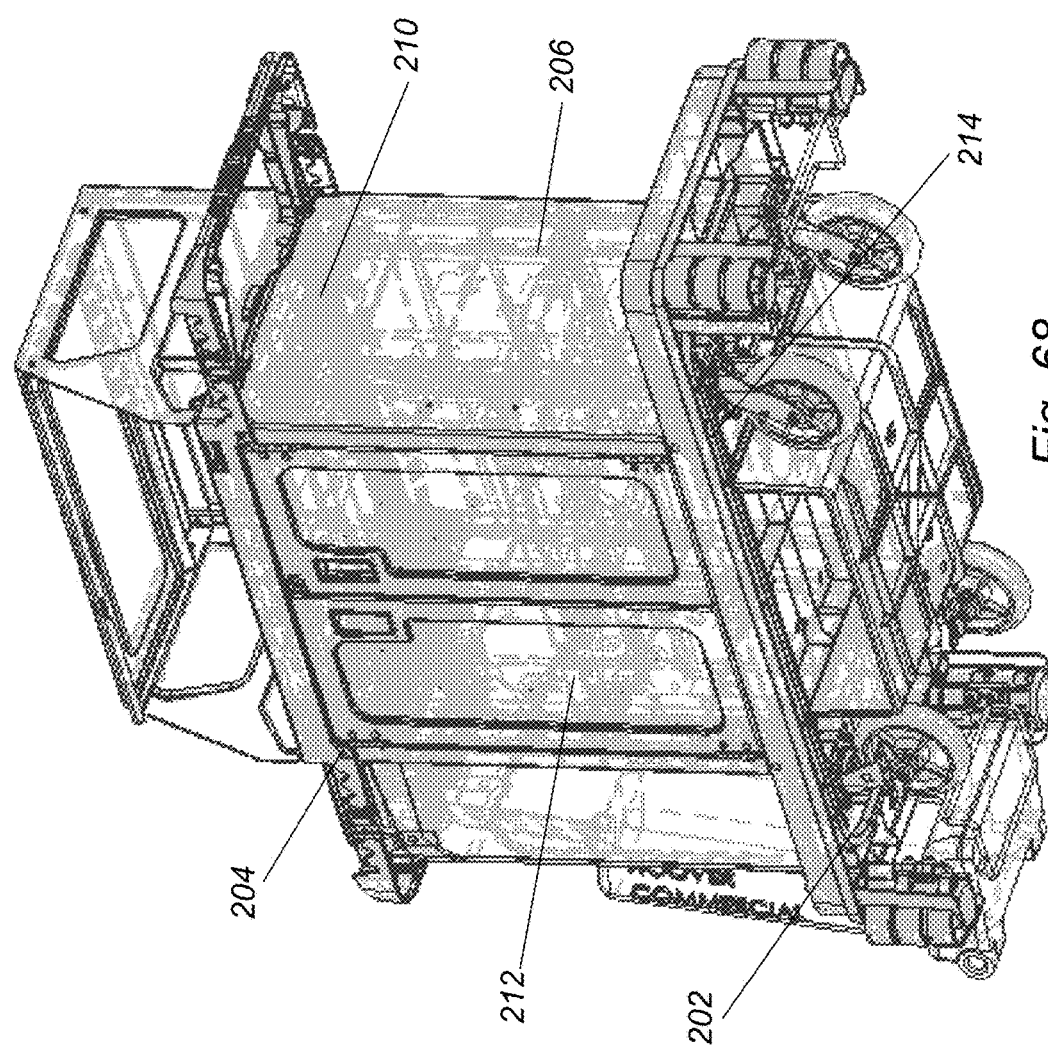
FIG. 68 is a partial bottom isometric view illustrating the metal reinforcement cage including shelf supports.

FIGS. 66-68 illustrate embodiments of the housekeeping cart (10) that include metal structural cage members (202-210). The structural cage members are constructed from metal material and secured to the plastic panels to add structural integrity and weight capacity to the entire housekeeping cart (10). In the preferred embodiment, the base structural element (202) is a tubular metal member constructed in the shape of a U and secured to the base (12) with fasteners or the like. In at least one embodiment, the base structural element (202) is formed as an elongated rectangle or a pair of U-shaped members that have their ends abutted or interlocked to extend completely around the bottom surface of the base (12). In this embodiment, the tubular element is formed as a square tube having a welded seam extending the length of the tube. The tube can bent with a crush bender, draw bender or the like so that the tube has a length and width that approximates the length and width of the base (12). The upper shelf (22) includes structural upper shelf members (204) which provide increased structural integrity and weight capacity to the upper shelf (22). The structural upper shelf members (204) are formed a tubular members that extend along the bottom surface of the upper shelf (22) and the projecting arms (25). While not illustrated it is contemplated that the structural upper shelf members (204) may include curves or cross tie members (210) to provide support to various areas of the upper shelf (22). The structural upper shelf members (204) thereby tie the projecting arms (25) to the upper shelf (22) and extend generally parallel to the base structural element (202). The structural upper shelf members (204) may be snapped into conjugate shaped sockets provided in the lower surface of the upper shelf (22) whereby they are held in place with fasteners integrally formed into the bottom surface of the upper shelf (22) or alternatively, fasteners such as screws or the like may be used without departing from the scope of the invention. Vertical structural members (206) may be provided to extend along the inner surface of the side walls and generally aligned with the structural upper shelf members (204) and the base structural element (202) which allows the vertical structural members (206) to tie the structural upper shelf members (204) and the base structural element(s) (202) together to create a structural cage assembly (214). The structural cage assembly (214) can thereby provide rigidity and structurally enhance the entire housekeeping cart assembly (10). The structural cage assembly (214) can be tied together with fasteners or via weldment or the like without departing from the scope of the invention. In some embodiments, portions of the plastic panels are sandwiched between the members of the structural cage assembly which further strengthens the housekeeping cart (10). Additional structural metal members may be provided such as structural shelf support members (212) which add further bracing to the overall structural cage (214) in addition to providing added weight capacity to the shelf or shelves. It should also be noted that while the metal structural members are illustrated as tubular members, angle iron or other bent formed shapes of metal may be utilized without departing from the scope of the invention.

On opposite sides of the cart (10), crossbars (58) extend between the brackets (54). The crossbars (58) can be used to attach a vacuum cleaner to the cart (10), so that a user of the cart (10) can move the cart (10) with a vacuum cleaner attached.

As shown in FIGS. 8-14, the cart (10) is shown in a more basic configuration, allowing internal shelving to be visible. From these figures, it can be seen that a shelf (66) is positioned between the side walls (20) to hold additional supplies. The shelf (66) can be on a track (68), allowing the height of the shelf (66) to be adjusted. The shelf (66) can be adjusted with spring loaded locking pins (not shown), allowing for horizontal or vertical orientation.

Figure 15:
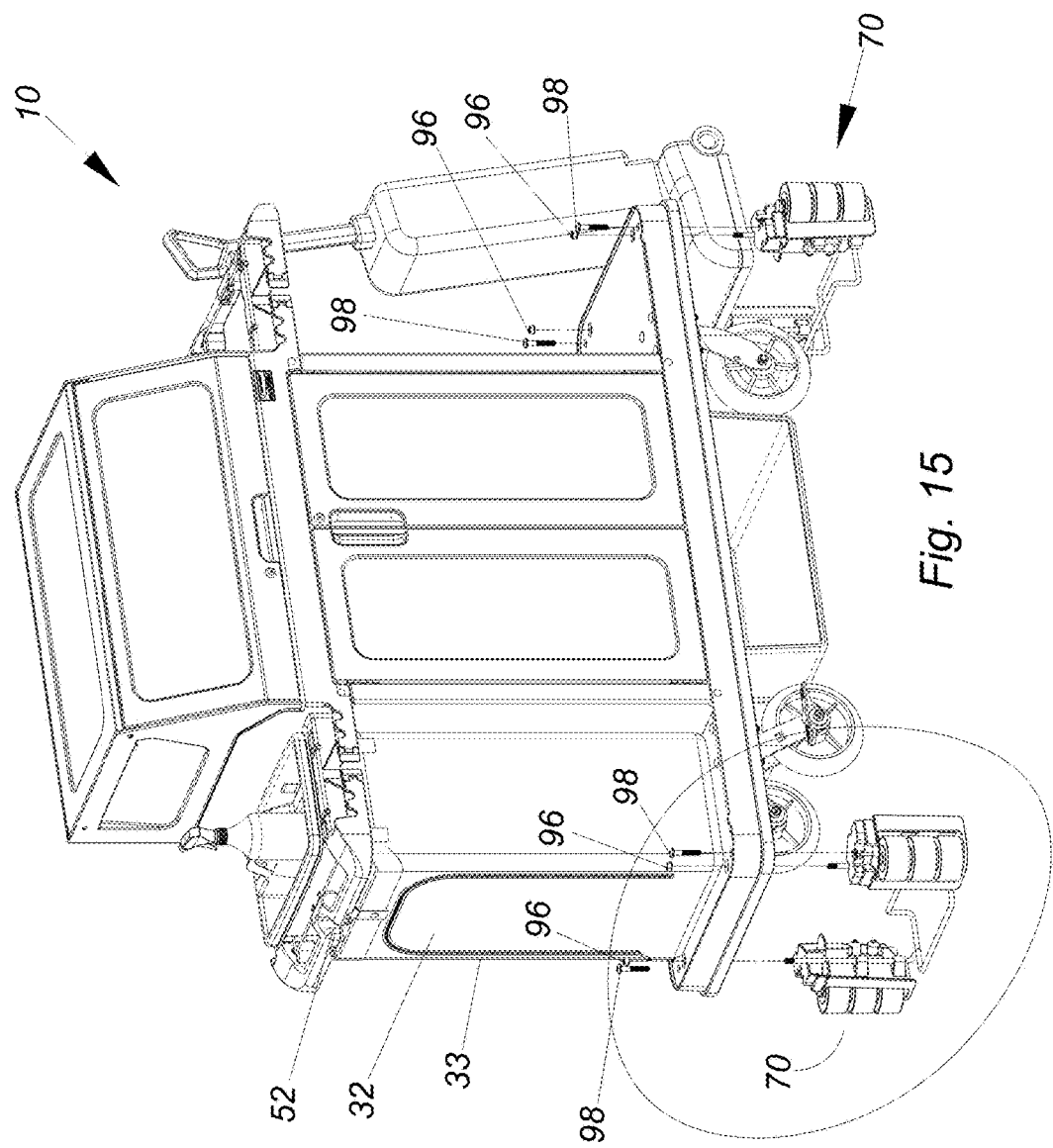
FIG. 15 is a top right perspective view of an alternate embodiment of the present invention, highlighting the attachment of the bumper assembly.

FIG. 15 depicts how the bumper assembly (70) attaches to the cart (10). As shown, a bumper assembly (70) can attach on both ends of the cart (10) to protect walls, etc. from all four corners of the cart (10). The assembly (70) attaches with relative ease, inserting up through the base (12). The assembly (70) is then secured to the base (12) by bolts (98) and nuts (96).

Figure 16:
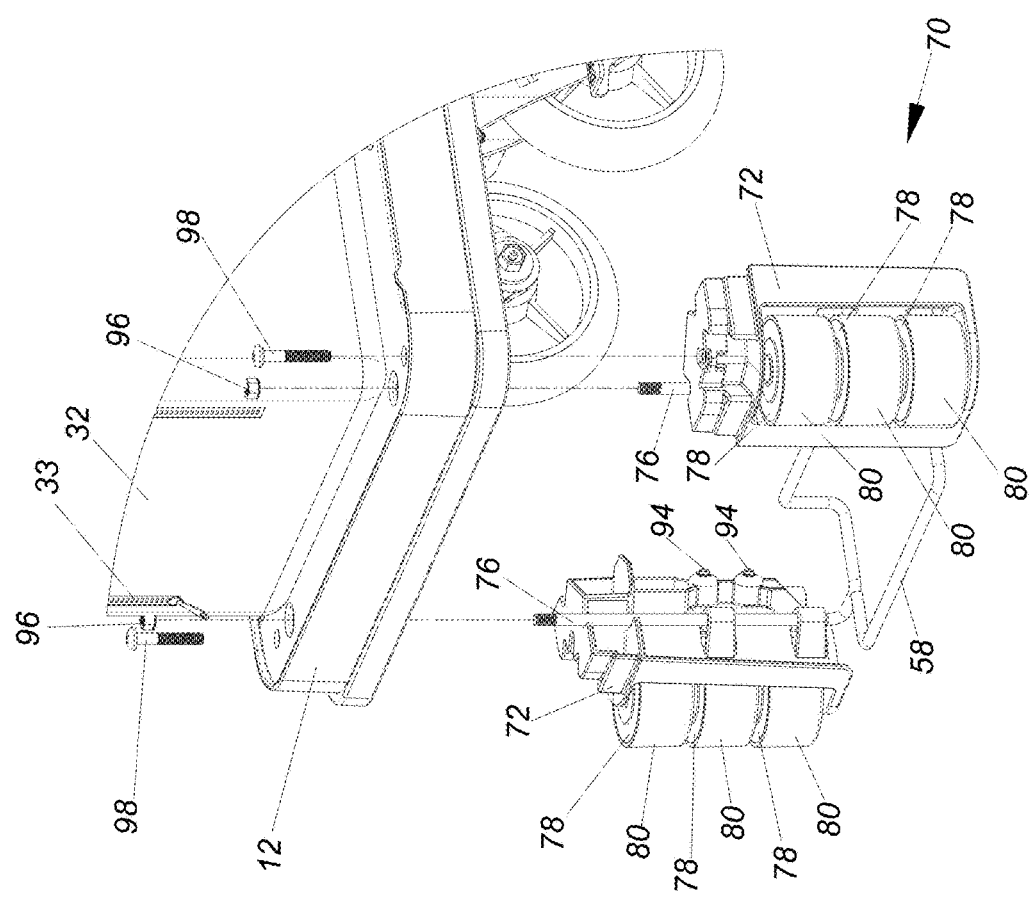
FIG. 16 is a close up perspective view of the attachment of a bumper assembly.
Figure 17:
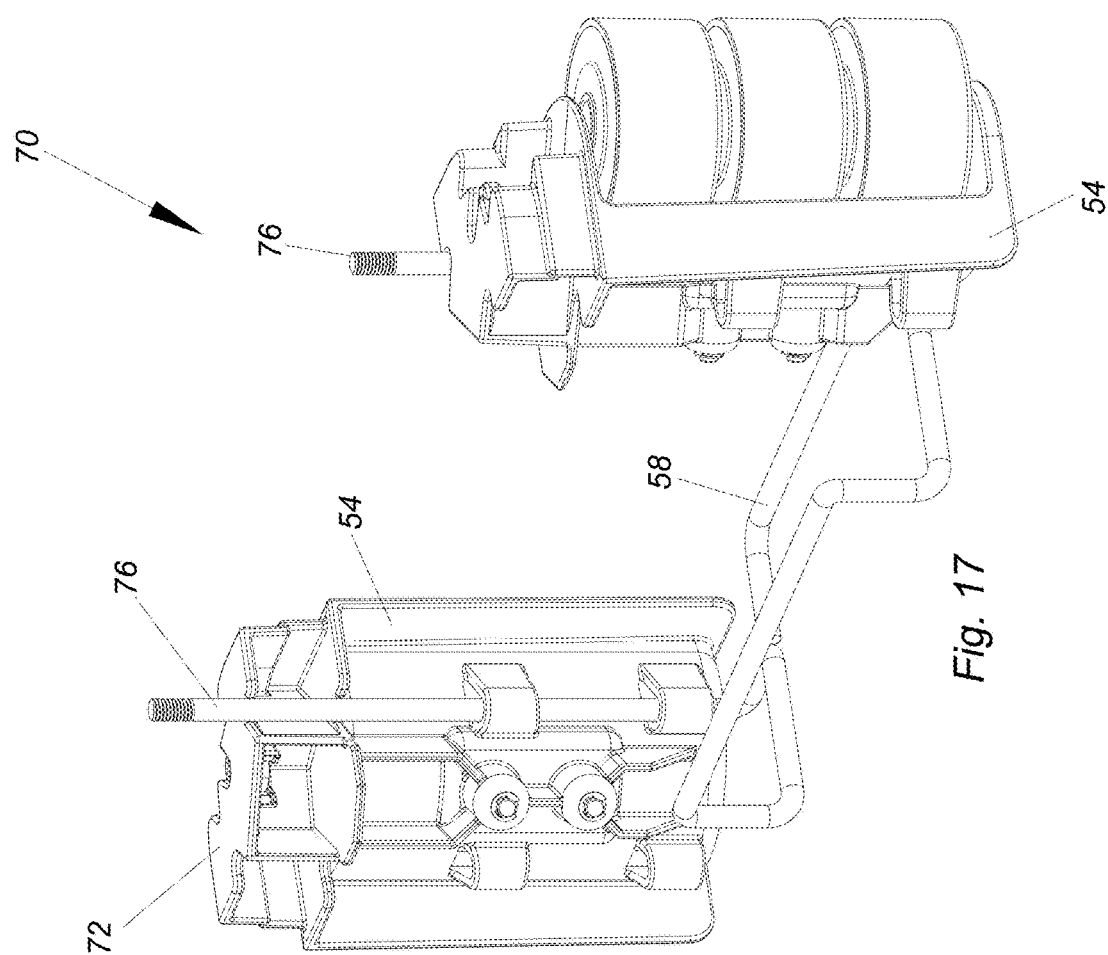
FIG. 17 is a rear perspective view of a bumper assembly.
Figure 18:
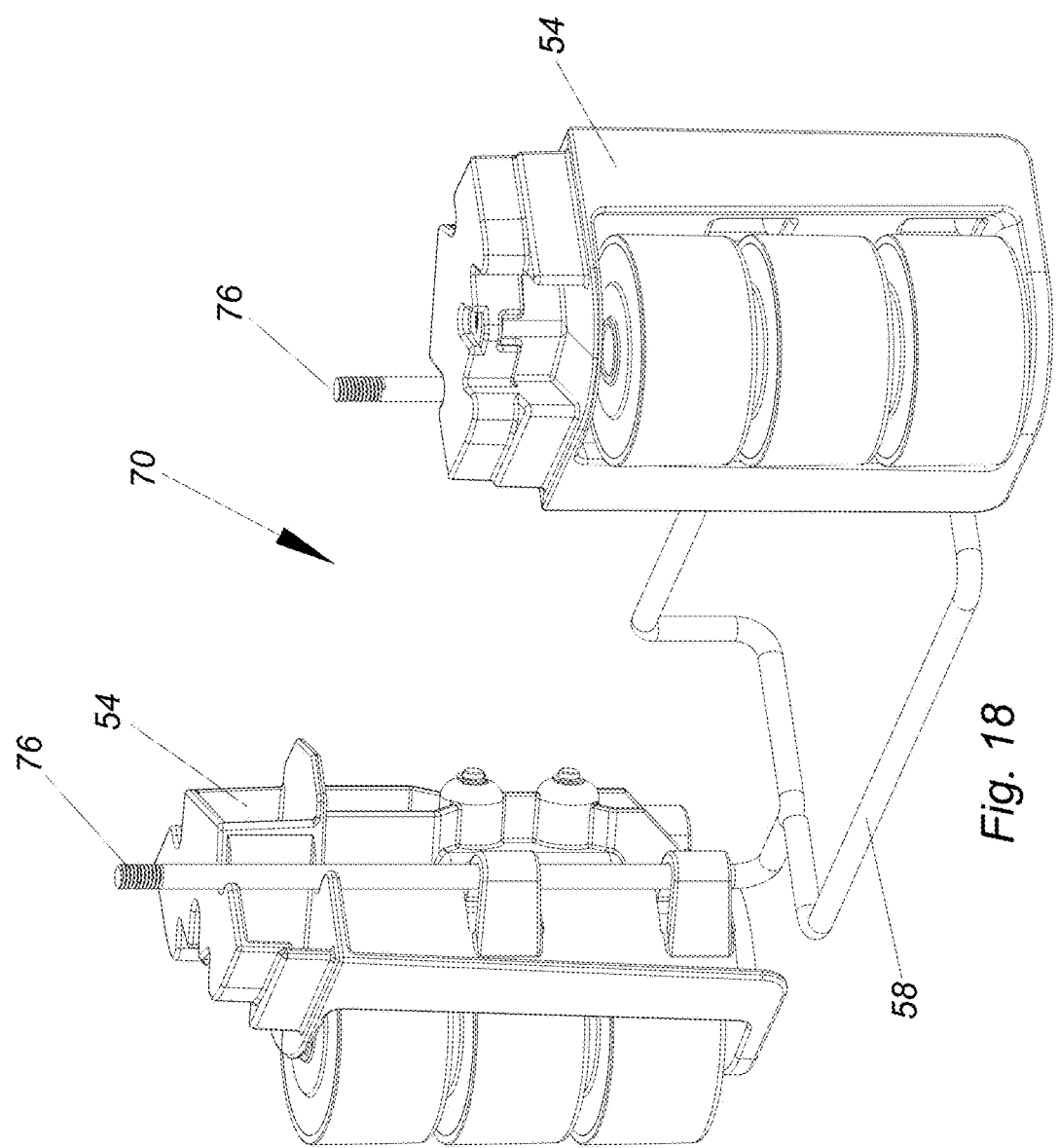
FIG. 18 is a front perspective view of a bumper assembly.
Figure 19:
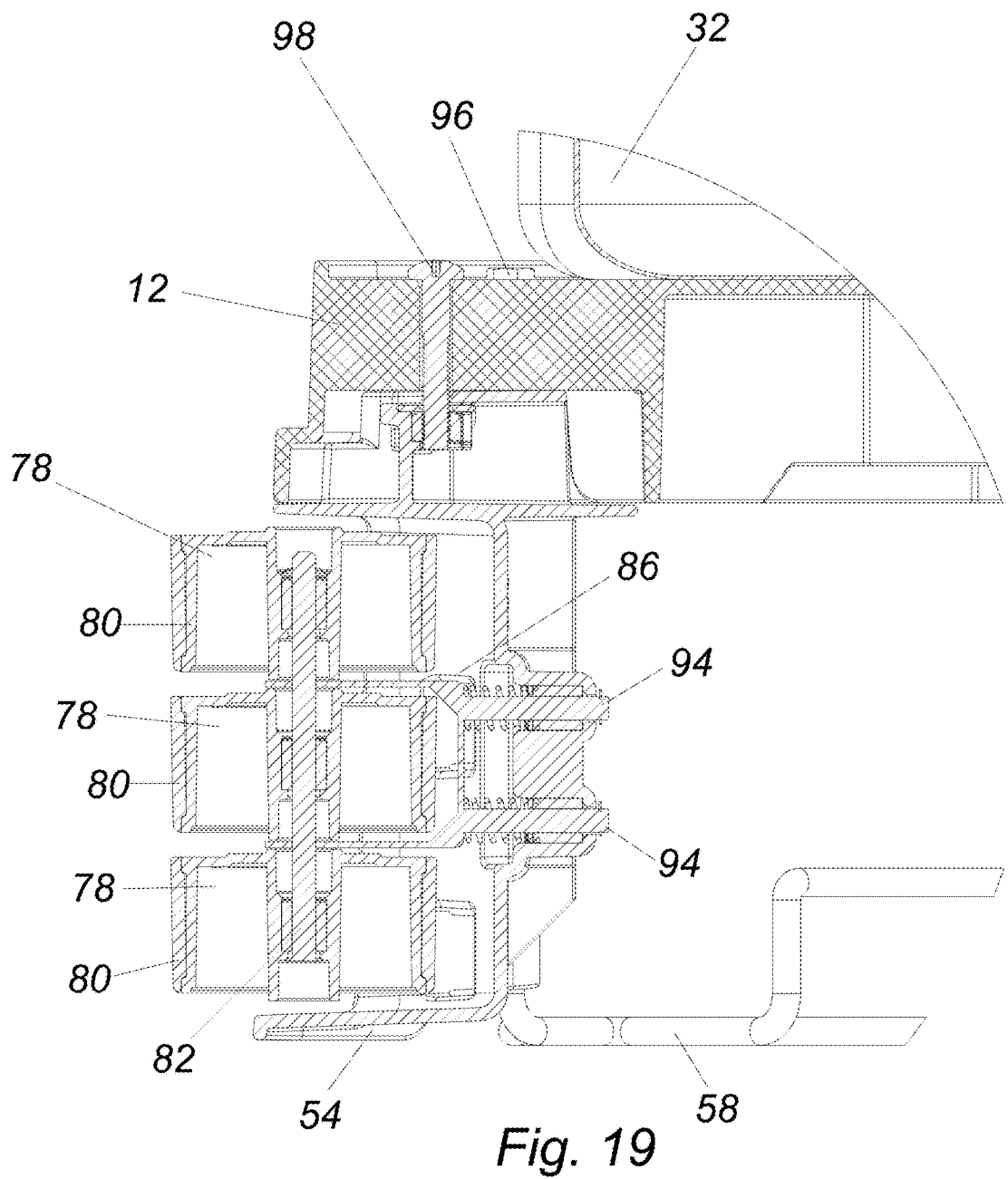
FIG. 19 is a cross sectional view of a bumper assembly attached to the housekeeping cart.

FIG. 16 illustrates one bumper assembly (70) and its attachment to the base (12) in greater detail. The assembly (70) has two bumper housings (72) connected by a metal bar extending between the housings, serving as the vacuum storage bar (58), with two vertical attachment bars (76), which the bumper housings (72) attach to. The vertical attachment bars (76) extend upward through the base (12), and are secured by nuts (96). As shown, bolt (98) extends down through the base (12) and attaches to each housing (72). To protect walls from the hard corners of the base (12), each housing (72) has a series of bumpers, each having an inner portion (78) with a padded outer portion (80). As seen in FIGS. 17-19, the corner brackets (54), which contain the bumper housings (72), are attached to the vertical attachment bars (76). The bumpers have an axle (82) passing through the inner portion (78), which also passes through a bumper attachment (86). The bumper attachment (86) has a pair of extensions which extend out through the back of the bumper housing (72) and are secured with clips (94). This holds the bumper housing (72) together for easy attachment to the base (12).

Figure 20:
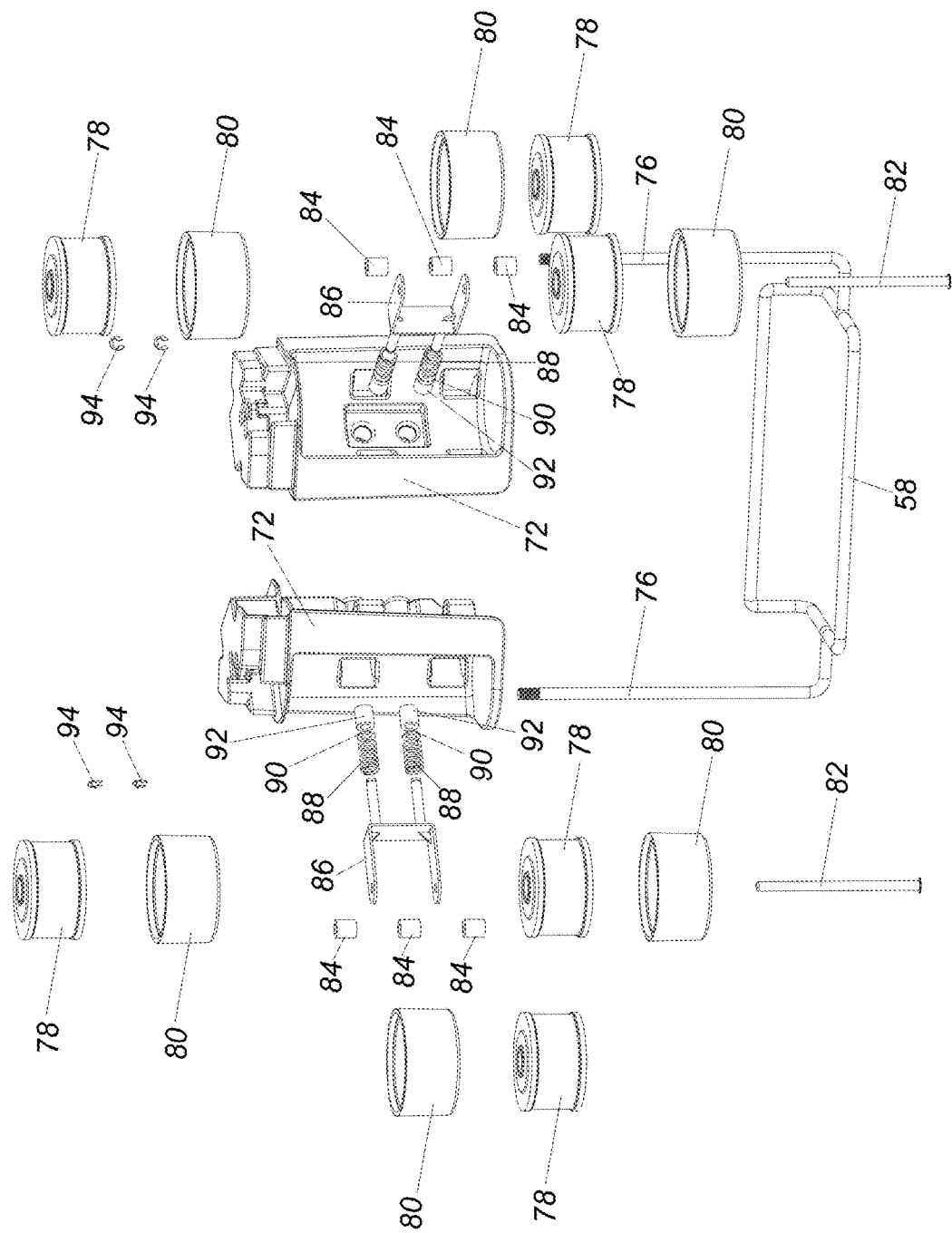
FIG. 20 is an exploded view of a bumper assembly.

FIG. 20 is an exploded view of various pieces of the bumper housings (72). FIG. 20 shows housings which contain 3 bumpers per housing. Axle (82) passes through each bumper, which has an inner portion (78) and padded outer portion (80), as well as bearings (84) and the bumper attachment (86). The bumper attachment member (86) has a pair of extensions which each extend through springs (88), washers (90), and spacers (92) before finally extending through the housing (72) itself. Clips (94) secure the bumper attachment member (86) to the housing (72). The pair of vertical attachment bars (76) and a vacuum storage crossbar (58) then attaches the housings (72) to the cart (not shown), as described above.

Figure 21:
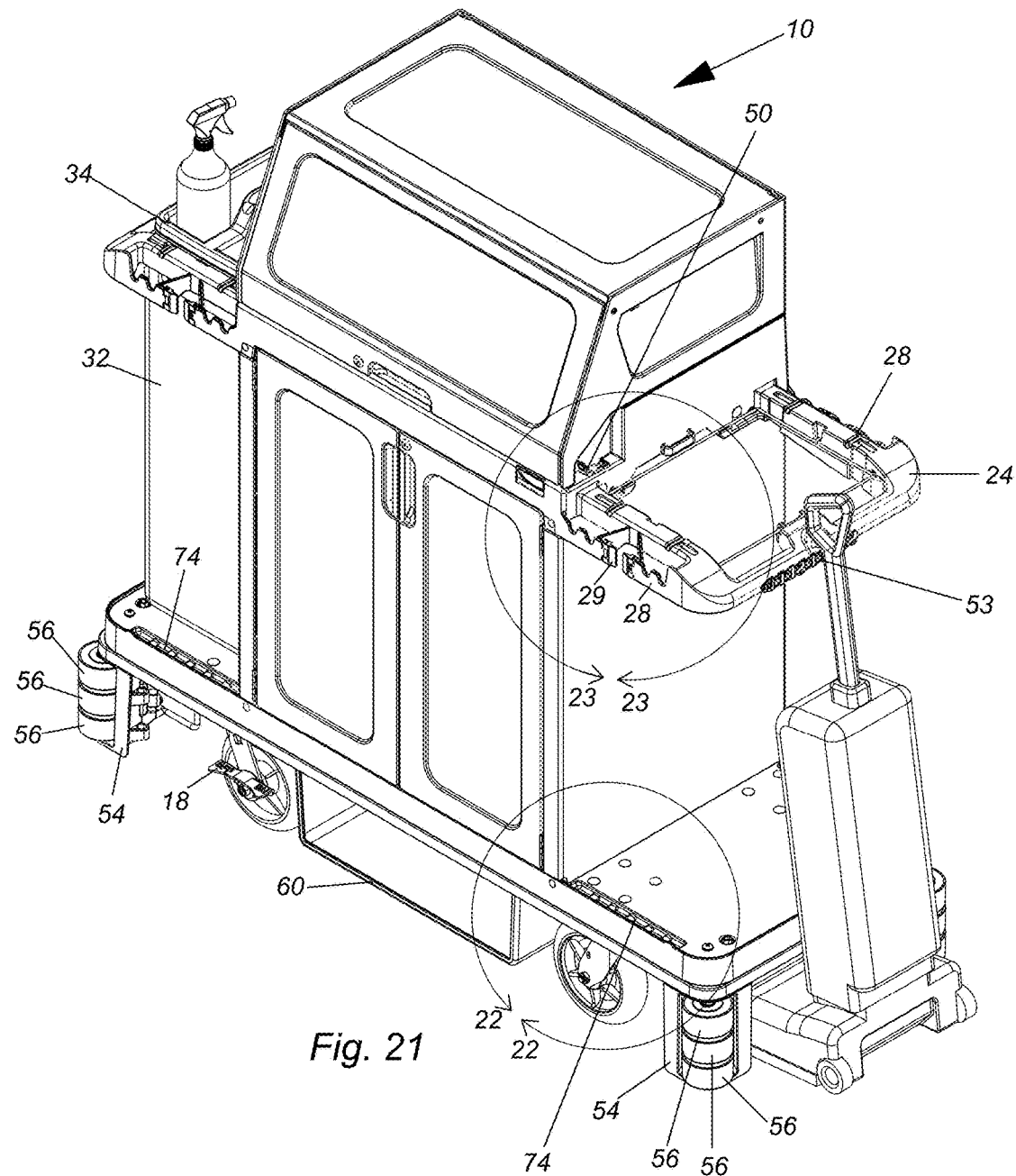
FIG. 21 is a top left side perspective view of the alternate embodiment of FIG. 15.
Figure 22:
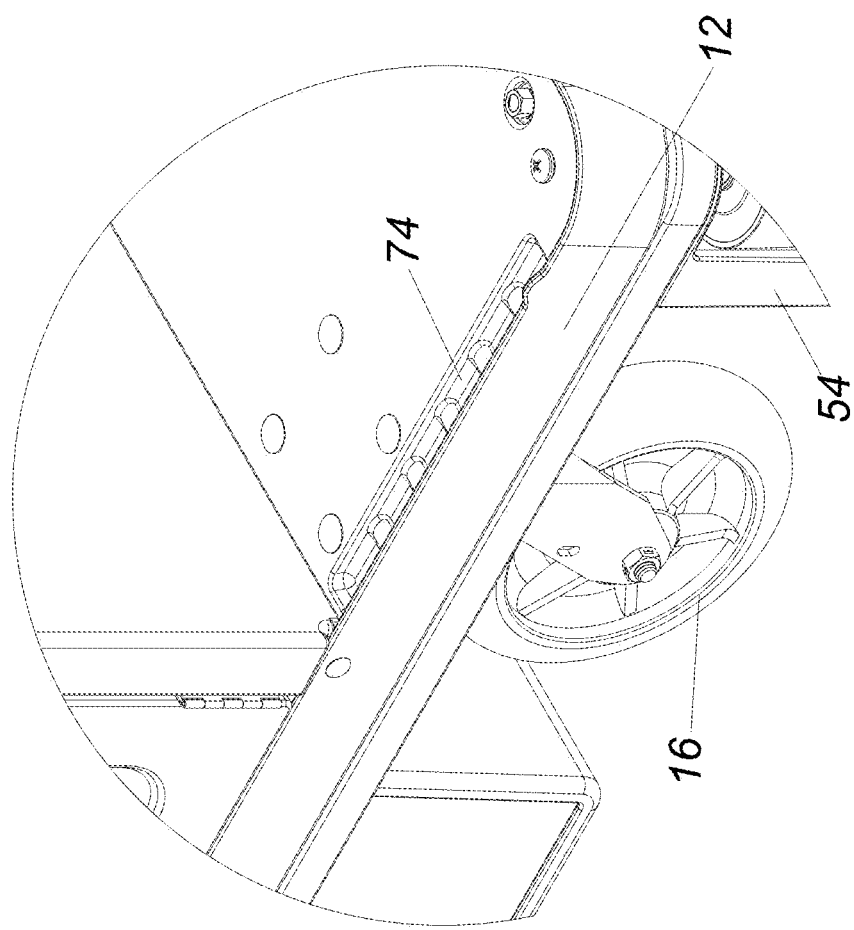
FIG. 22 is a partial isometric view of the drainage slots on the base of the housekeeping cart taken along line 22-22 of FIG. 21.
Figure 23:
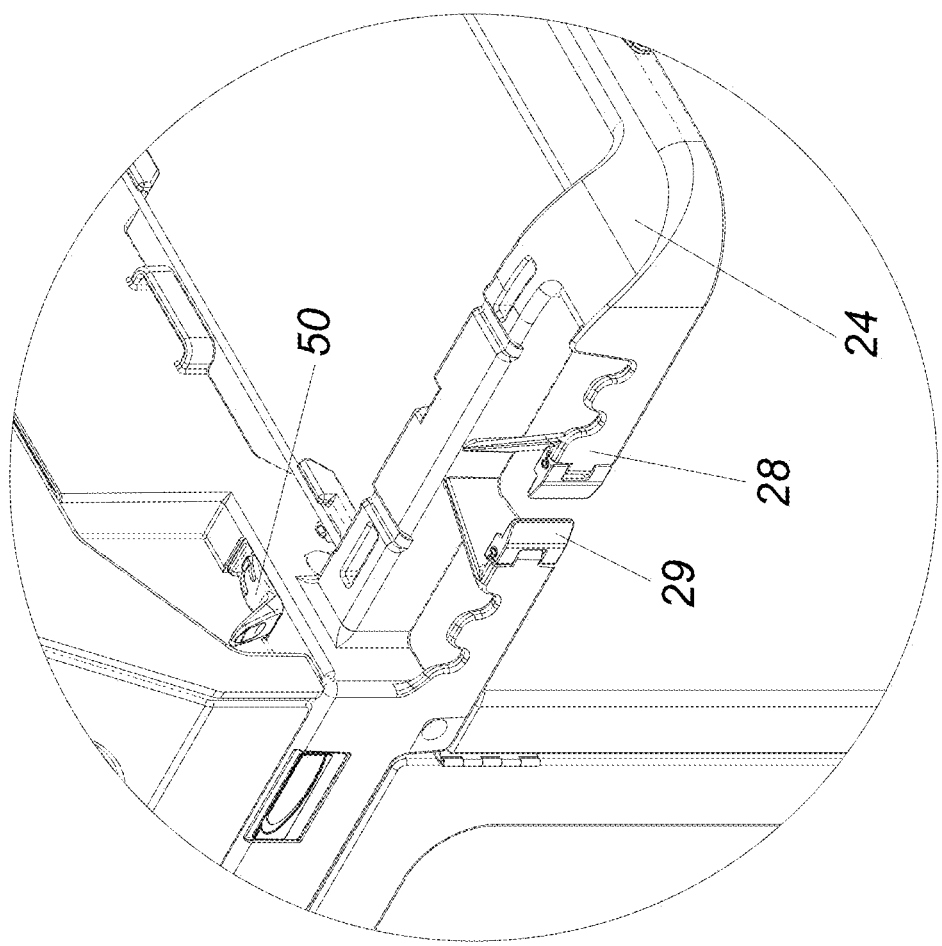
FIG. 23 is a partial isometric view of the handle tool storage attachments taken along line 23-23 of FIG. 21.
Figure 24:
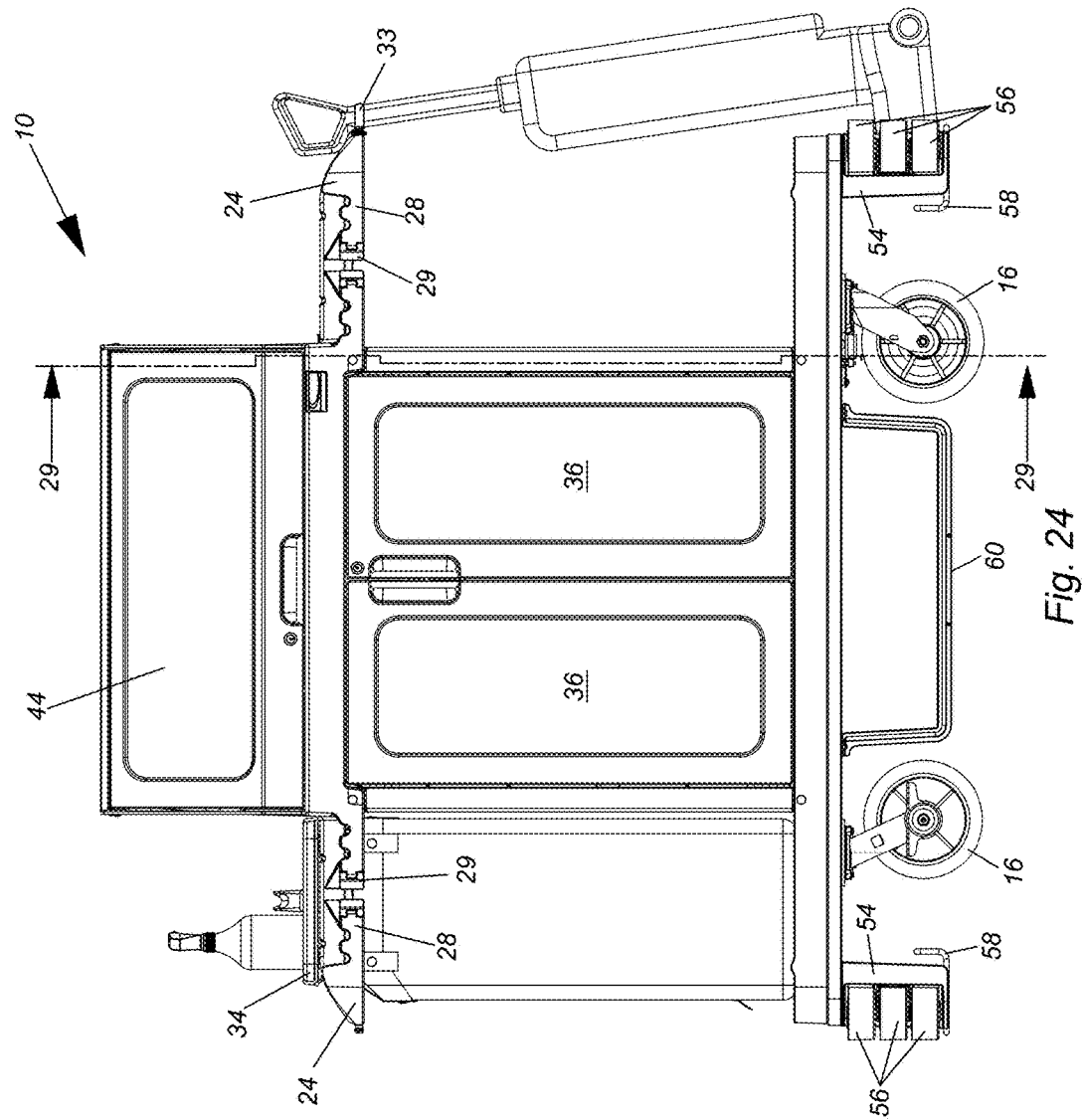
FIG. 24 is a front view of the embodiment of FIG. 15.
Figure 25:
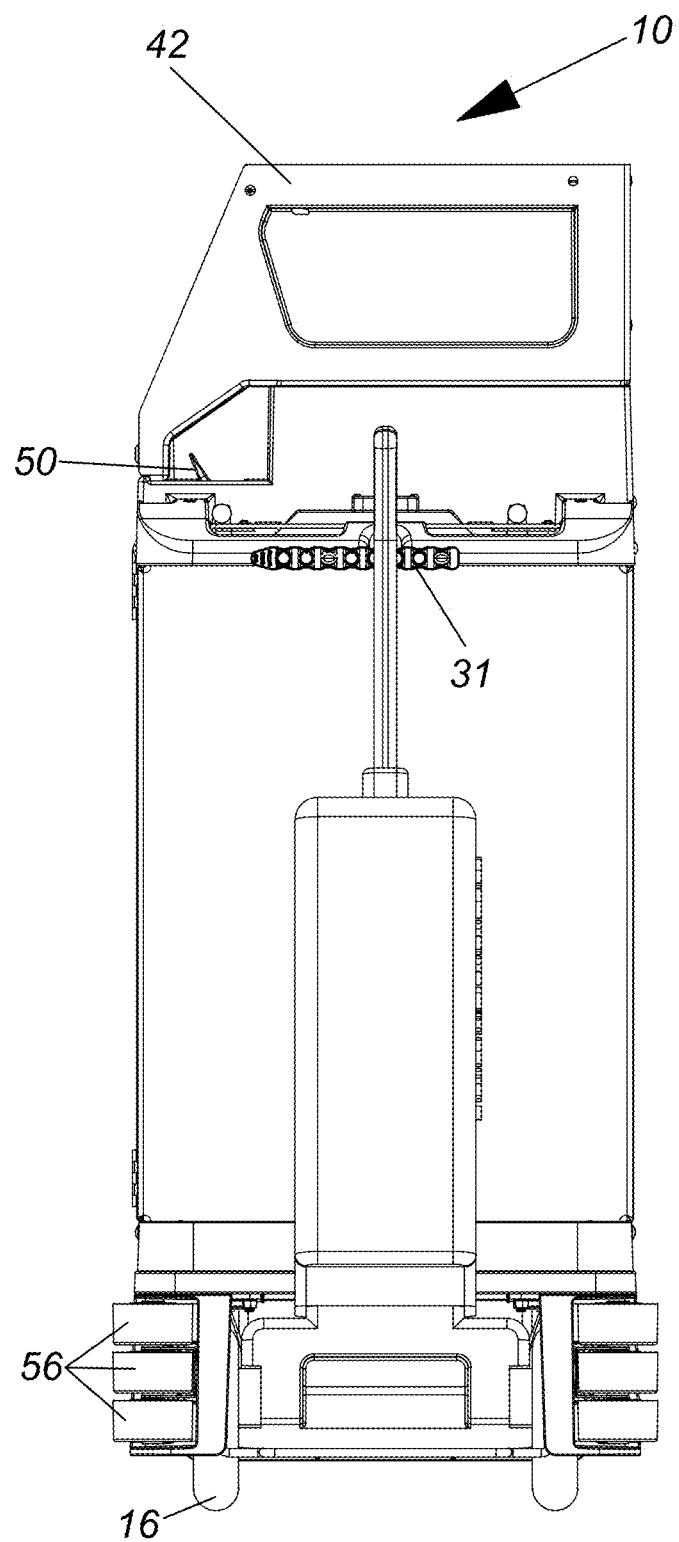
FIG. 25 is a left side view of the embodiment of FIG. 15.
Figure 26:
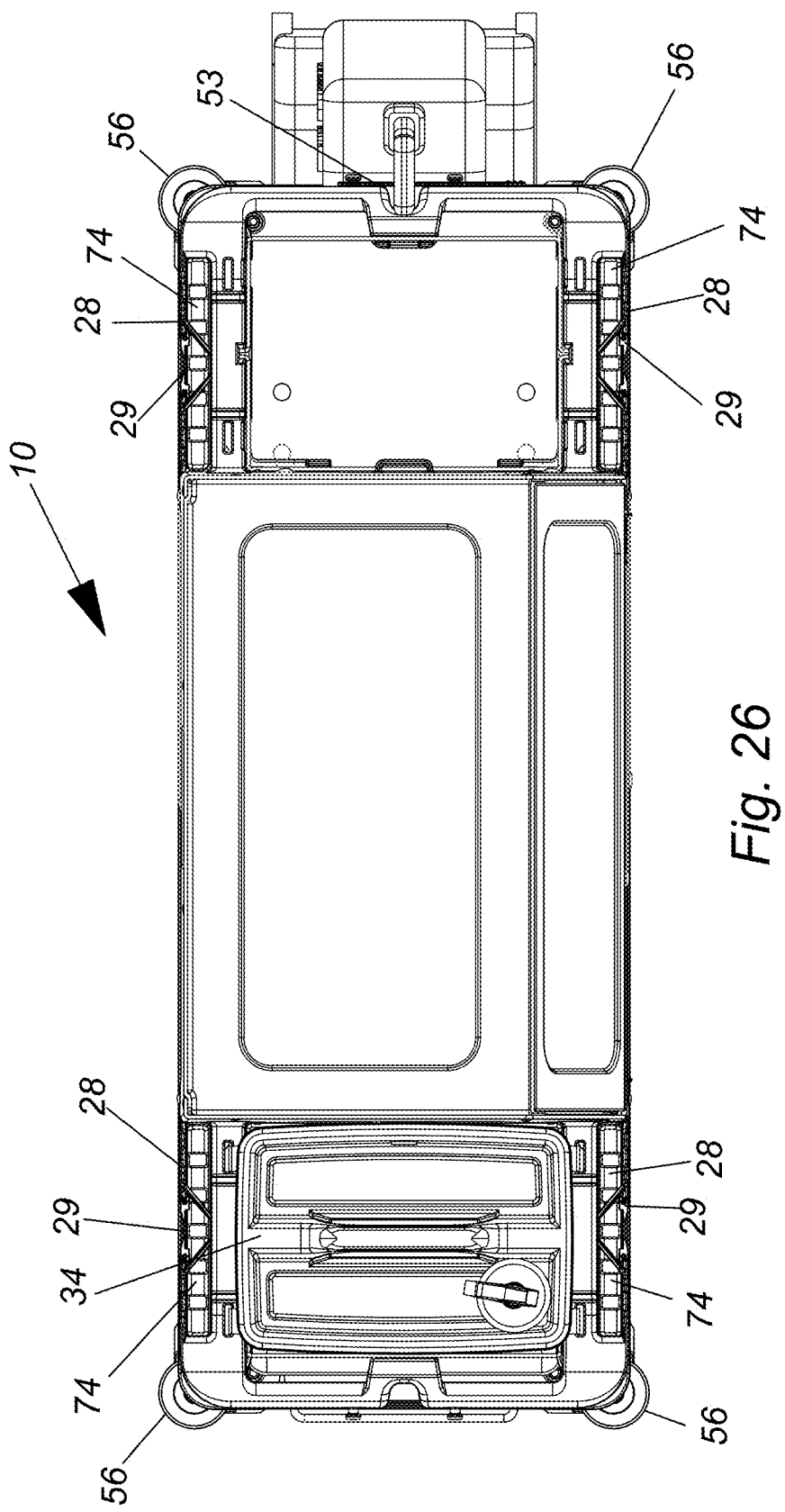
FIG. 26 is a top view of the embodiment of FIG. 15.
Figure 27:
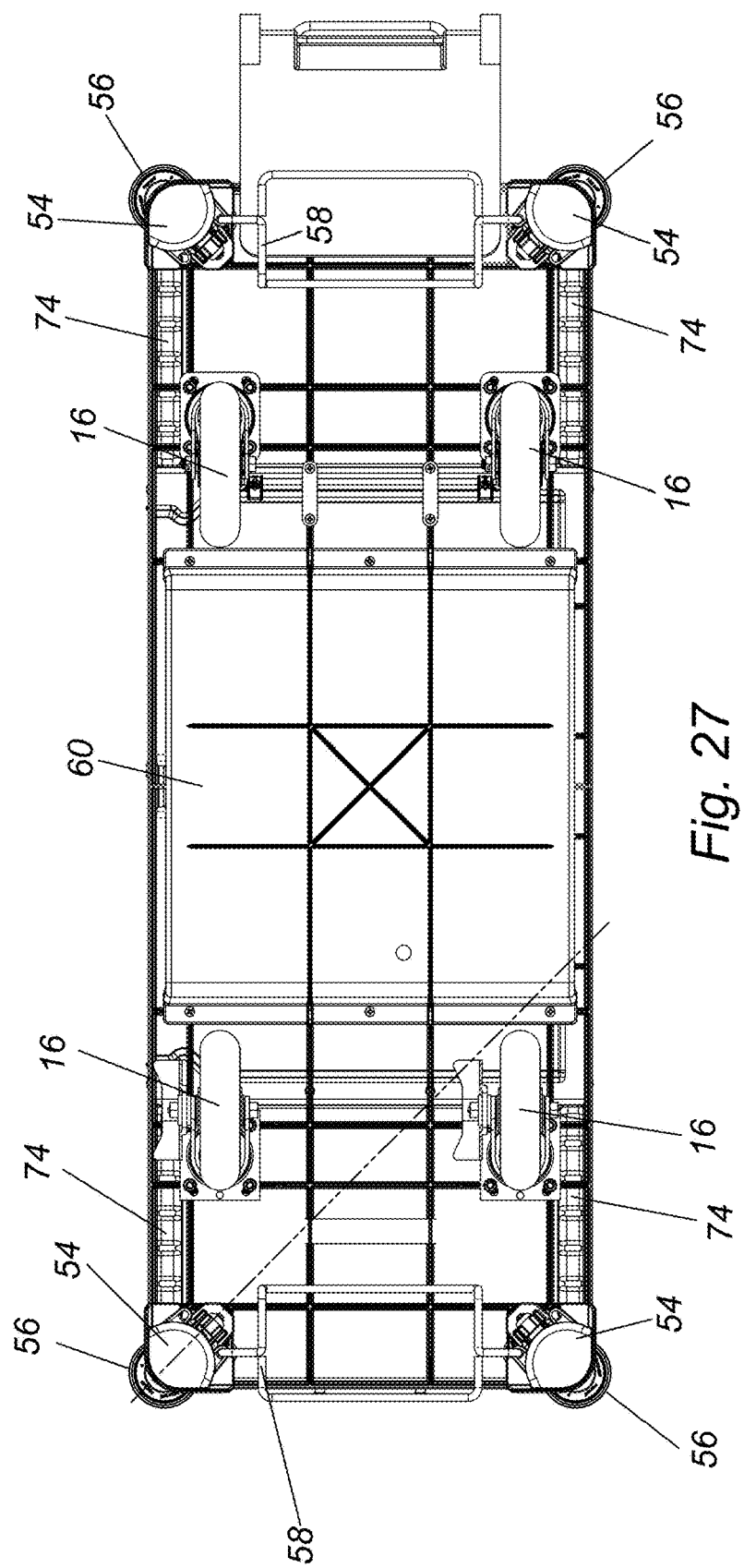
FIG. 27 is a bottom view of the embodiment of FIG. 15.
Figure 28:
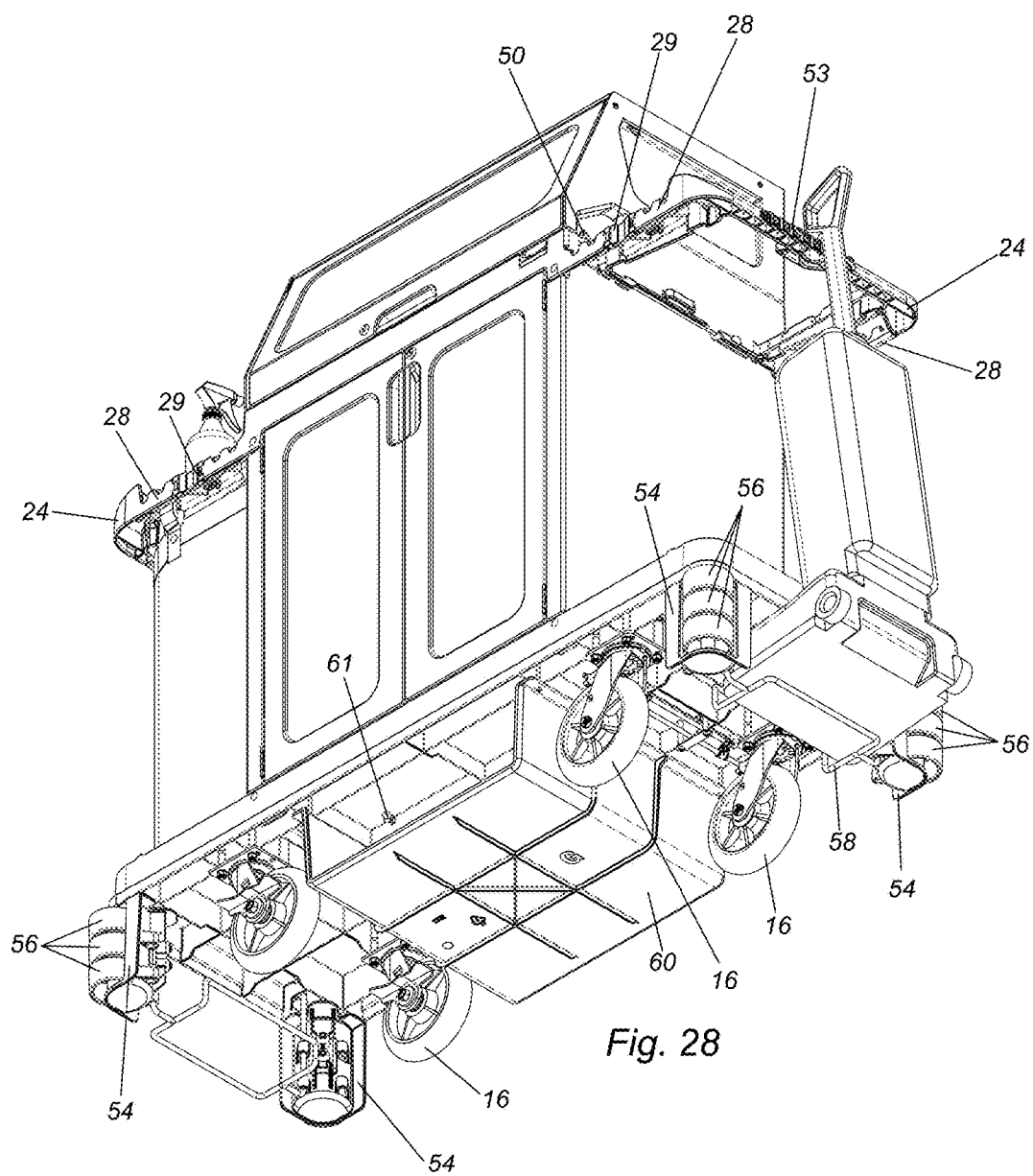
FIG. 28 is a lower left side perspective view of the embodiment of FIG. 15.
Figure 29:
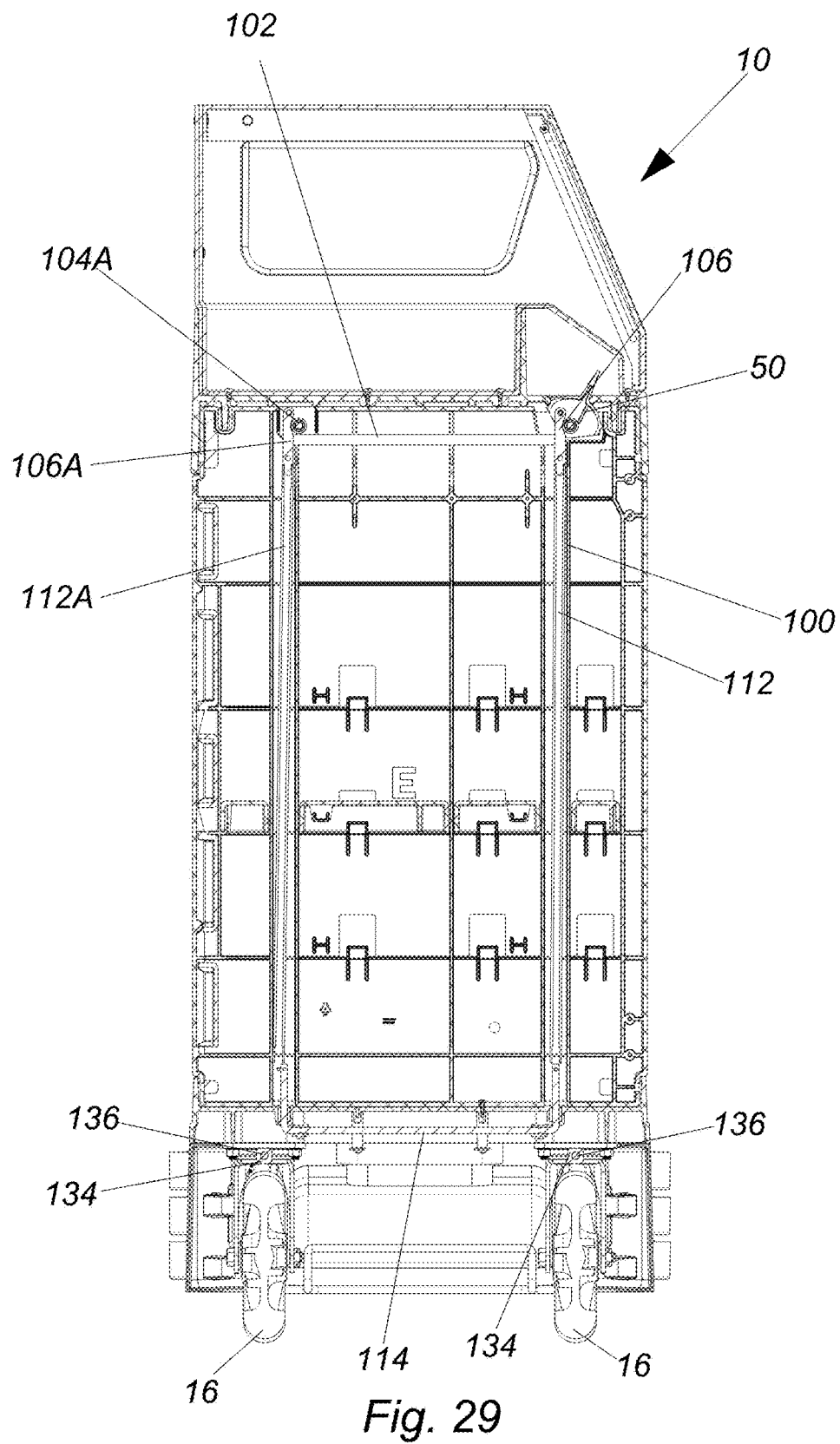
FIG. 29 is a right side cross sectional view of the embodiment of FIG. 15 taken along line 29-29 of FIG. 24.
Figure 30:
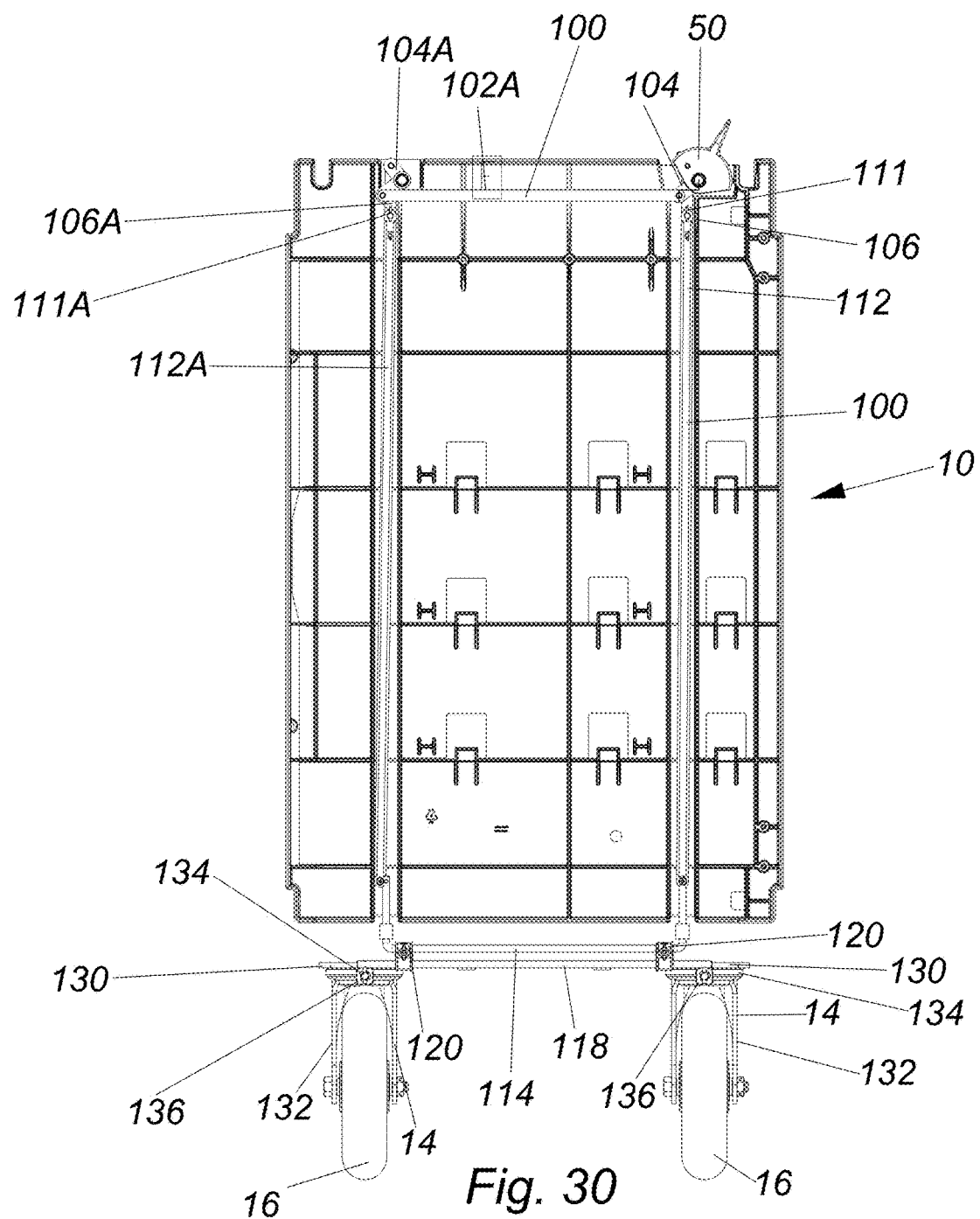
FIG. 30 is a right side cross sectional view of the embodiment of FIG. 15 with the bumper assembly and top hood removed to highlight the wheel lock mechanism.
Figure 31:
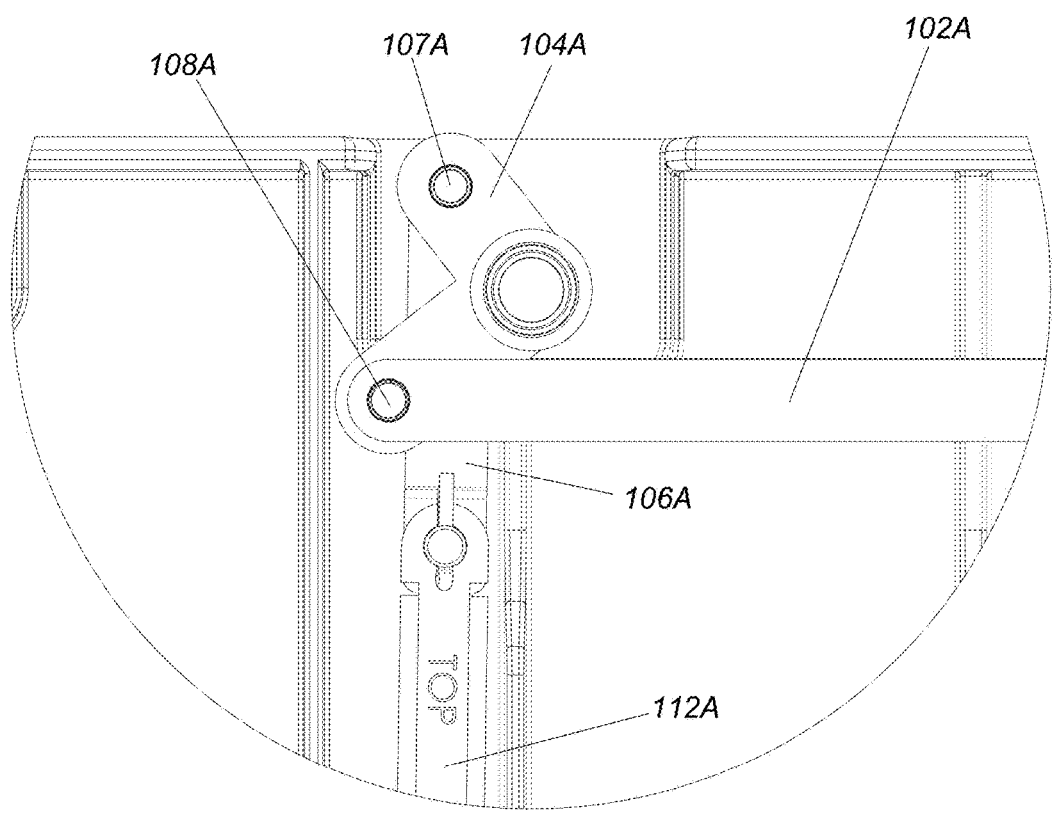
FIG. 31 is a detailed view of the top portion of the rear wheel caster lock mechanism in the locked position.
Figure 32:
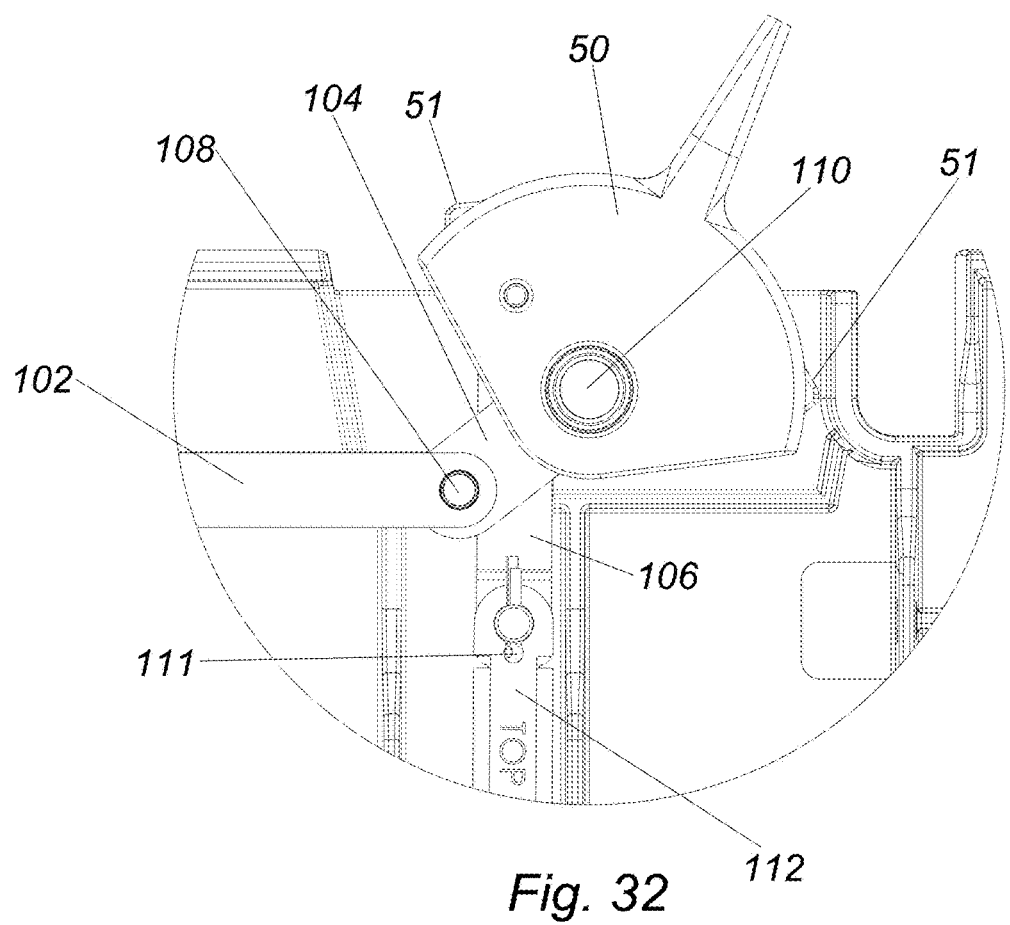
FIG. 32 is a detailed view of the wheel locking assembly.
Figure 33:
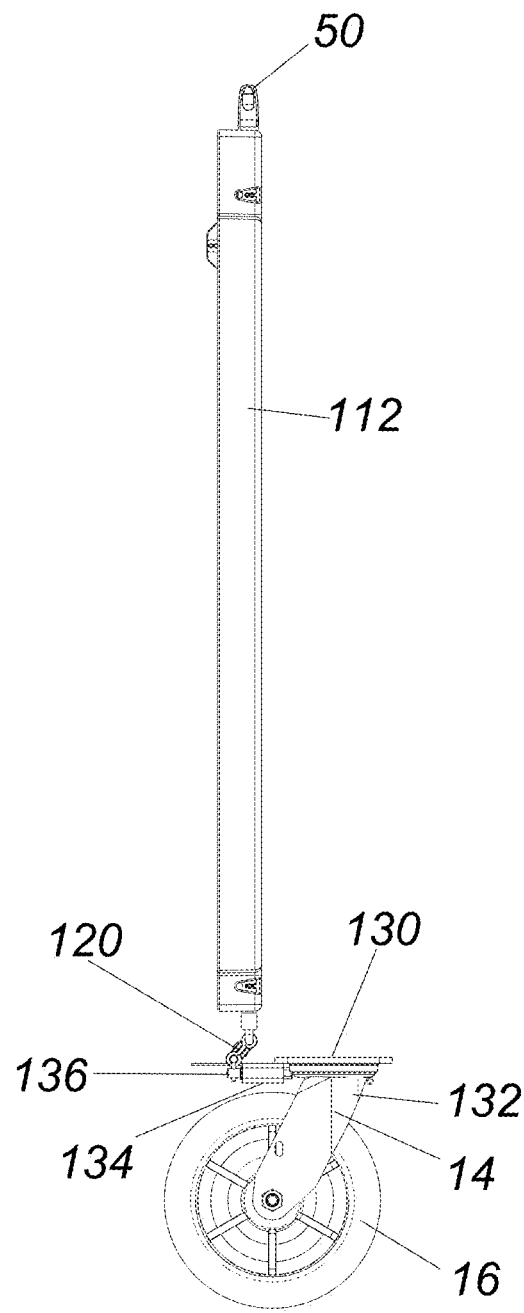
FIG. 33 is a side view of the wheel caster lock mechanism in the locked position.
Figure 34:
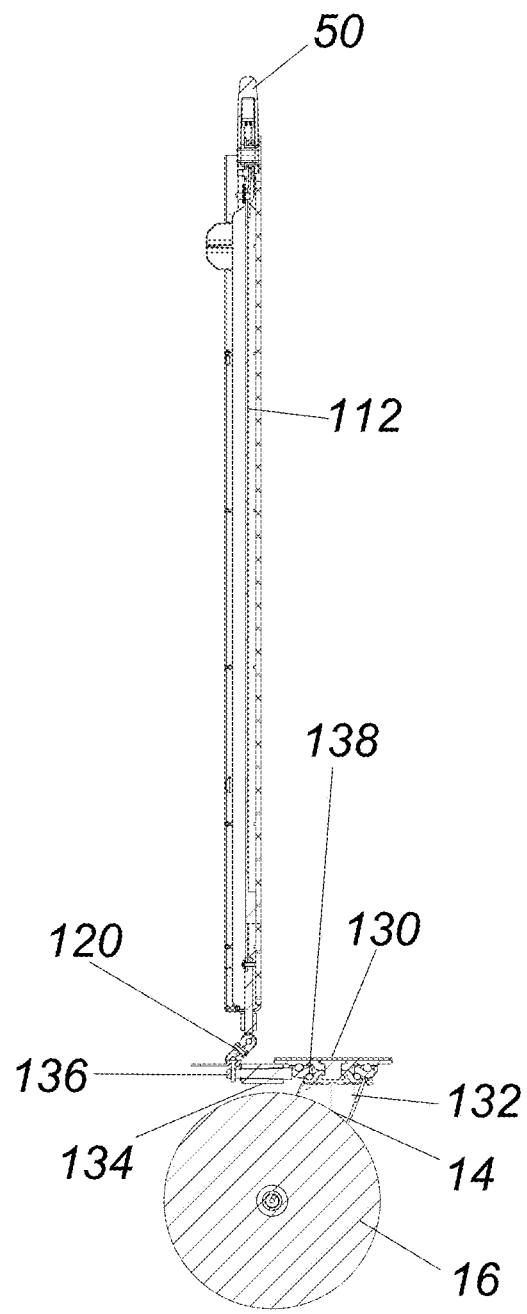
FIG. 34 is a cross sectional view of the wheel caster lock mechanism in the locked position.
Figure 35:
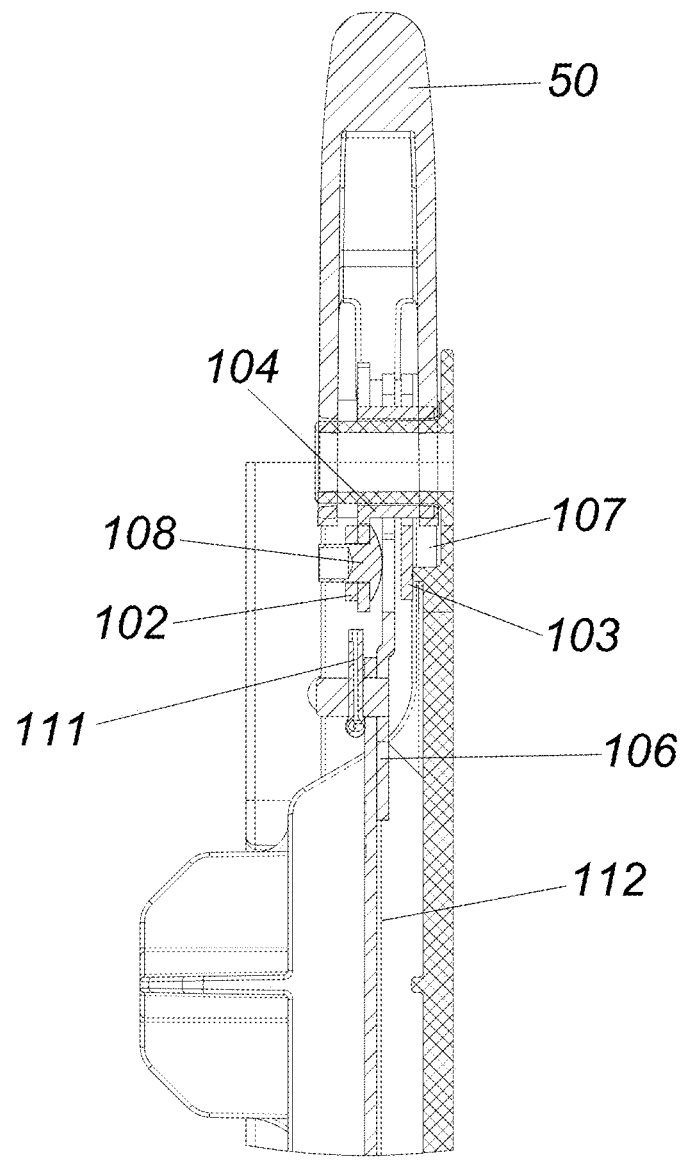
FIG. 35 is a detailed view of the top portion of the cross sectional view of the wheel caster lock mechanism in the locked position.
Figure 36:
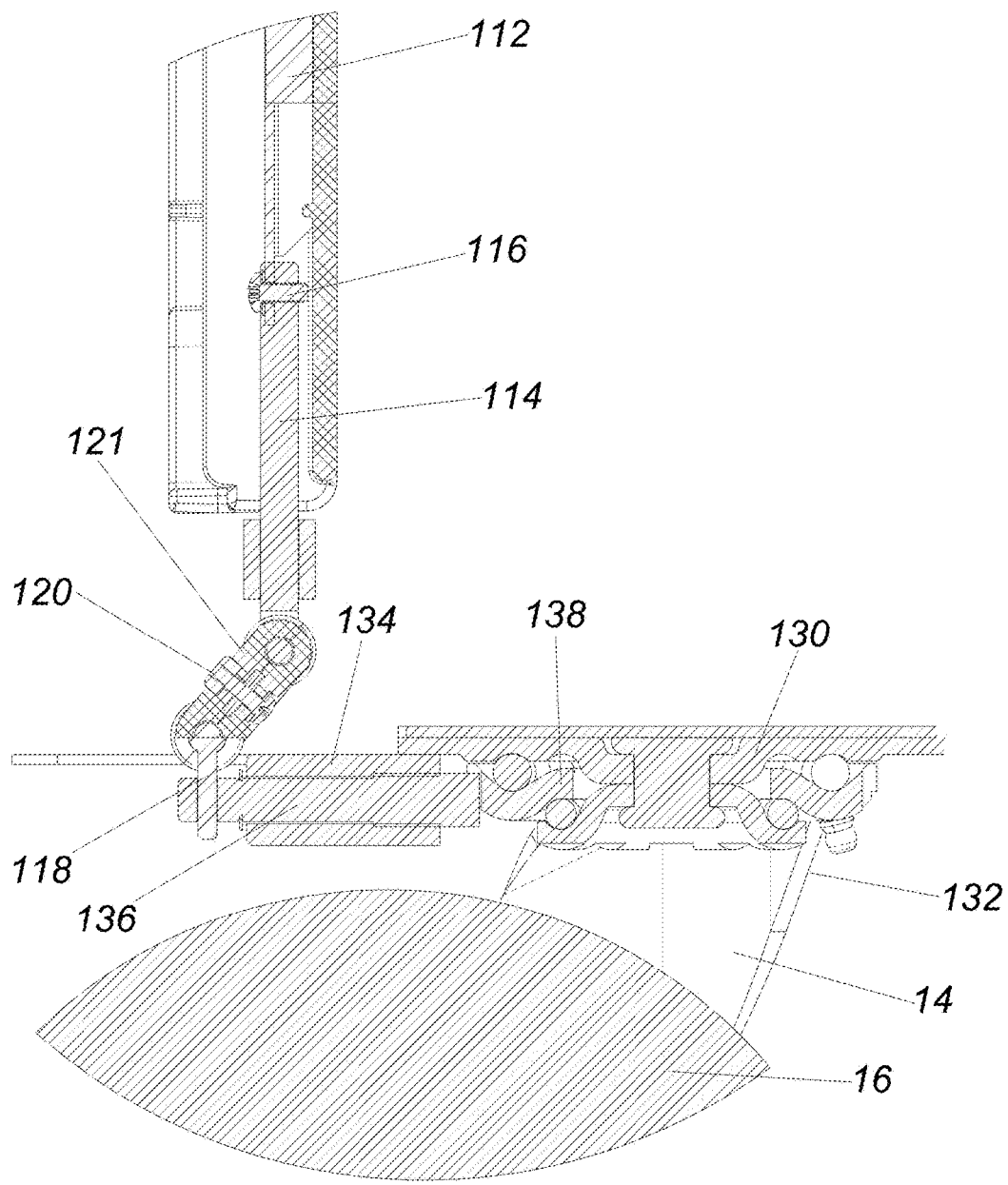
FIG. 36 is a detailed view of the lower portion of the cross sectional view of the wheel caster lock mechanism in the locked position.
Figure 37:
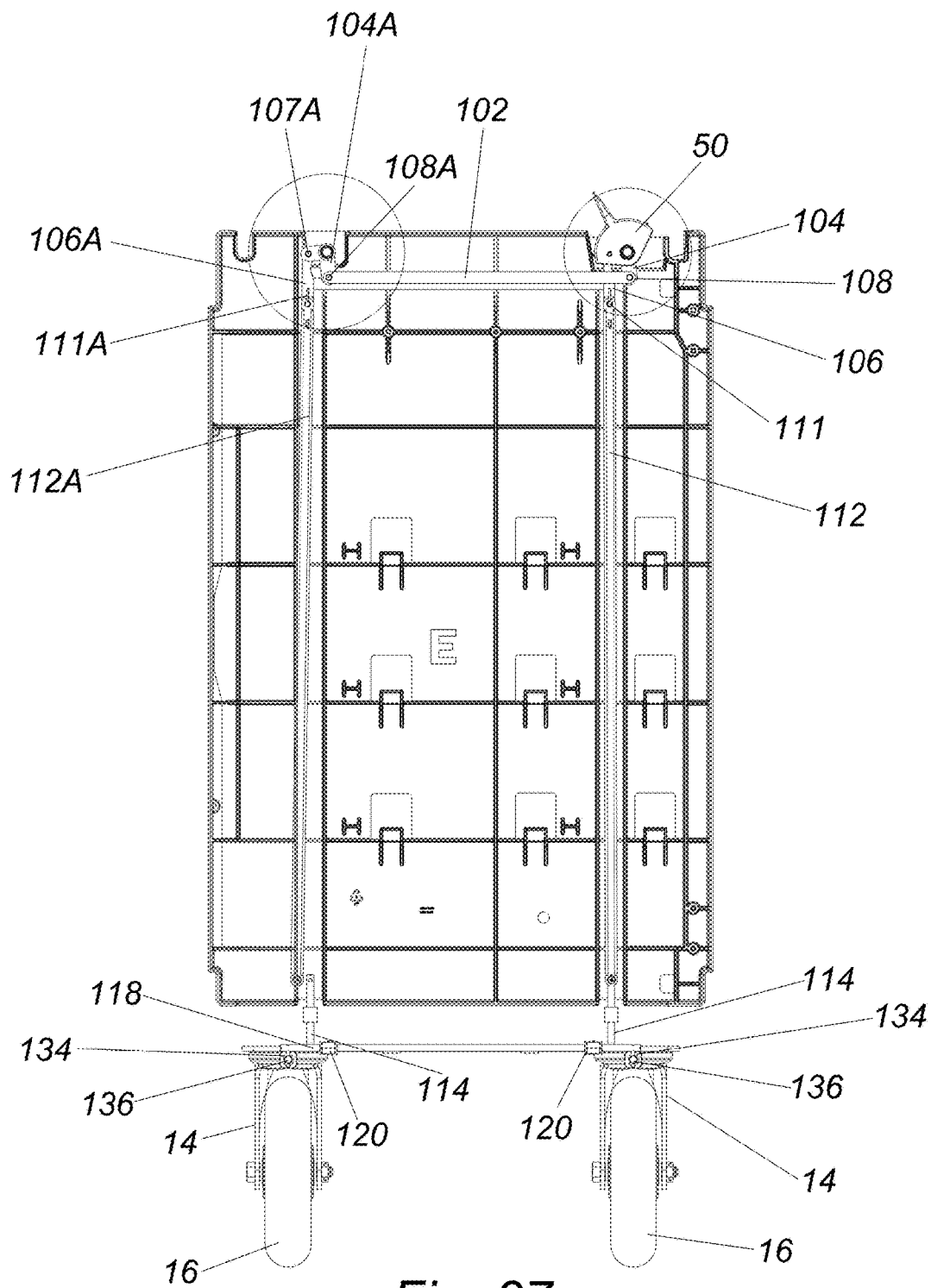
FIG. 37 is a cross sectional view of the housekeeping cart with the wheel caster lock mechanism in the open position.
Figure 40:
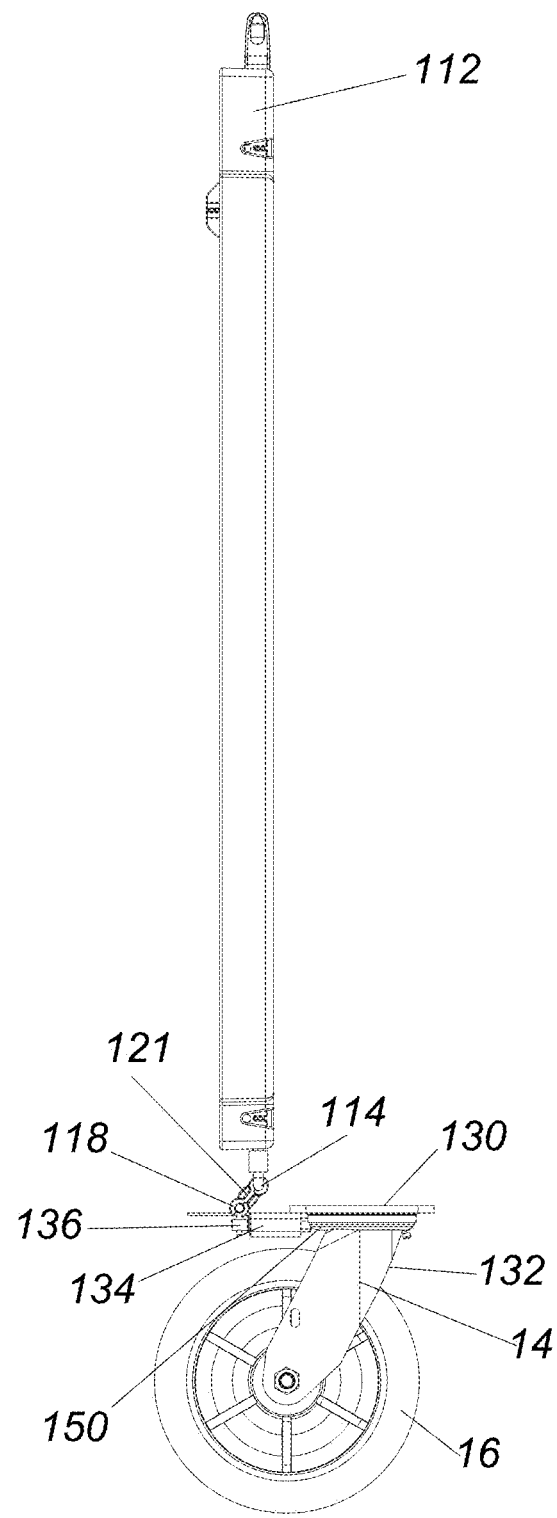
FIG. 40 is a side view of the wheel caster lock mechanism in the closed position.
Figure 41:
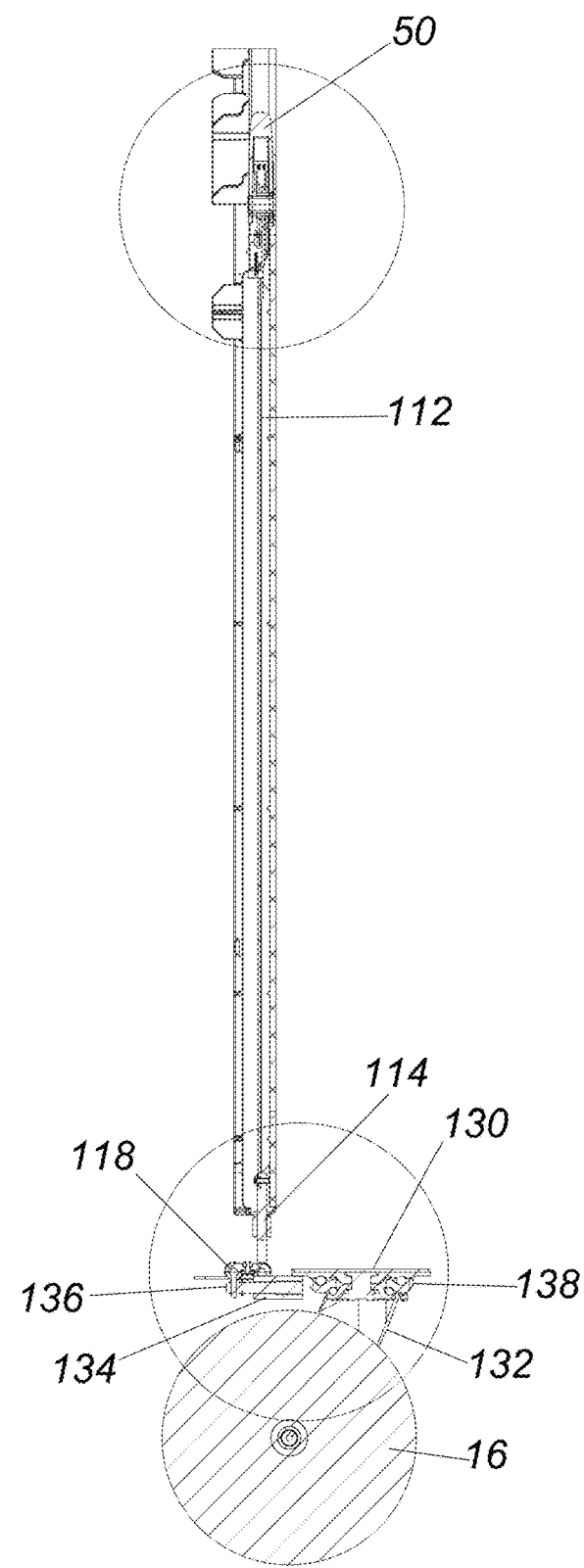
FIG. 41 is a cross sectional view of the wheel caster lock mechanism in the open position.
Figure 42:
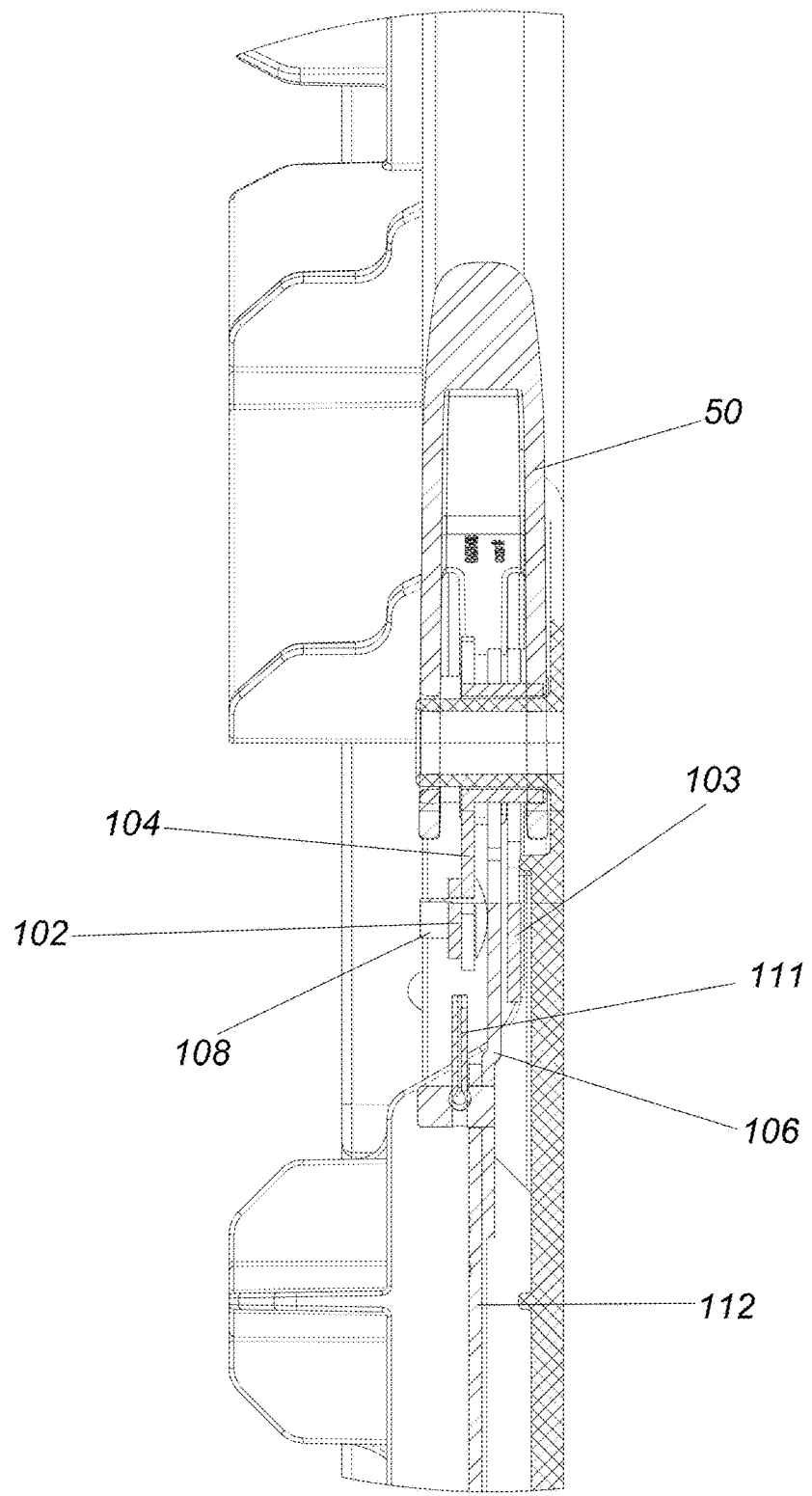
FIG. 42 is a detailed view of the top portion of the cross sectional view of the wheel caster lock mechanism in the open position.
Figure 43:
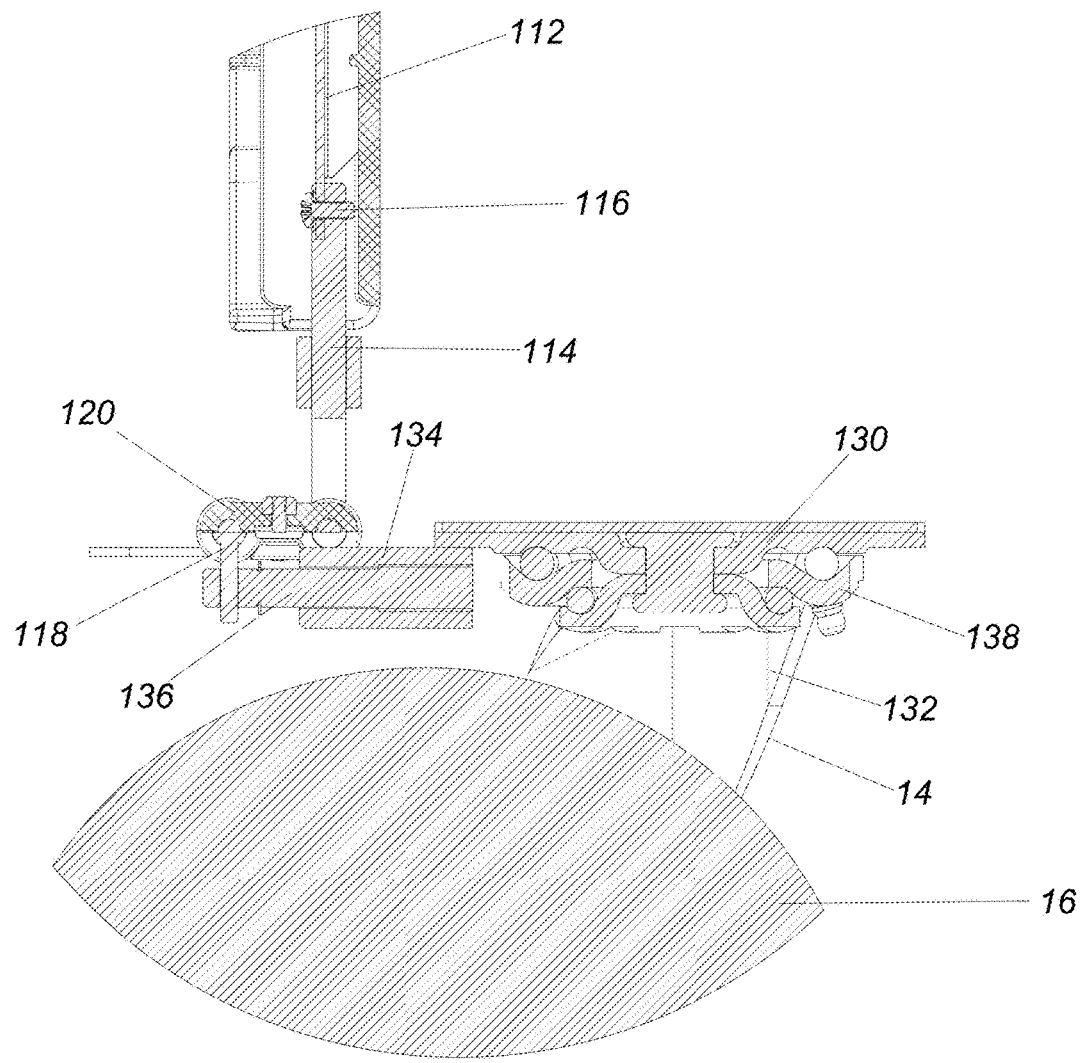
FIG. 43 is a detailed view of the lower portion of the cross sectional view of the wheel caster lock mechanism in the open position.
Figure 44:
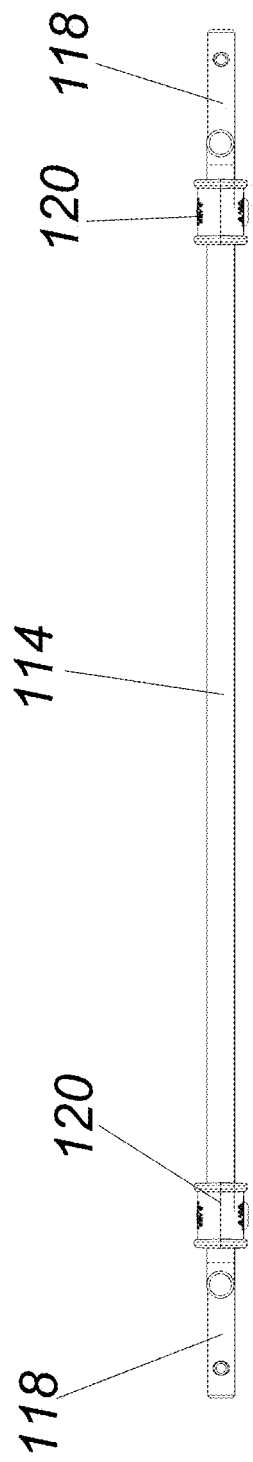
FIG. 44 is a top view of the lower cross beam of the wheel caster lock mechanism.
Figure 45:
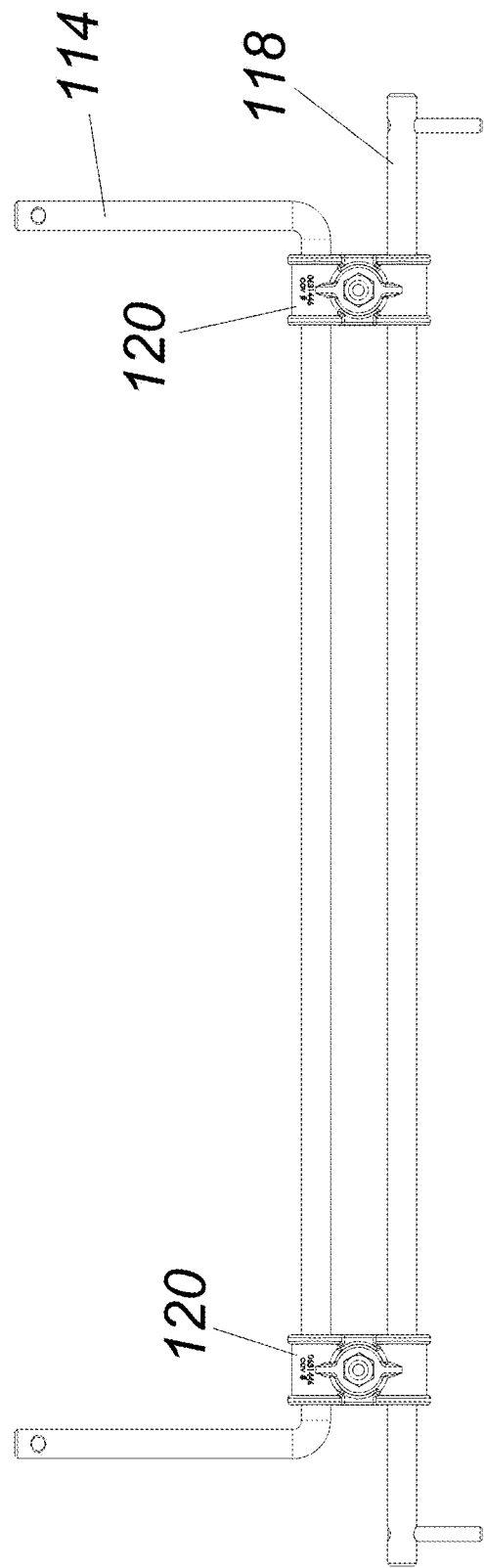
FIG. 45 is a front view of the lower cross beam of the wheel caster lock mechanism.
Figure 46:
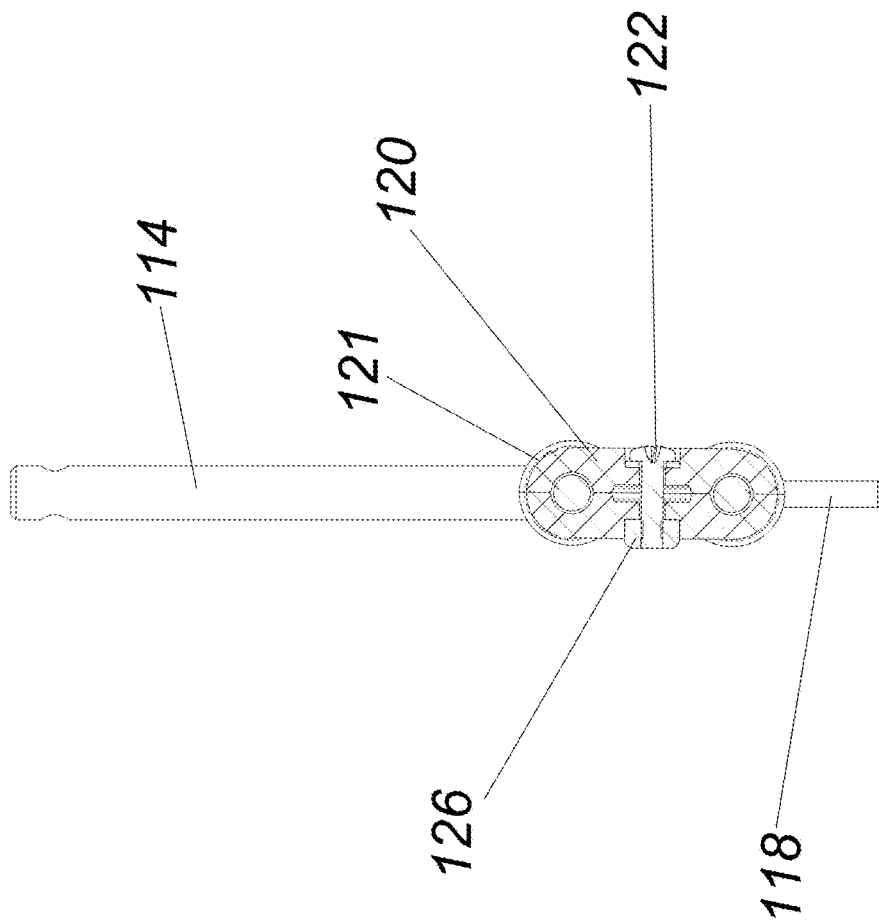
FIG. 46 is a side cross sectional view of the lower cross beam of the wheel caster lock mechanism.
Figure 47:
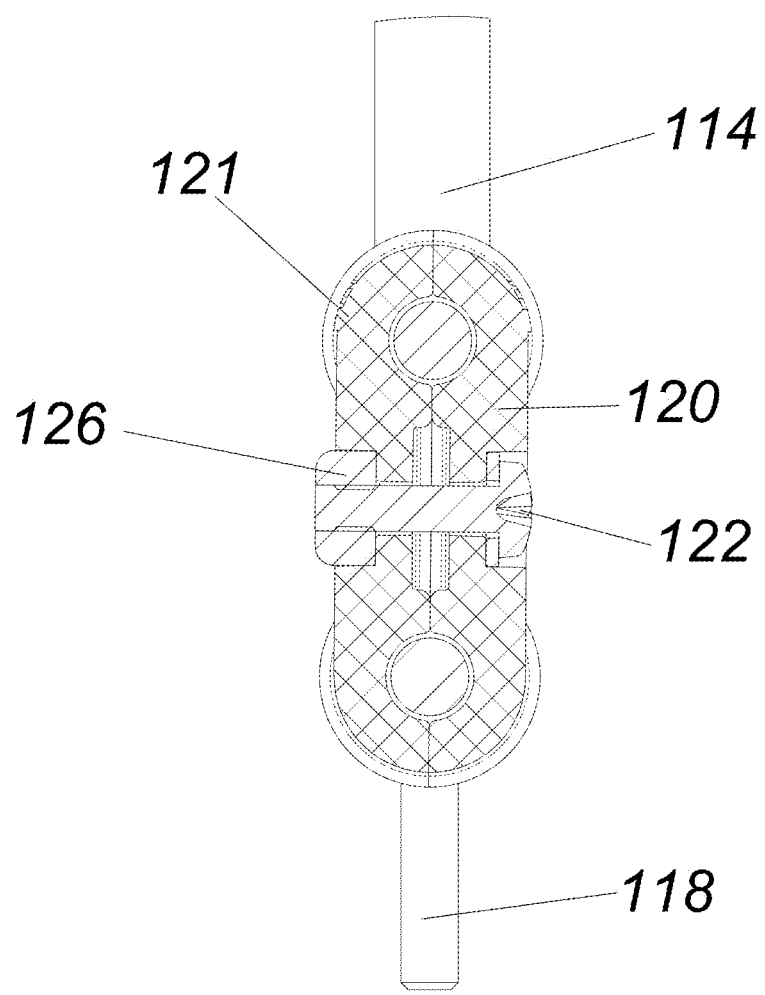
FIG. 47 is a detailed view of the cross sectional view of the bracket in the lower cross beam of the wheel caster lock mechanism.
Figure 48:
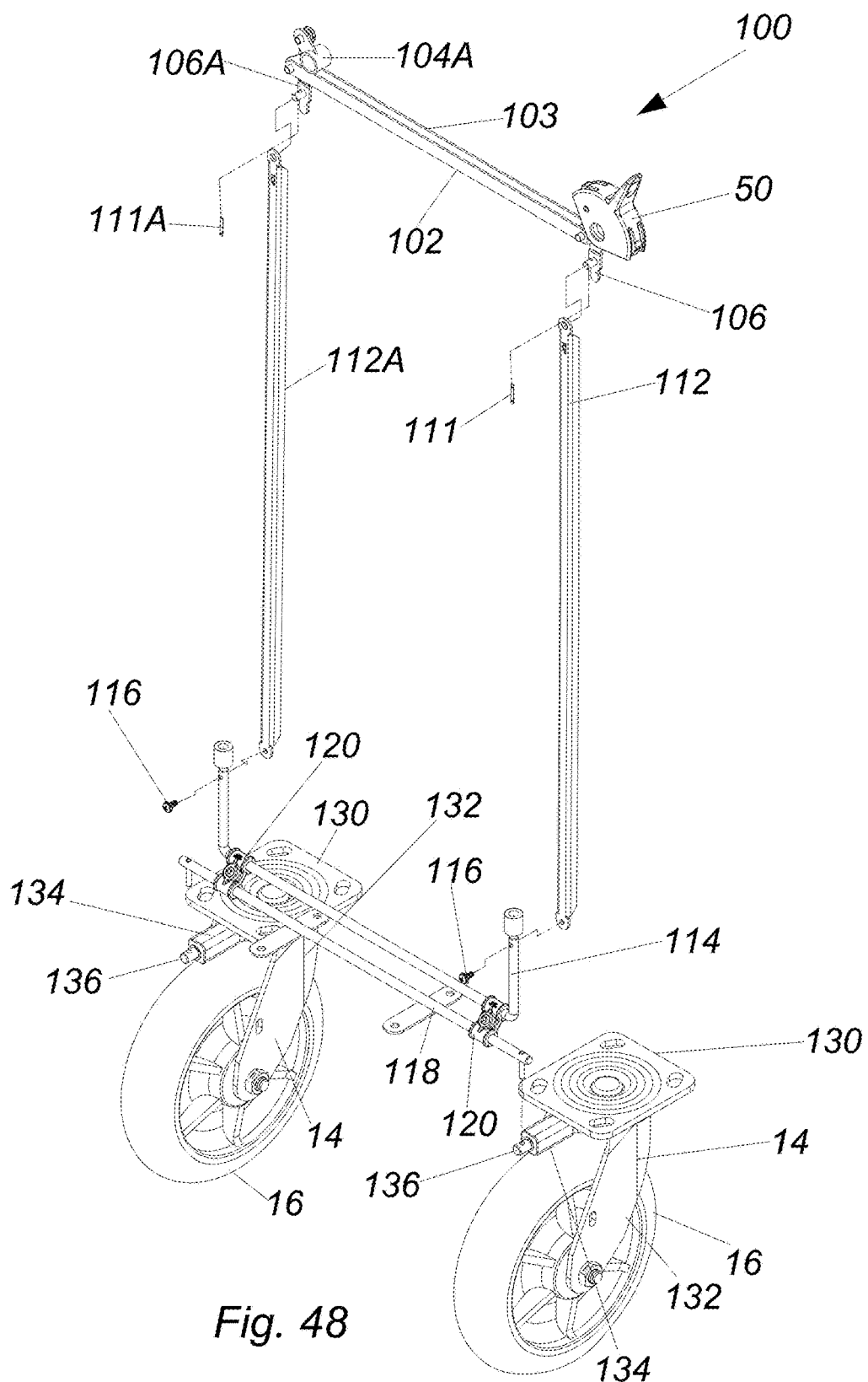
FIG. 48 is a partial exploded view showing the main connections of the wheel caster lock mechanism.
Figure 49:
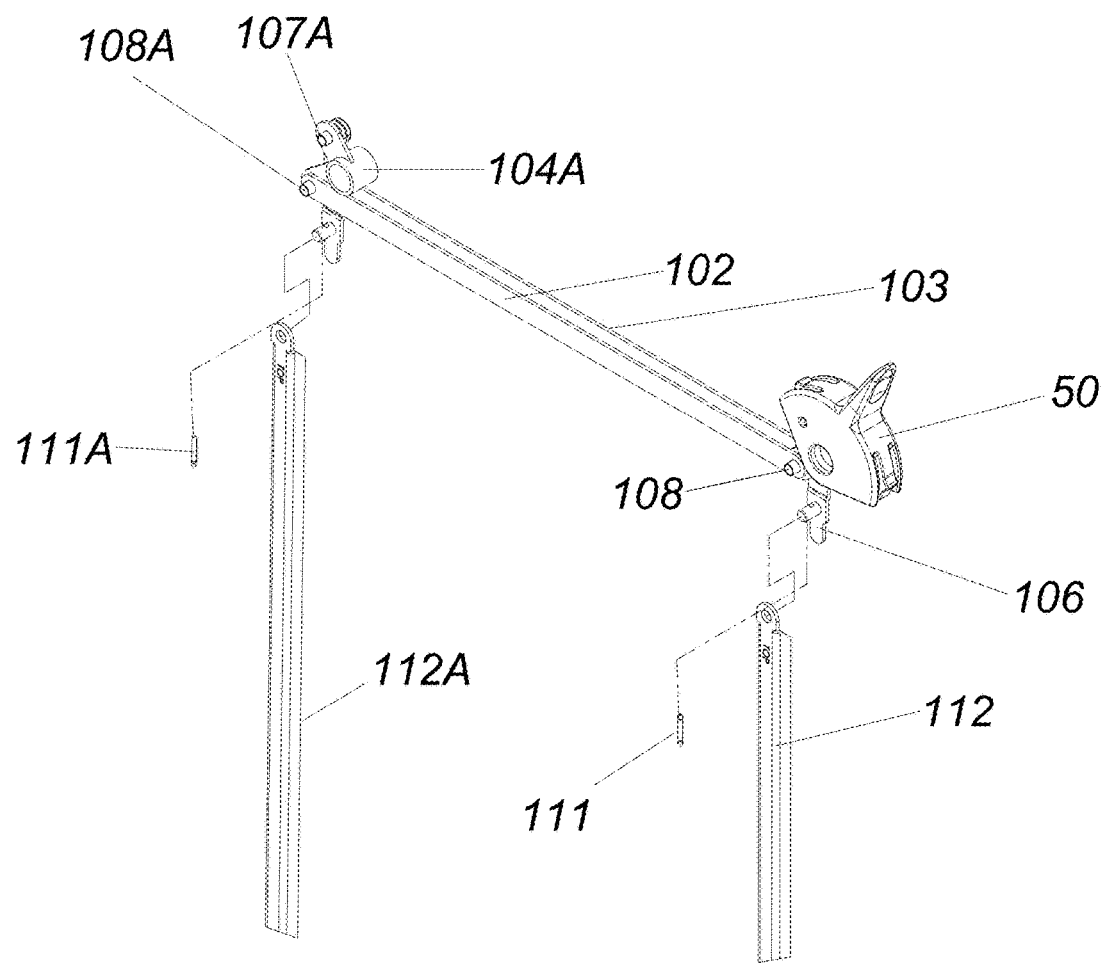
FIG. 49 is a detailed view of the top connections of the wheel caster lock mechanism.
Figure 50:
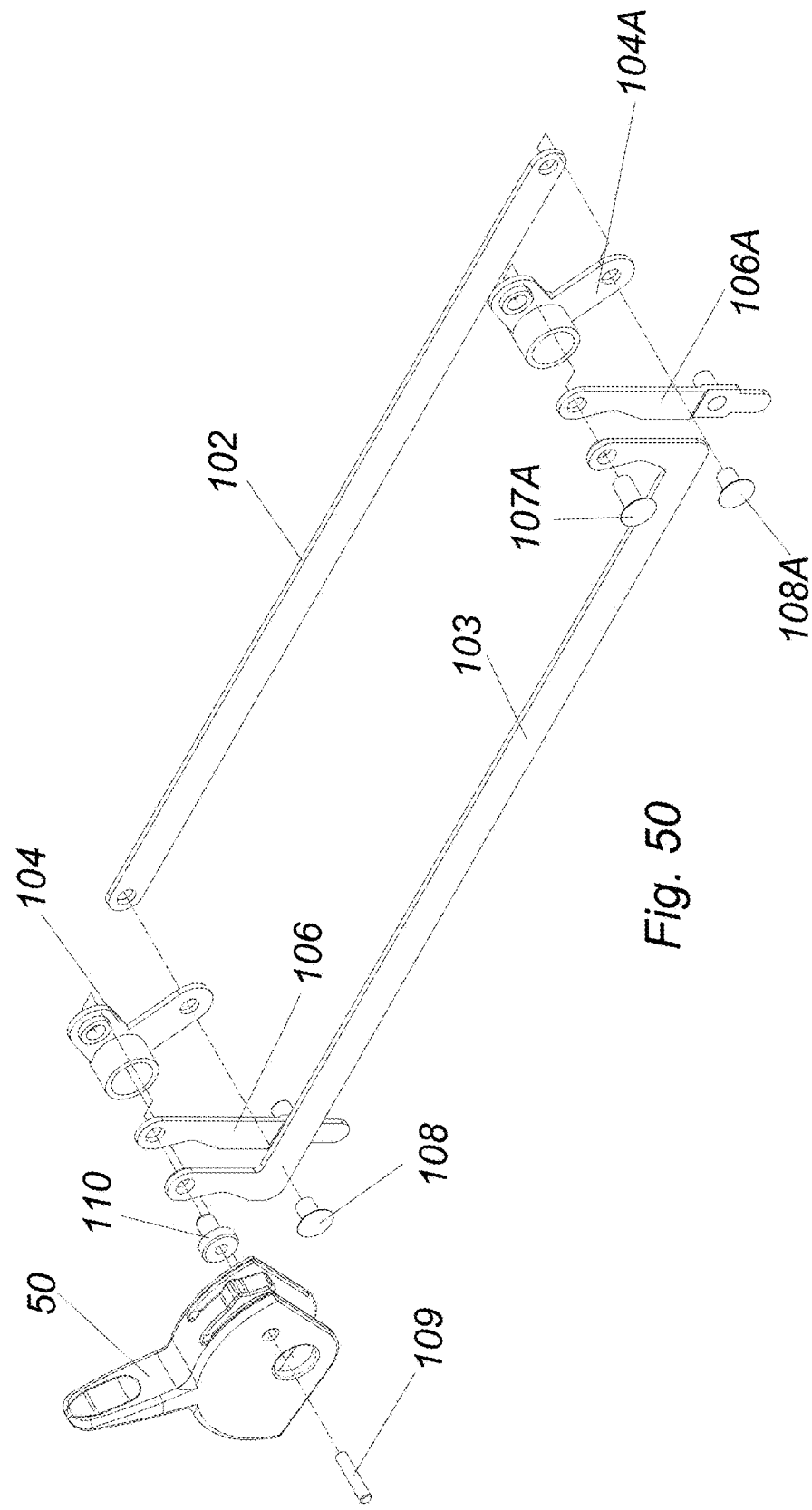
FIG. 50 is an exploded view of the top cross beam of the wheel caster lock mechanism.
Figure 51:
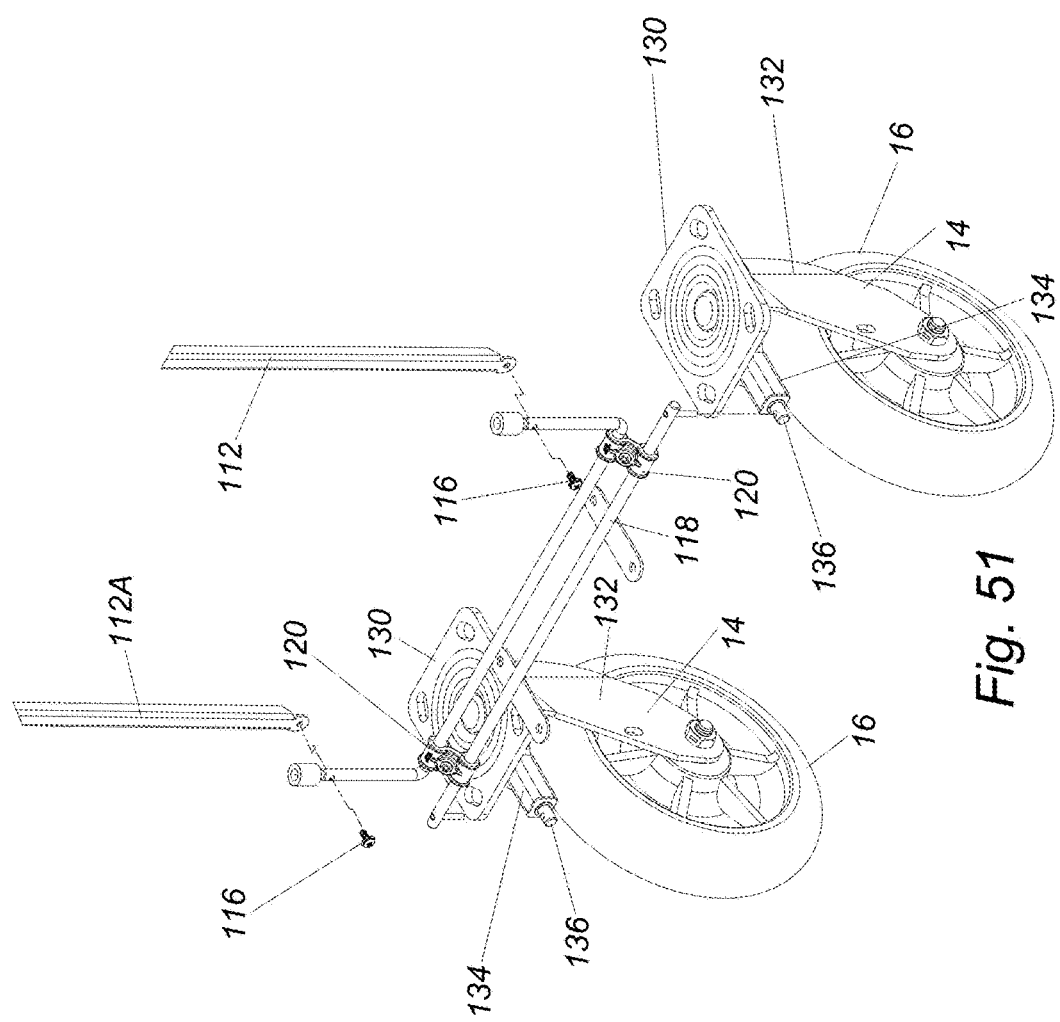
FIG. 51 is a detailed view of the lower connections of the wheel caster lock mechanism.
Figure 52:
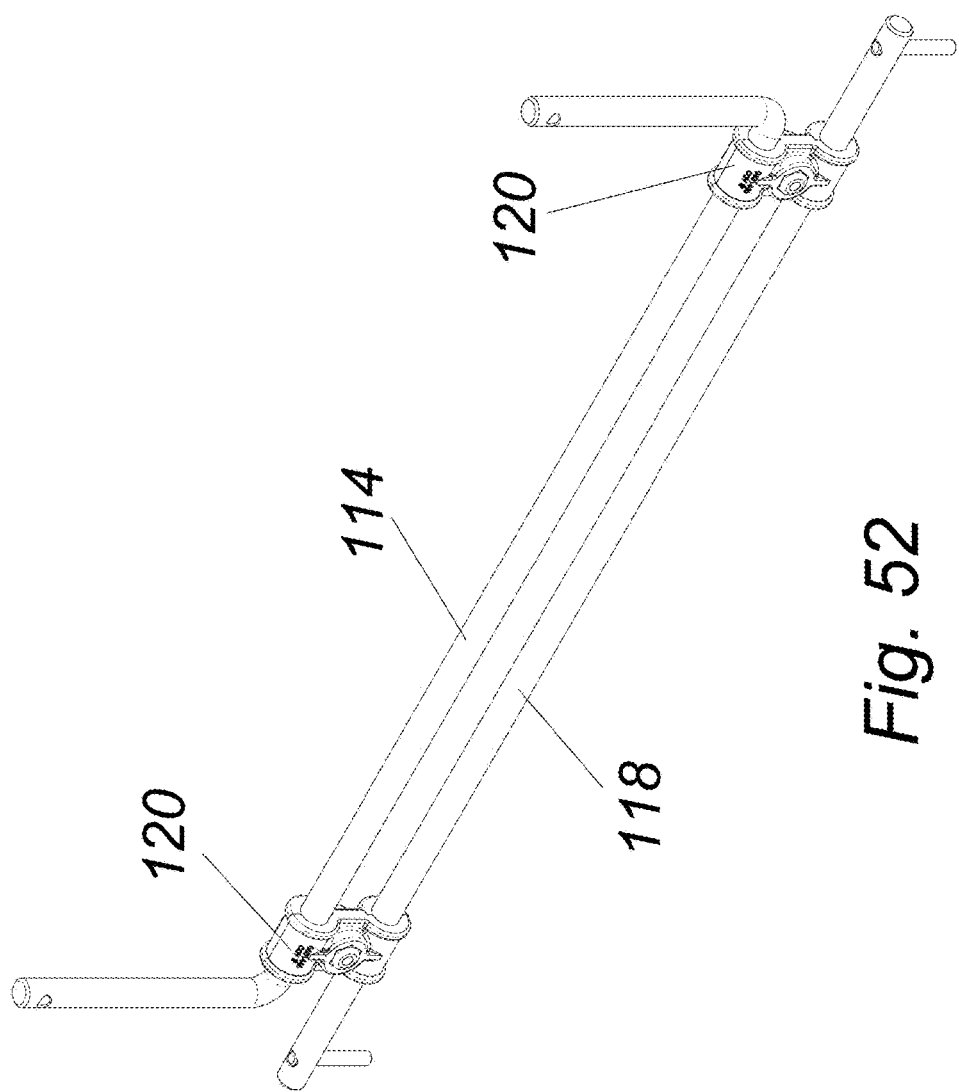
FIG. 52 is a perspective view of the lower cross beam of the wheel caster lock mechanism.
Figure 53:
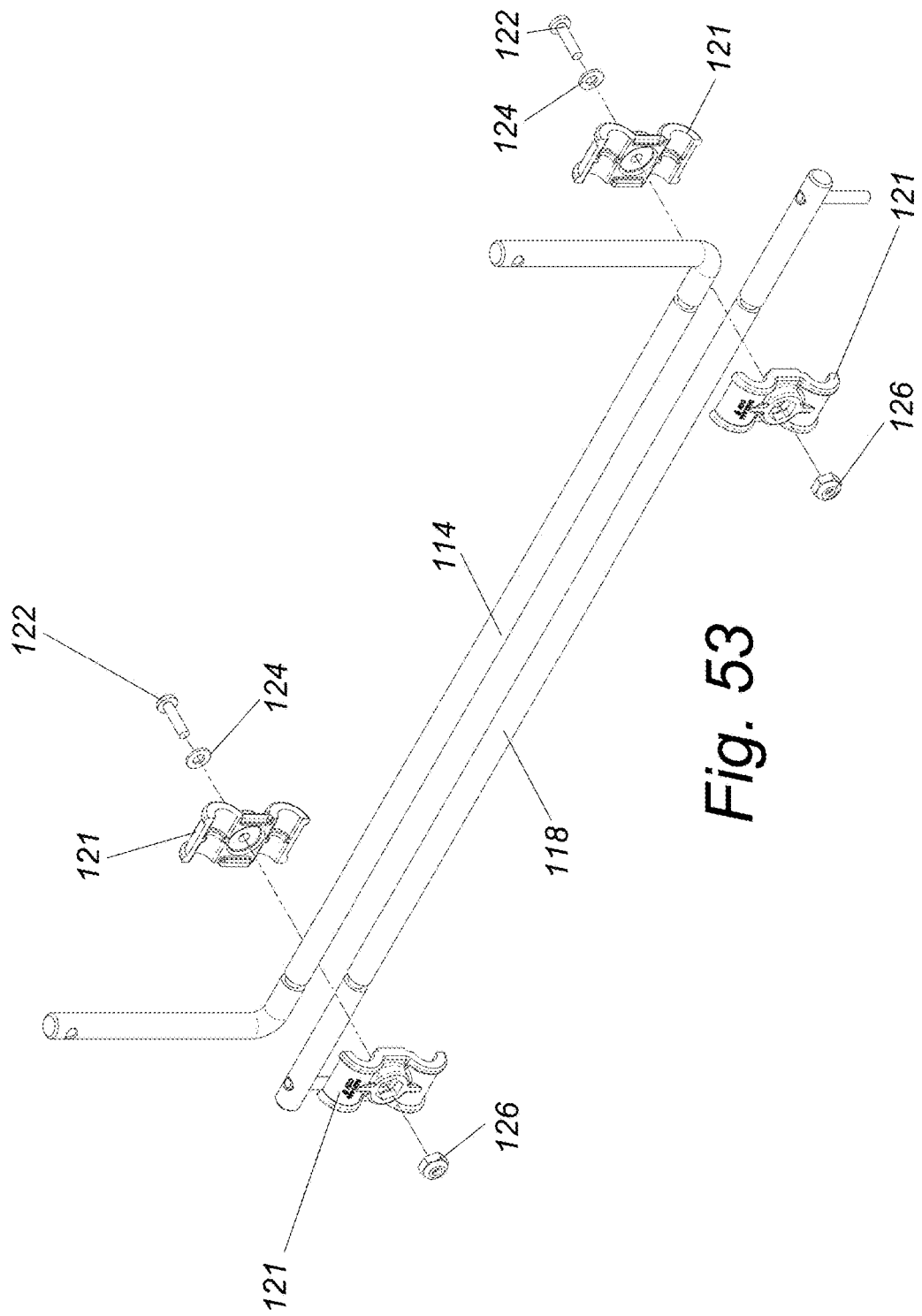
FIG. 53 is an exploded view of the lower cross beam of the wheel caster lock mechanism.
Figure 54:
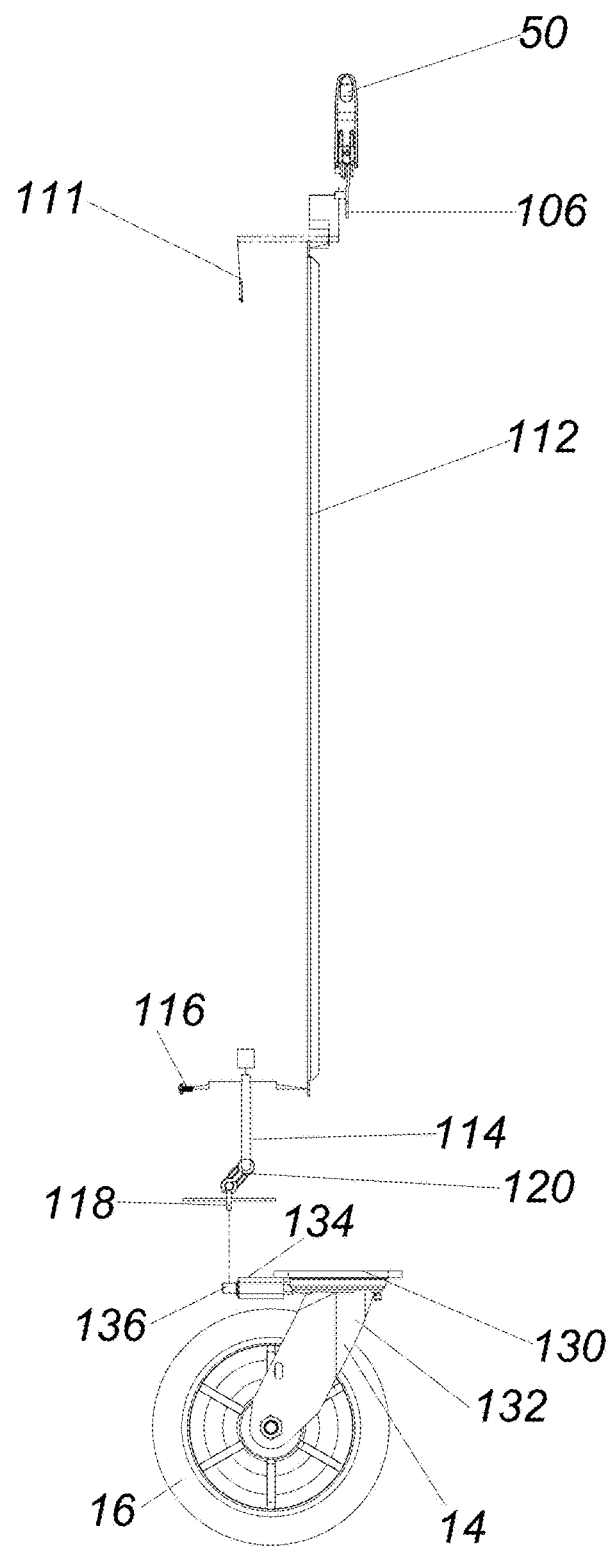
FIG. 54 is a side view of FIG. 48.
Figure 55:
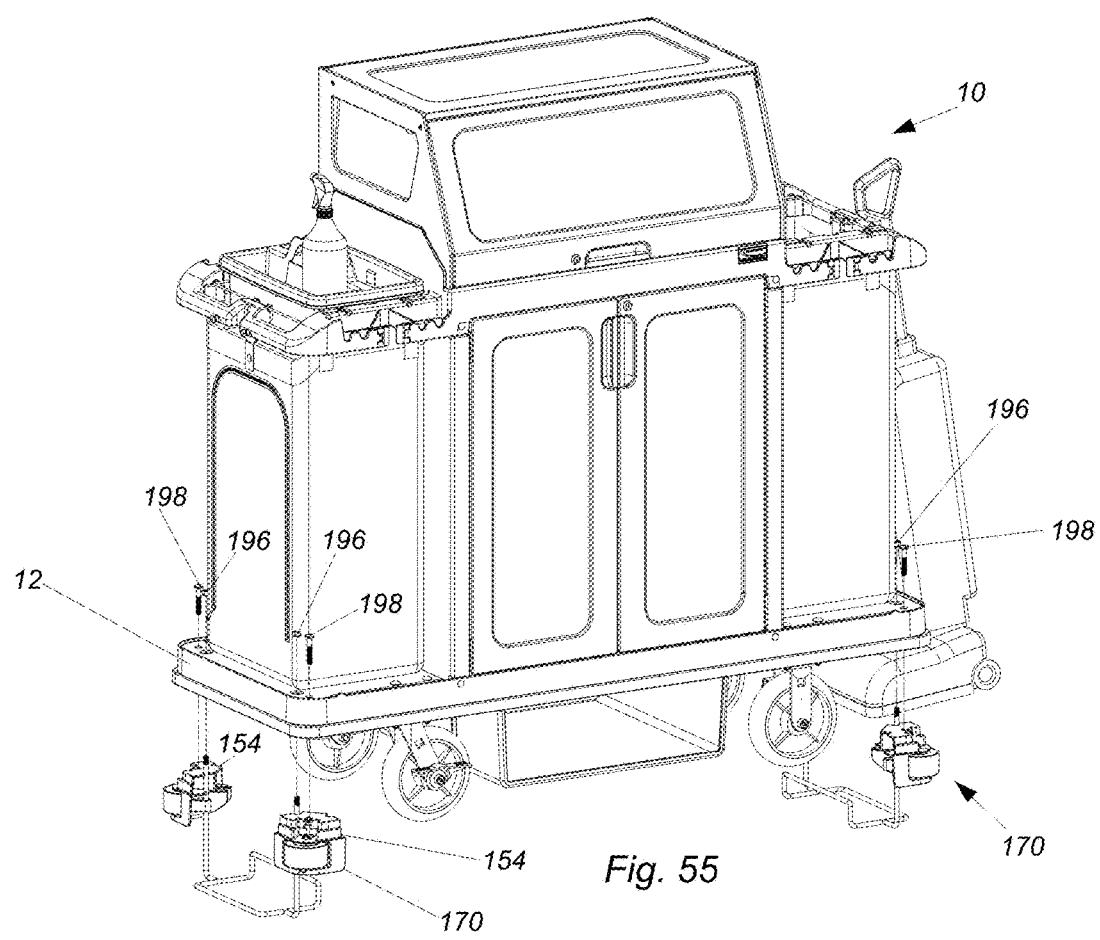
FIG. 55 is an alternate embodiment of the present invention utilizing a single bumper assembly.
Figure 56:
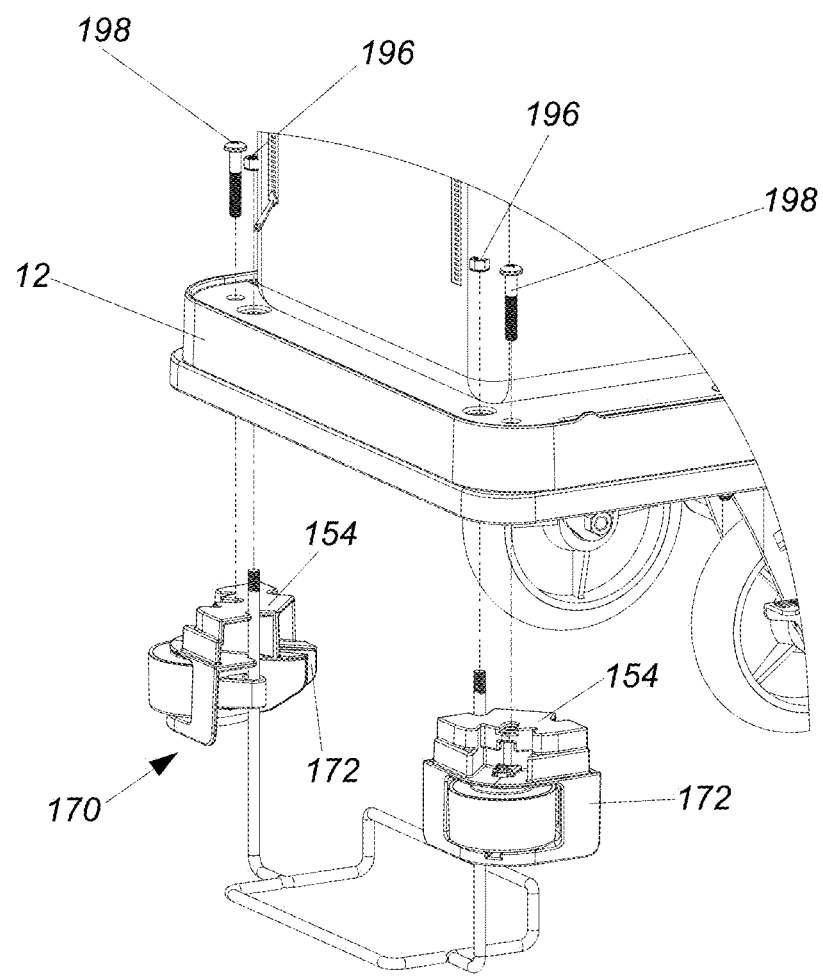
FIG. 56 is a detailed view of the attachment of the single bumper assembly shown in FIG. 55.
Figure 57:
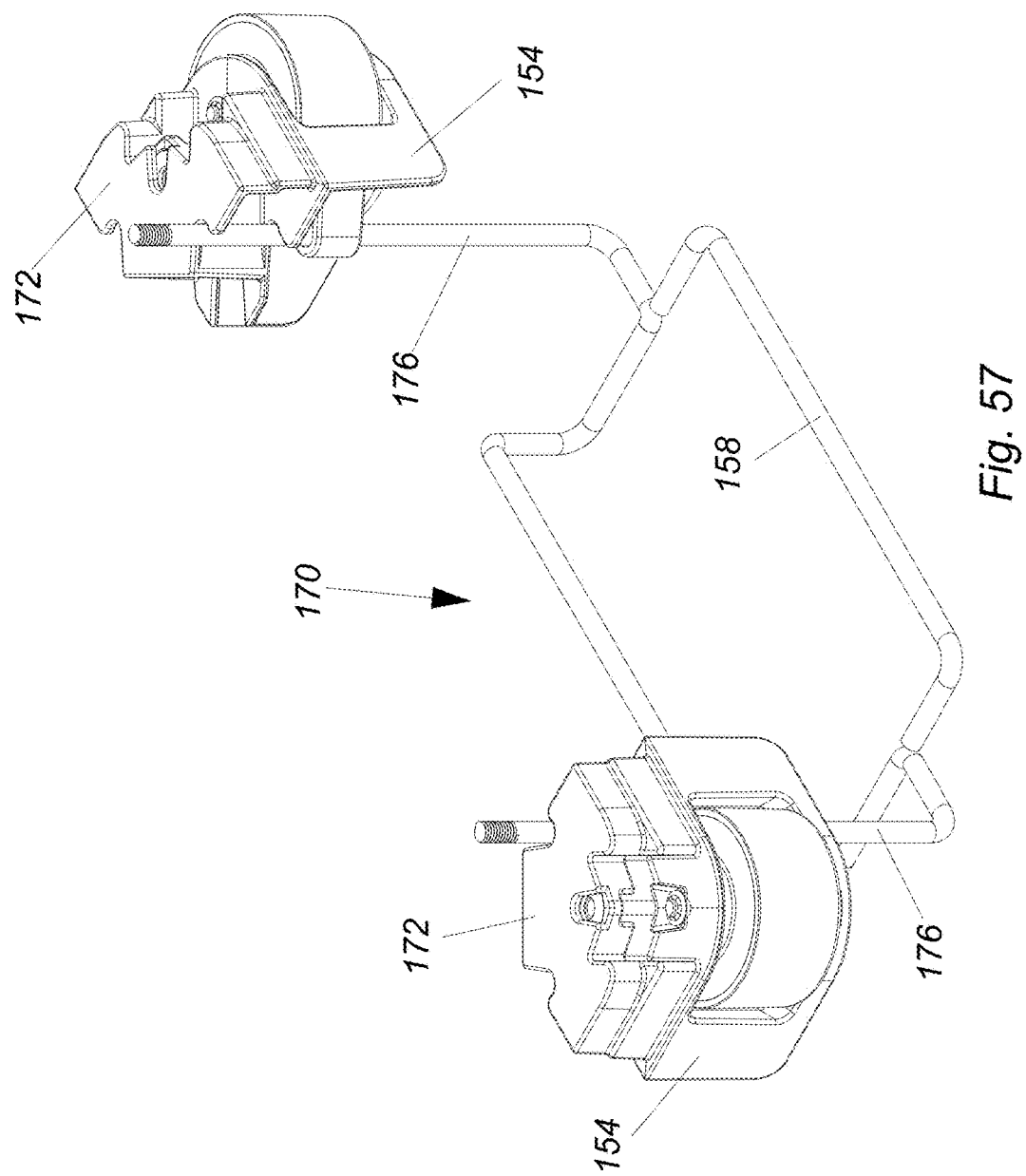
FIG. 57 is a perspective view of the single bumper assembly.
Figure 58:
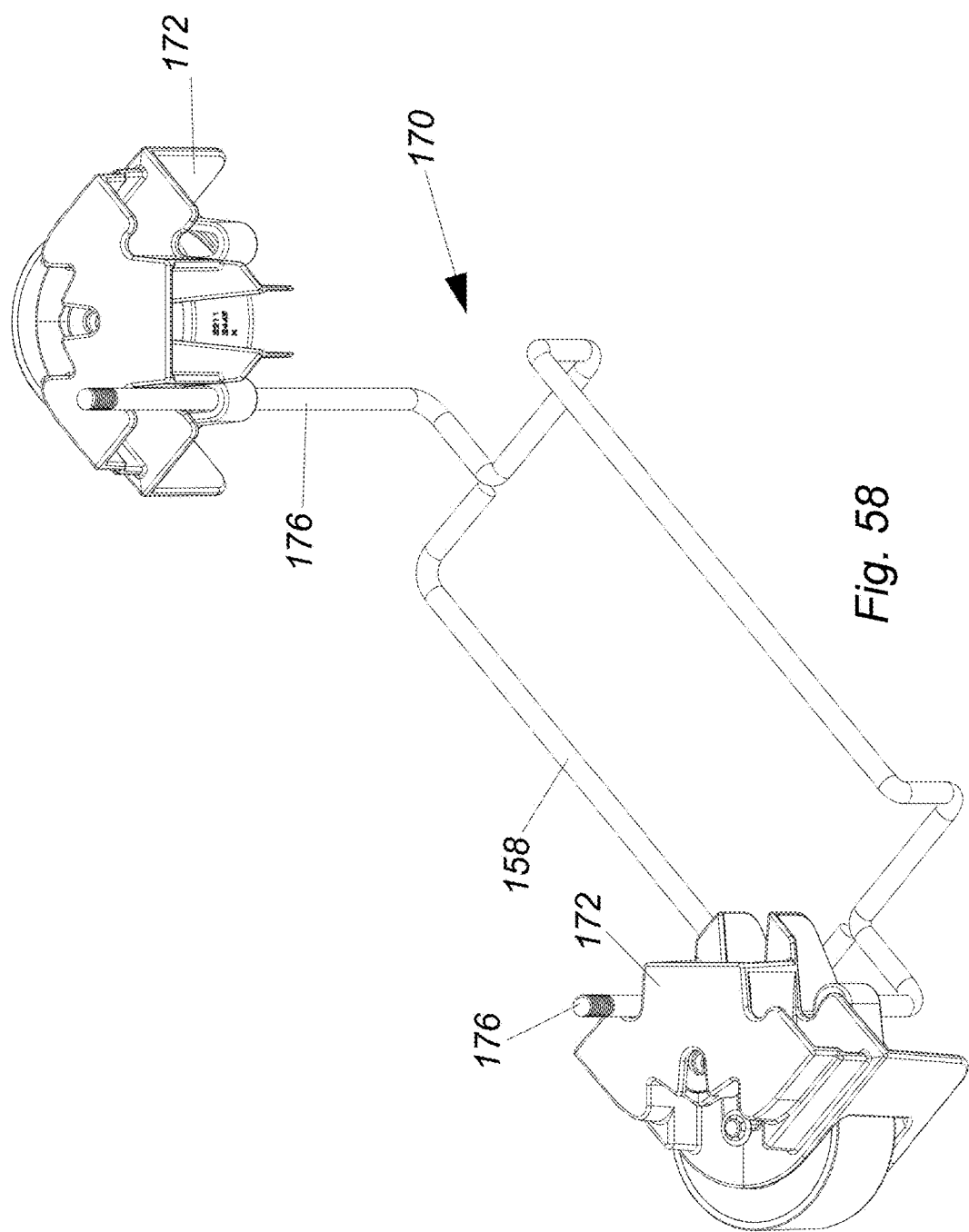
FIG. 58 is an alternate perspective view of the single bumper assembly.
Figure 59:
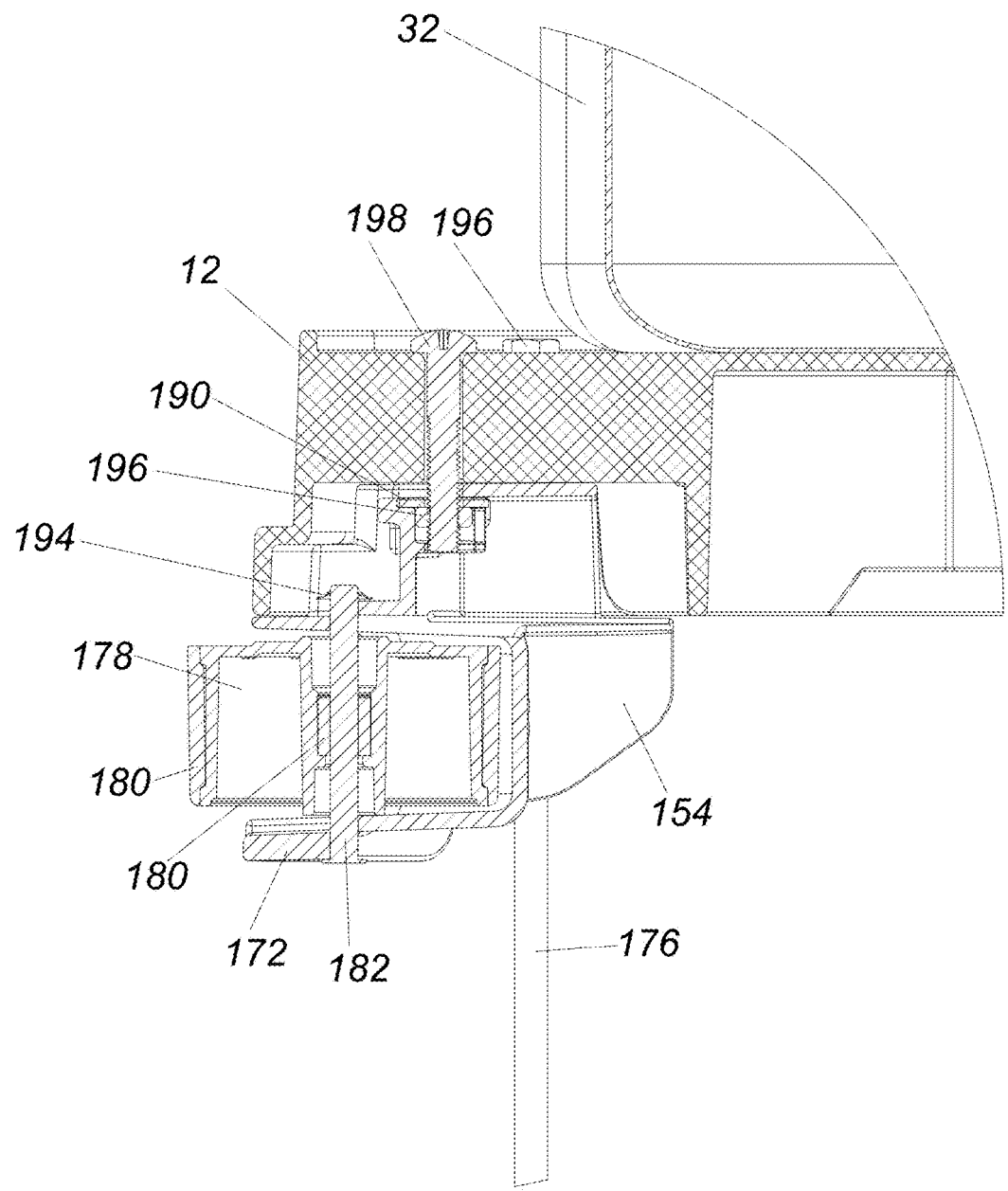
FIG. 59 is a cross sectional view of the single bumper assembly attached to the housekeeping cart.
Figure 60:
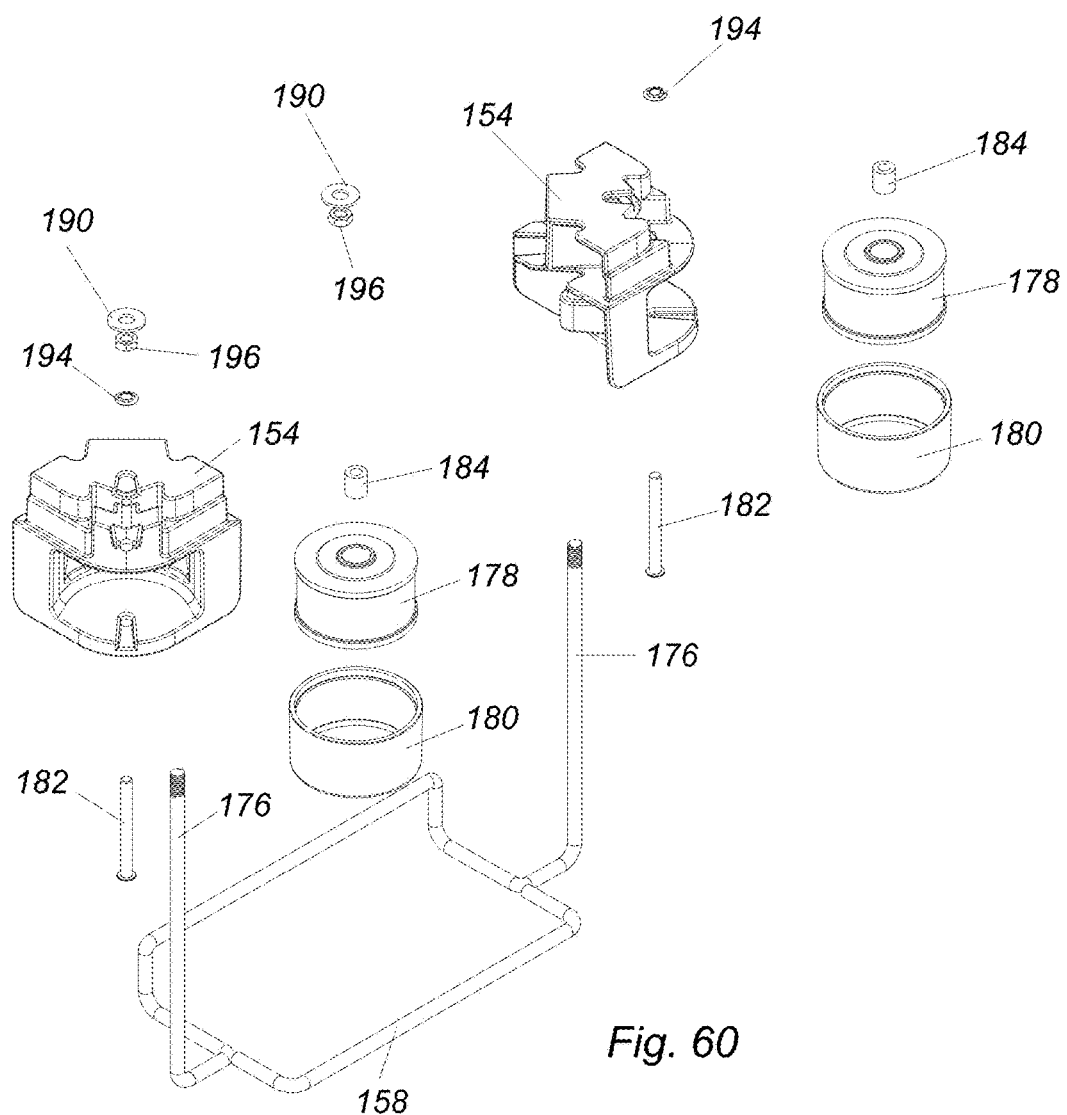
FIG. 60 is an exploded view of the single bumper assembly.
Figure 61:
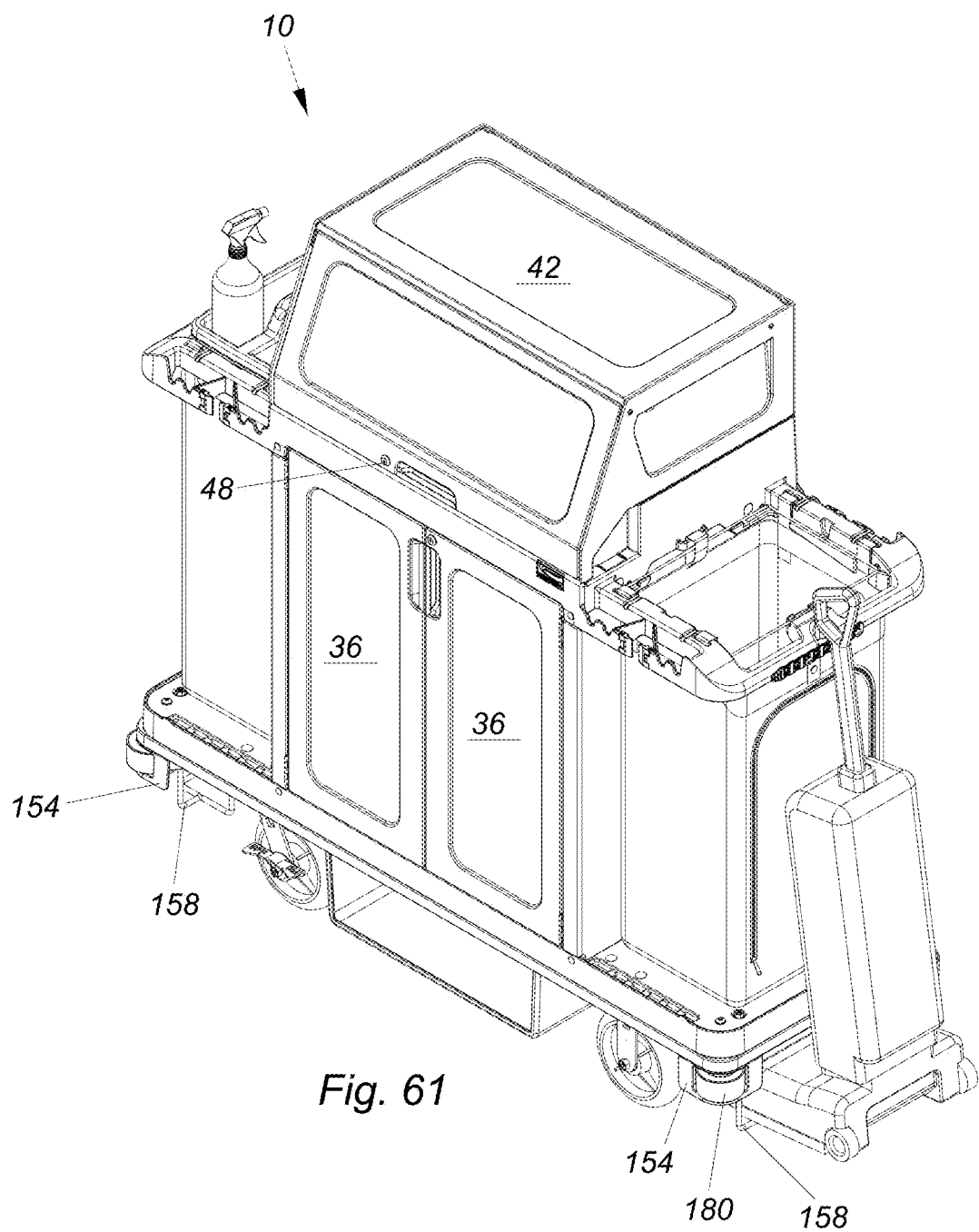
FIG. 61 is a perspective view of a housekeeping cart with a single bumper assemblies attached.
Figure 62:
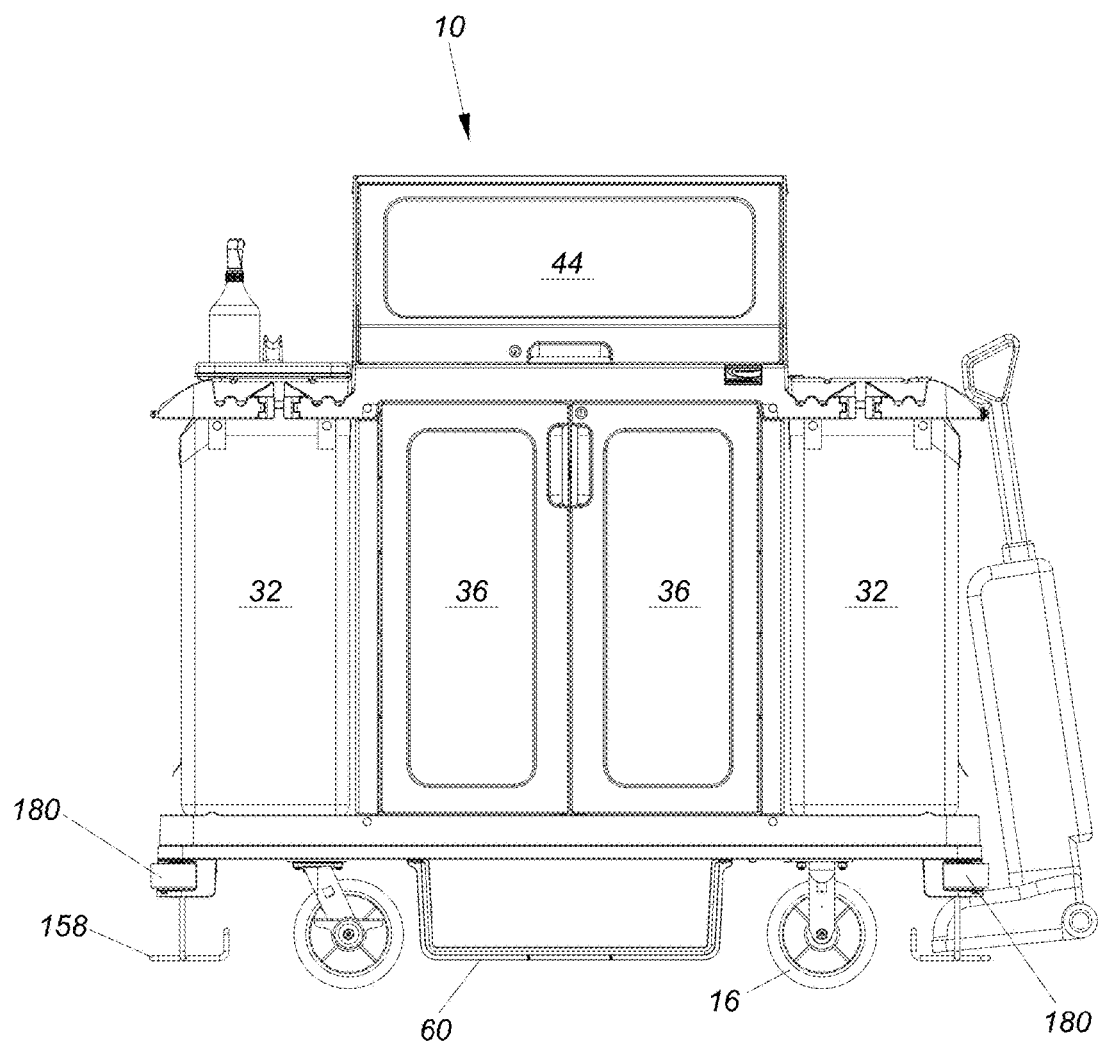
FIG. 62 is a front view of a housekeeping cart with a single bumper assembly attached.
Figure 63:
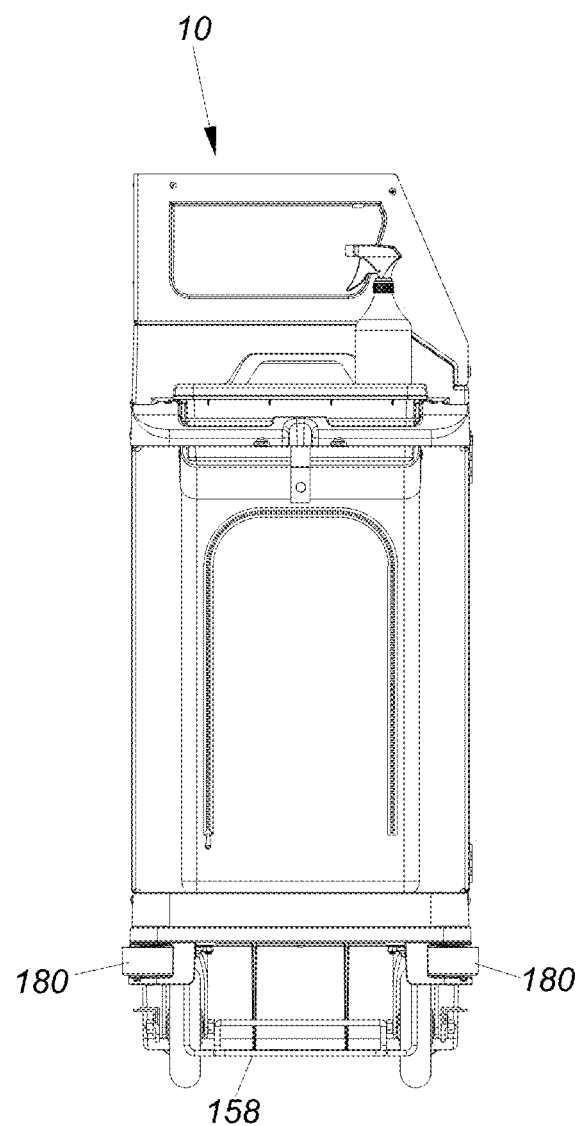
FIG. 63 is a right-side view of a housekeeping cart with a single bumper assembly attached.
Figure 64:
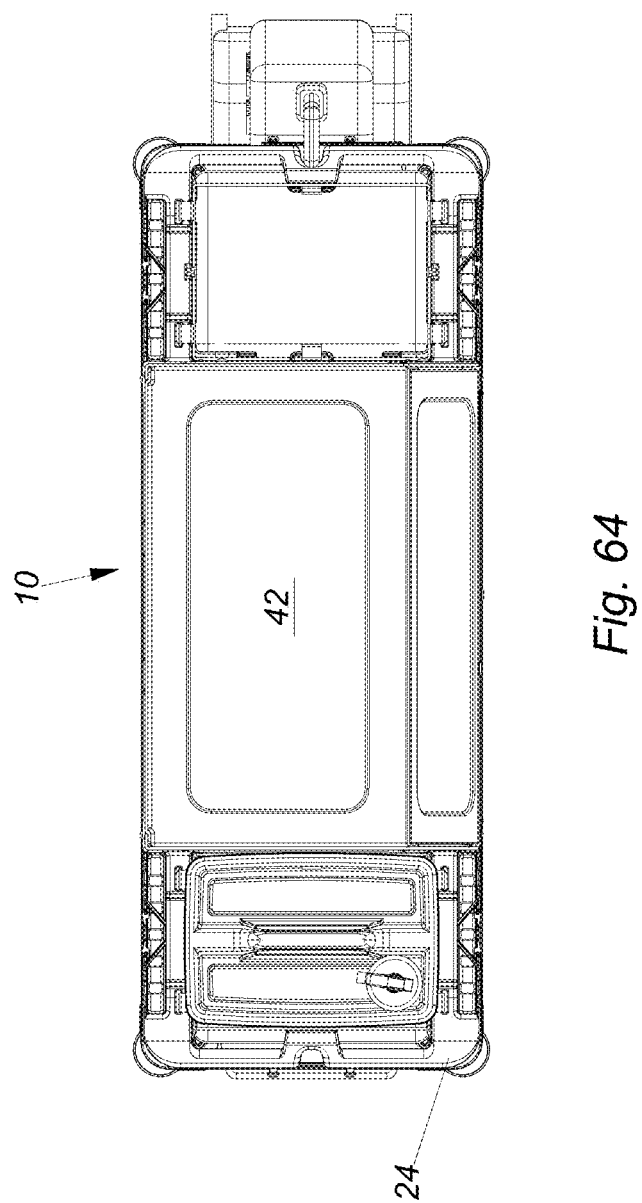
FIG. 64 is a top view of a housekeeping cart with a single bumper assembly attached.
Figure 65:
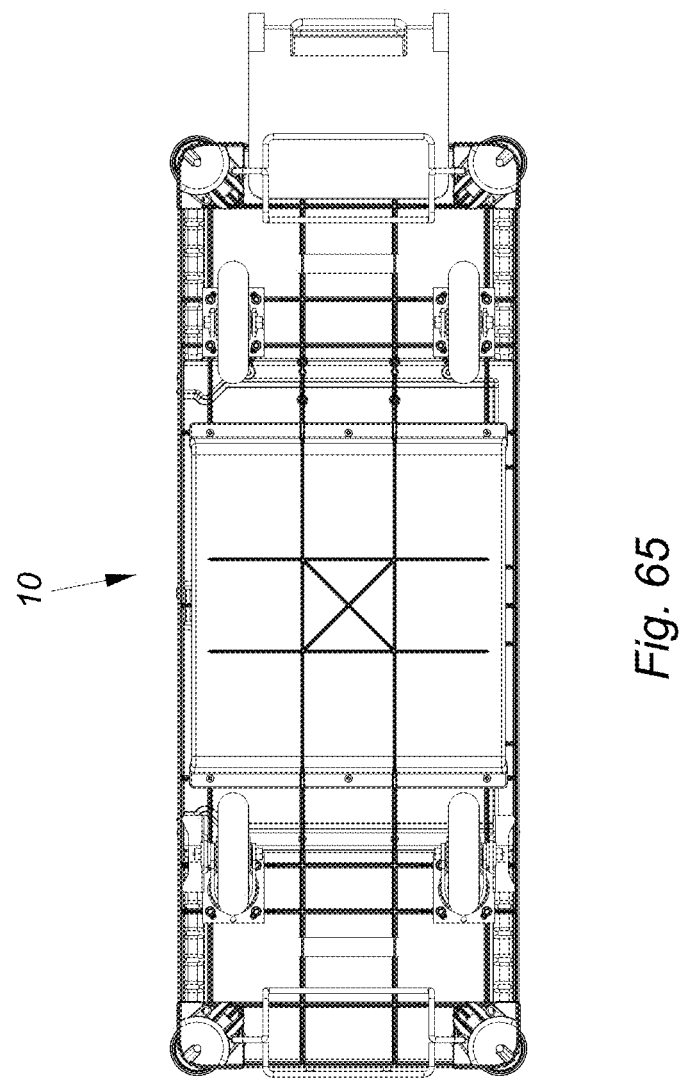
FIG. 65 is a bottom view of a housekeeping cart with a single bumper assembly attached.

FIGS. 21-23 highlight additional features of the housekeeping cart (10). As seen in the upper handle (24) in FIG. 21, and in greater detail in FIG. 23, the handle (24) includes tool storage slots (28), as well as a compartment with pivoting clips (29) to allow taller items, such as broom or mop handles, to be maintained against the cart handle (24). As an alternative to the pivoting clips (29) flexible elastomeric members may be utilized whereby the elastomeric members are constructed to require the handle to be forced between outwardly projecting arms (31) (FIG. 25) and/or an elastomeric strap (33) (FIG. 24) which may include apertures notches or the like which allow the strap to be removably secured in place.

Not shown in the figures, the cart (10) includes flush connectors to allow for the cart to be cleaned more efficiently. Additionally, a hidden integrated battery pack can be included for rechargeable tools and accessories, as well as an integrated power strip for plugging in electric tools. In one embodiment of the cart (10), an integrated self-propelled module can be included for operator assisted movement.

FIGS. 29-54 show the caster lock system (100) as it can be employed with the disclosed cart (10). The caster lock system (100) is employed in a relatively vertical plane in line with one set of wheels (16). The caster lock switch (50), attached to the sidewall (20) of the cart, allows a user to toggle between the locked and unlocked position of the caster lock system (100) within the sidewall (20) of the cart (10). The switch (50) is coupled to an L-shaped bracket (104), which is coupled to a front crossbar (102) and rear crossbar (103) to translate motion to a second L-shaped bracket (104a) at the opposite end of the crossbars (102, 103). This allows the caster lock system to function in unison in two vertical columns, one over each wheel attached to the system (100). These pieces are connected by pins (107a, 108, 108a, 109, 110).

When the switch (50) is pivoted from the first position to the second position, it causes the L-shaped bracket (104) to pivot, causing the front crossbar (102) to shift laterally, causing the second L-shaped bracket (104a) to pivot. As the L-shaped brackets (104, 104a) pivot, the vertical connectors (106, 106a) shift vertically downward. The vertical connectors (106, 106a) are coupled to corresponding vertical translational bars (112, 112a). The vertical translational bars (112, 112a) connect to a lower translational system which causes the casters (14) to lock in position. Detents (51) are formed on the switch (50) and cooperate with raised ribs formed, notches or the like on the bottom surface of the upper shelf (22) to retain the switch (50) in the desired position.

The lower translational system couples to the lower end of the vertical translational bars (112, 112a). Screws (116) can be used to couple the first lower crossbar (114) to the lower end of the vertical translational bars (112, 112a). The first lower crossbar (114) is then coupled to the second lower crossbar (118) by brackets (120). The brackets (120) include a housing (121) held together by a bolt (122) with a nut (126). To prevent lateral movement of the bracket (120) with respect to the first and second lower crossbars (114, 118), a groove 125 can be cut into each of the lower crossbars (114, 118), and the bracket housing (121) can include a ridge 127 for seating the bracket (120) on the crossbars (114, 118) at the groove.

The second lower crossbar (118) couples to a pair of wheel locking assemblies (150) one for each associated caster (14) and wheel (16). The ends of the second lower crossbar (118) couple to locking pins (136) that are slidably coupled to the locking pin housings (134). The locking pin housings (134) are fixedly coupled to the caster base (130). The caster wheel arm (132) couples the caster base (130) to the wheel (16).

On the lower side of the caster base (130) for the casters in the locking assembly (150) there is a rotating disk (138) that has openings at specific orientations of the caster wheel arm (132) relative to the caster base (130), specifically when the wheels (16) are aligned parallel to the long side of the housekeeping cart (10). When the vertical translational bars (112, 112a) are pulled up, the bracket (120) causes a rotation between the first and second lower crossbars (114, 118). This rotation causes the second lower crossbar (118) to move towards the caster base (130), which engages the locking pin (136) with the rotating disk (138), preventing the disk (138) from further rotation and, thus, locking the position of the caster (14). Conversely, when the vertical translational bars (112, 112a) are raised, the locking pin (136) disengages from the rotating disk (138), allowing the caster (14) to rotate freely.

FIGS. 55-65 show an alternate embodiment of the disclosed cart (10), employing an alternate corner bracket assembly (170). The alternate corner bracket assembly (170) can attach to both sides of the cart (10) to protect the walls, etc. from the corners of the cart (10). The alternate corner bracket assembly (170) is inserted up through the base (12) of the cart (10), and can be secured with bolts (198) and nuts (196). The alternate corner bracket assembly (170) includes a horizontal vacuum storage crossbar (158) and a pair of vertical attachment bars (176). The vertical attachment bars (176) extend upward through the base (12) and are secured by nuts (196).

Attached to the vertical attachment bars (176) are corner brackets (154). Bolts (198) extend downward through the base (12) to secure the corner brackets (154) with a washer (190) and nut (196). Each corner bracket (154) includes a bumper housing (172) with an axle (182) extending through a bumper made of a padded layer (180) around an inner portion (178) with an axle bearing (184) in the center. The axle (182) is secured within the housing (172) by a clip (194).

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A bumper assembly for attachment onto a cart comprising:
    a first corner bumper housing;
    a second corner bumper housing;
    an attachment bar, said attachment bar having at least one horizontal crossbar, said at least one horizontal crossbar having a first end and a second end; said first end of said horizontal crossbar coupled to a first end of a first vertical attachment bar, said second end of said at least one horizontal crossbar coupled to a first end of a second vertical attachment bar, said first and second vertical attachment bars each having a second end with threading; said first corner bumper housing coupled to said first vertical attachment bar, said second corner bumper coupled to said second vertical attachment bar;
    at least one first bumper coupled to said first corner bumper housing by a first axle;
    at least one second bumper coupled to said second corner bumper housing by a second axle;
    a first nut coupled to said second end of said first vertical attachment bar; and
    a second nut coupled to said second end of said second vertical attachment bar;
    wherein coupling of said first nut to said first vertical attachment bar and said second nut to said second vertical attachment bar couples the assembly to a cart.

2. The bumper assembly of claim 1, wherein said at least one first bumper comprises an inner bumper portion having a vertical aperture and an outer bumper padding.

3. The bumper assembly of claim 2, wherein said at least one second bumper comprises an inner bumper portion having a vertical aperture and an outer bumper padding.

4. The bumper assembly of claim 1, wherein said at least one first bumper is one first bumper and said at least one second bumper is one second bumper.

5. The bumper assembly of claim 1, wherein said at least one first bumper is a set of three bumpers and said at least one second bumper is a set of three bumpers.

6. The bumper assembly of claim 5 further including a first bumper attachment member coupled to said first bumper housing and a second bumper attachment member coupled to said second bumper housing, said first bumper attachment member having a pair of extending arms with an aperture for engagement with said first axle, and said second bumper attachment member having a pair of extending arms with an aperture for engagement with said second axle.

7. The bumper assembly of claim 1 further comprising a first screw coupled to said first bumper housing to secure said first bumper housing to said cart and a second screw coupled to said second bumper housing to secure said second bumper housing to said cart.

8. A wheel caster locking system for a housekeeping cart comprising:
    a switch pivotable between a first position and a second position, said switch attached to a housekeeping cart frame;
    a first vertical translational bar, said first vertical translational bar having a first end and a second end, said first end of said first vertical translation bar coupled to said switch;
    a second vertical translational bar, said second vertical translational bar having a first end and a second end, said first end of said second vertical translational bar coupled to said switch by a horizontal translational bar;
    a lower translational system, said lower translational system coupled to said second end of said first vertical translational bar, said lower translational system coupled to said second end of said second vertical translational bar;
    a first wheel locking assembly coupled to said lower translational system; and
    a second wheel locking assembly coupled to said lower translational system;
    wherein, when said switch is in said first position, said first and second wheel locking assemblies allow free rotation of a first and second wheel of said housekeeping cart, and when said switch is in said second position, said first and second wheel locking assemblies prevent rotation of said first and second wheel of said housekeeping cart.

9. The wheel caster locking system for a housekeeping cart of claim 8, wherein said first wheel locking assembly includes a first locking pin disposed within a first pin housing, said first pin housing coupled to a first wheel caster, said first locking pin having a first end and a second end, said first end of said wheel locking pin coupled to said lower translational system, said second end of said wheel locking pin positionable within said first wheel caster to prevent rotation of said first wheel caster.

10. The wheel caster locking system for a housekeeping cart of claim 9, wherein said second wheel locking assembly includes a second locking pin disposed within a second pin housing, said second pin housing coupled to a second wheel caster, said second locking pin having a first end and a second end, said first end of said second locking pin coupled to said lower translational system, said second end of said wheel locking pin positionable within said second wheel caster to prevent rotation of said second wheel caster.

11. The wheel caster locking system for a housekeeping cart of claim 8, further comprising a first L-shaped bracket coupled to said switch and pivotably coupled to said housekeeping cart frame, said first L-shaped bracket having a first end and a second end, said first L-shaped bracket first end coupled to said first vertical translational bar first end, said first L-shaped bracket second end coupled to said horizontal translational bar first end.

12. The wheel caster locking system for a housekeeping cart of claim 11, further comprising a second L-shaped bracket pivotably coupled to said housekeeping cart frame, said second L-shaped bracket having a first end and a second end, said second L-shaped bracket first end coupled to said second vertical translational bar first end, said second L-shaped bracket second end coupled to said horizontal translational bar second end.

13. The wheel locking system for a housekeeping cart of claim 12, wherein said lower translational system comprises:
    a first lower crossbar having a first end and a second end, said first end of said first lower crossbar coupled to said second end of said first vertical translation bar, said second end of said first lower crossbar coupled to said second end of said second vertical translation bar;
    a second lower crossbar having a first end and a second end, said first end of said second lower crossbar coupled to said first wheel locking assembly, said second end of said second lower crossbar coupled to said second wheel locking assembly; and
    at least one bracket having a first end and a second end, said first end of said at least one bracket pivotably coupled to said first lower crossbar, said second end of said at least one bracket pivotably coupled to said second lower crossbar.

14. The wheel caster locking system for a housekeeping cart of claim 13, wherein said first wheel locking assembly comprises a first locking pin disposed within a first housing, said first housing coupled to a first wheel caster, said first locking pin having a first end and a second end, said first end of said first locking pin coupled to said second lower crossbar first locking pin, said second end of said first locking pin positionable within said first wheel caster to prevent rotation of said first wheel caster.

15. The wheel caster locking system for a housekeeping cart of claim 14, wherein said second wheel locking assembly comprises a second locking pin disposed within a second housing, said second housing coupled to a second wheel caster, said second locking pin having a first end and a second end, said first end of said second locking pin coupled to said second lower crossbar second locking pin, said second end of said second locking pin positionable within said second wheel caster to prevent rotation of said second wheel caster.

16. A housekeeping cart comprising:
    a housekeeping cart frame;
    a bumper assembly coupled to said housekeeping cart frame, said bumper assembly comprising: a first corner bumper housing, a second corner bumper housing, an attachment bar, said attachment bar having at least one horizontal crossbar, said at least one horizontal crossbar having a first end and a second end; said first end of said horizontal crossbar coupled to a first end of a first vertical attachment bar, said second end of said at least one horizontal crossbar coupled to a first end of a second vertical attachment bar, said first and second vertical attachment bars each having a second end with threading; said first corner bumper housing coupled to said first vertical attachment bar, said second corner bumper coupled to said second vertical attachment bar, a first bumper set coupled to said first corner bumper housing by a first axle, a second bumper set coupled to said second corner bumper housing by a second axle, a first nut coupled to said second end of said first vertical attachment bar, and a second nut coupled to said second end of said second vertical attachment bar; and
    a wheel locking system, said wheel locking system including a switch pivotable between a first position and a second position, said switch attached to a housekeeping cart frame, a first vertical translational bar, said first vertical translational bar having a first end and a second end, said first end of said first vertical translation bar coupled to said switch, a second vertical translational bar, said second vertical translational bar having a first end and a second end, said first end of said second vertical translational bar coupled to said switch by a horizontal translational bar, a lower translational system, said lower translational system coupled to said second end of said first vertical translational bar, said lower translational system coupled to said second end of said second vertical translational bar, a first wheel locking assembly coupled to said lower translational system, and a second wheel locking assembly coupled to said lower translational system, wherein, when said switch is in said first position, said first and second wheel locking assemblies allow free rotation of a first and second wheel of said housekeeping cart, and when said switch is in said second position, said first and second wheel locking assemblies prevent rotation of said first and second wheel of said housekeeping cart.

* * * * *